(12) United States Patent
Agiwal et al.

(10) Patent No.: US 12,356,369 B2
(45) Date of Patent: *Jul. 8, 2025

(54) METHOD AND APPARATUS FOR TRANSMITTING AND RECEIVING A SIGNAL IN THE WIRELESS COMMUNICATION SYSTEM

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,337

(22) Filed: Feb. 20, 2024

(65) Prior Publication Data

US 2024/0196367 A1    Jun. 13, 2024

Related U.S. Application Data

(63) Continuation of application No. 17/507,629, filed on Oct. 21, 2021, now Pat. No. 11,979,853.

(30) Foreign Application Priority Data

Oct. 23, 2020  (KR) .................. 10-2020-0138529
Jun. 14, 2021  (KR) .................. 10-2021-0076831
Jun. 14, 2021  (KR) .................. 10-2021-0076842

(51) Int. Cl.
*H04W 68/00*      (2009.01)
*H04W 24/08*      (2009.01)
(Continued)

(52) U.S. Cl.
CPC ......... *H04W 68/005* (2013.01); *H04W 24/08* (2013.01); *H04W 72/044* (2013.01); *H04W 72/23* (2023.01); *H04W 76/28* (2018.02)

(58) Field of Classification Search
None
See application file for complete search history.

(56) References Cited

U.S. PATENT DOCUMENTS 8,423,031  B2 *  4/2013  Nakatsugawa ........ H04B 7/155
                                                    455/445
9,407,409  B2     8/2016  Bhattad et al.
(Continued)

FOREIGN PATENT DOCUMENTS

EP            3499975 A1 *  6/2019  ............ H04W 52/02
WO    WO-2017065557 A1 *  4/2017  ............. H04W 4/80
WO    WO-2018064477 A1 *  4/2018

OTHER PUBLICATIONS

Supplementary European Search Report dated Apr. 2, 2024, in connection with European Patent Application No. 21883355.6, 16 pages.

(Continued)

*Primary Examiner* — Jamaal Henson

(57) ABSTRACT

In an exemplary embodiment, a method performed by a relay user equipment (UE) in a wireless communication system is provided. The method comprising: receiving, from a base station (BS), a paging configuration including at least one of a number of total paging frame, a number of paging occasion for a paging frame, an offset for paging frame, a first DRX cycle of a remote UE, or paging search space; transmitting, to a remote UE, the paging configuration; receiving, from the remote UE, information related the remote UE including at least one of identity of the remote UE, paging identity of the remote UE or a second DRX cycle of the remote UE; identifying a paging occasion of the (Continued)

remote UE based on the information related the remote UE and the paging configuration; and monitoring the paging occasion of the remote UE for receiving a paging message for the remote UE.

20 Claims, 22 Drawing Sheets

(51) Int. Cl.
*H04W 72/044* (2023.01)
*H04W 72/23* (2023.01)
*H04W 76/28* (2018.01)

(56) References Cited

U.S. PATENT DOCUMENTS

| | | | | |
|---|---|---|---|---|
| 2017/0230941 A1* | 8/2017 | Agiwal | ................ | H04W 72/51 |
| 2019/0223150 A1* | 7/2019 | Islam | ................... | H04W 88/08 |
| 2019/0261309 A1* | 8/2019 | Martin | .................. | H04W 76/14 |
| 2019/0306828 A1* | 10/2019 | Kim | .................... | H04W 72/046 |
| 2019/0313364 A1* | 10/2019 | Liang | ................... | H04W 76/25 |
| 2019/0373578 A1* | 12/2019 | Hong | ................... | H04W 76/28 |
| 2019/0387498 A1* | 12/2019 | Li | ......................... | H04W 40/12 |
| 2020/0077253 A1* | 3/2020 | Kim | ..................... | H04W 76/30 |
| 2020/0146095 A1 | 5/2020 | Hsieh et al. | | |
| 2020/0187152 A1* | 6/2020 | Karampatsis | .......... | H04W 4/06 |
| 2020/0322918 A1 | 10/2020 | Shih et al. | | |
| 2021/0360742 A1* | 11/2021 | Liao | ...................... | H04W 60/00 |
| 2022/0061021 A1* | 2/2022 | Wang | .................... | H04L 1/0061 |
| 2023/0020344 A1* | 1/2023 | Wang | .................... | H04W 76/10 |

OTHER PUBLICATIONS

3GPP TR 36.746 V0.5.0 (Apr. 2017). Technical Report. 3rd Generation Partnership Project; Technical Specification Group Radio Access Network; Study on further enhancements to LTE Device to Device (D2D), User Equipment (UE) to network relays for Internet of Things (IoT) and wearables; (Release 14); Apr. 2017, 17 pages.
Sony, "Paging via Relay," R2-1704824, 3GPP TSG RAN WG2 Meeting #98, Hangzhou, China, May 2017, 4 pages.
Ericsson, "Paging in connected mode," R2-1814523, 3GPP TSG-RAN2 Meeting #103bis, Chengdu, China, Oct. 2018, 4 pages.
Huawei, "(TP for NR BL CR for TS 38.423): Clarification on I-RNTI," R3-183956, 3GPP TSG-RAN3 Meeting #AH-1807 Montreal, Canada, Jul. 2018, 3 pages.
International Search Report and Written Opinion of the International Searching Authority dated Jan. 28, 2022, in connection with International Application No. PCT/KR2021/014955, 11 pages.

* cited by examiner

FIG. 18

| | List of RACH configurations |
|---|---|
| 0 | RACH configuration 1<br>(Includes *prach-ConfigurationIndex,* SSB-PerRACH-OccasionAndCB-PreamblesPerSSB) |
| 1 | RACH configuration 2<br>(Includes *prach-ConfigurationIndex,* SSB-PerRACH-OccasionAndCB-PreamblesPerSSB) |
| 2 | RACH configuration 3<br>(Includes *prach-ConfigurationIndex,* SSB-PerRACH-OccasionAndCB-PreamblesPerSSB) |
| 3 | RACH configuration 4<br>(Includes *prach-ConfigurationIndex,* SSB-PerRACH-OccasionAndCB-PreamblesPerSSB) |
| 4 | RACH configuration 5<br>(index = 2, CB-PreamblesPerSSB-PerSharedRO) |
| 5 | RACH configuration 6<br>(index = 2, CB-PreamblesPerSSB-PerSharedRO) |

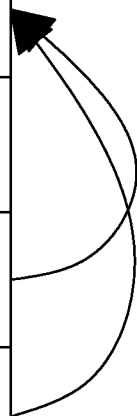

METHOD AND APPARATUS FOR TRANSMITTING AND RECEIVING A SIGNAL IN THE WIRELESS COMMUNICATION SYSTEM

CROSS-REFERENCE TO RELATED APPLICATIONS

This application is a continuation of application Ser. No. 17/507,629, filed Oct. 21, 2021, which is based on and claims priority under 35 U.S.C. § 119(e) to Korean Provisional Patent Application No. 10-2020-0138529 filed on Oct. 23, 2020, in the Korea Patent and Trademark Office, Korean Provisional Patent Application No. 10-2021-0076842 filed on Jun. 14, 2021, in the Korea Patent and Trademark Office, and Korean Provisional Patent Application No. 10-2021-0076831 filed on Jun. 14, 2021, in the Korea Patent and Trademark Office, the disclosures of which are incorporated by reference herein in their entirety.

BACKGROUND

1. Field

The present application relates generally to wireless communication systems, more specifically, the present disclosure relates to determining reference signal availability, transmitting and receiving paging by relay UE, and transmitting and receiving paging by relay UE for Remote UE.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IOT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IOT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

In an exemplary embodiment, a method performed by a relay user equipment (UE) in a wireless communication system is provided. The method comprising: receiving, from a base station (BS), a paging configuration including at least one of a number of total paging frame, a number of paging occasion for a paging frame, an offset for paging frame, a first DRX cycle of a remote UE, or paging search space; transmitting, to a remote UE, the paging configuration; receiving, from the remote UE, information related the remote UE including at least one of identity of the remote UE, paging identity of the remote UE or a second DRX cycle of the remote UE; identifying a paging occasion of the remote UE based on the information related the remote UE and the paging configuration; and monitoring the paging occasion of the remote UE for receiving a paging message for the remote UE.

In an embodiment, wherein identifying the paging occasion of the remote UE comprises: identifying a third DRX cycle based on at least one of the first DRX cycle, or the second DRX cycle; identifying a paging frame of the remote UE based on at least one of the third DRX cycle, the identity of the remote UE, the offset for paging frame, or the number of total paging frame; and identifying the paging occasion of the remote UE based on the identity of the remote UE, the number of total paging frame, and the number of paging occasion for the paging frame.

In an exemplary embodiment, wherein the second DRX cycle of the remote UE is identified based on at least one of a DRX cycle configured by upper layer to the remote UE, or a DRX cycle configured by the base station to the remote UE.

In an exemplary embodiment, the method further comprising: receiving a downlink control information (DCI) via physical downlink control channel (PDCCH) addressed to paging radio network temporary identifier (P-RNTI) in the paging occasion of the remote UE; obtaining a paging message based on the DCI; and identifying whether the paging message includes the paging identity of the remote UE; wherein the paging identity includes at least one of 5G-S-temporary Mobile Subscriber Identity (TMSI) of the remote UE or inactive radio network temporary identifier (I-RNIT) of the remote UE.

In an exemplary embodiment, wherein identifying whether the paging message includes the paging identity of the remote UE comprises: in response to identifying the paging message includes the paging identity of the remote UE, transmitting, to the remote UE, a message indicates that a paging for the remote UE; wherein the paging message includes the 5G-S-TMSI of the remote UE, the message includes information indicates that the paging corresponds to a core network paging, and wherein the paging message includes the I-RNTI of the remote UE, the message includes information indicates that the paging corresponds to a radio network paging.

In an exemplary embodiment, the method further comprising: receiving, from the remote UE, a request message to monitor the paging message for the remote UE, in a case that the relay UE is in a radio resource control (RRC) connected state; transmitting, to the BS, a message indicates that the relay UE needs to monitor the paging message for the remote UE; receiving, from the BS, a message that indicates an active bandwidth part (BWP) of the relay UE is configured with a search space for monitoring the paging message for the remote UE; and monitoring the paging message for the remote UE based on the active BWP of the relay UE.

In an exemplary embodiment, the method further comprising: transmitting, to the BS, a message including the paging identity of the remote UE; receiving, from the BS, a message indicating the relay UE to paging for the remote UE based on the paging identity of the remote UE; and receiving, from the BS, a RRC message including paging identity of at least one paged remote UE.

In an exemplary embodiment, a method performed by a remote user equipment (UE) in a wireless communication system, the method comprising: receiving, from a relay user equipment (UE), a paging configuration, wherein the paging configuration includes at least one of a number of total paging frame, a number of paging occasion for a paging frame, an offset for paging frame, a first DRX cycle of a remote UE, or paging search space; and transmitting, to the relay UE, information related the remote UE including at least one of identity of the remote UE, paging identity of the remote UE or a second DRX cycle of the remote UE; wherein a paging occasion of the remote UE is identified by the relay UE based on the information related the remote UE and the paging configuration, and wherein the paging occasion of the remote UE for receiving a paging message for the remote UE is monitored by the relay UE.

In an exemplary embodiment, wherein a third DRX cycle is identified based on at least one of the first DRX cycle, or the second DRX cycle, wherein a paging frame of the remote UE is identified based on at least one of the third DRX cycle, the identity of the remote UE, the offset for paging frame, or the number of total paging frame, and wherein the paging occasion of the remote UE is identified based on the identity of the remote UE, the number of total paging frame, and the number of paging occasion for the paging frame.

In an exemplary embodiment, further comprising: identifying the second DRX cycle of the remote UE based on at least one of a DRX cycle configured by upper layer to the remote UE, or a DRX cycle configured by the base station to the remote UE.

In an exemplary embodiment, wherein a downlink control information (DCI) is received by the relay UE via physical downlink control channel (PDCCH) addressed to paging radio network temporary identifier (P-RNTI) in the paging occasion of the remote UE; wherein a paging message is obtained based on the DCI; and wherein whether the paging message includes the paging identity of the remote UE is identified, wherein the paging identity includes at least one of 5G-S-temporary Mobile Subscriber Identity (TMSI) of the remote UE or inactive radio network temporary identifier (I-RNIT) of the remote UE.

In an exemplary embodiment, the method further comprising: in response to identifying the paging message includes the paging identity of the remote UE, receiving, from the relay UE, a message indicates that a paging for the remote UE; wherein the paging message includes the 5G-S-TMSI of the remote UE, the message includes information indicates that the paging corresponds to a core network paging, and wherein the paging message includes the I-RNTI of the remote UE, the message includes information indicates that the paging corresponds to a radio network paging.

In an exemplary embodiment, the method further comprising: transmitting, to the relay UE, a request message to monitor the paging message for the remote UE, in a case that the relay UE is in a radio resource control (RRC) connected state, wherein a message indicates that the relay UE needs to monitor the paging message for the remote UE is transmitted to the BS by the relay UE, wherein a message that indicates an active bandwidth part (BWP) of the relay UE is configured with a search space for monitoring the paging message for the remote UE is received from the BS by the relay UE, and wherein the paging message for the remote UE is monitored based on the active BWP of the relay UE.

In an exemplary embodiment, wherein a message including the paging identity of the remote UE is transmitted to the BS from the relay UE, wherein a message indicating the relay UE to paging for the remote UE based on the paging identity of the remote UE is received from the BS by the relay UE, and wherein a RRC message including paging identity of at least one paged remote UE is received from the BS by the relay UE.

In an exemplary embodiment, a relay user equipment (UE) in a wireless communication system. The relay UE comprising: a transceiver; and at least one processor coupled with the transceiver and is configure to: receive, from a base station (BS), a paging configuration including at least one of a number of total paging frame, a number of paging occasion for a paging frame, an offset for paging frame, a first DRX cycle of a remote UE, or paging search space, transmit, to a remote UE, the paging configuration, receive, from the remote UE, information related the remote UE including at least one of identity of the remote UE, paging identity of the remote UE or a second DRX cycle of the remote UE, identify a paging occasion of the remote UE based on the information related the remote UE and the paging configuration, and monitor the paging occasion of the remote UE for receiving a paging message for the remote UE.

In an exemplary embodiment, wherein the at least one processor is configured to: identify a third DRX cycle based on at least one of the first DRX cycle, or the second DRX cycle, identify a paging frame of the remote UE based on at least one of the third DRX cycle, the identity of the remote UE, the offset for paging frame, or the number of total paging frame, and identify the paging occasion of the remote UE based on the identity of the remote UE, the number of total paging frame, and the number of paging occasion for the paging frame.

In an exemplary embodiment, wherein the second DRX cycle of the remote UE is identified based on at least one of a DRX cycle configured by upper layer to the remote UE, or a DRX cycle configured by the base station to the remote UE.

In an exemplary embodiment, wherein the at least one processor is configured to: receive a downlink control information (DCI) via physical downlink control channel (PDCCH) addressed to paging radio network temporary identifier (P-RNTI) in the paging occasion of the remote UE, obtain a paging message based on the DCI, and identify whether the paging message includes the paging identity of the remote UE, wherein the paging identity includes at least one of 5G-S-temporary Mobile Subscriber Identity (TMSI) of the remote UE or inactive radio network temporary identifier (I-RNIT) of the remote UE.

In an exemplary embodiment, wherein the at least one processor is configured to: receive, from the remote UE, a request message to monitor the paging message for the remote UE, in a case that the relay UE is in a radio resource control (RRC) connected state, transmit, to the BS, a message indicates that the relay UE needs to monitor the paging message for the remote UE, receive, from the BS, a message that indicates an active bandwidth part (BWP) of the relay UE is configured with a search space for monitoring the paging message for the remote UE, and monitor the paging message for the remote UE based on the active BWP of the relay UE.

In an exemplary embodiment, wherein the at least one processor is configured to: transmit, to the BS, a message including the paging identity of the remote UE, receive, from the BS, a message indicating the relay UE to paging for the remote UE based on the paging identity of the remote UE, and receive, from the BS, a RRC message including paging identity of at least one paged remote UE.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18 is a diagram illustrating a list of RACH configurations according to an embodiment of the present disclosure;

DETAILED DESCRIPTION

Figure 1:
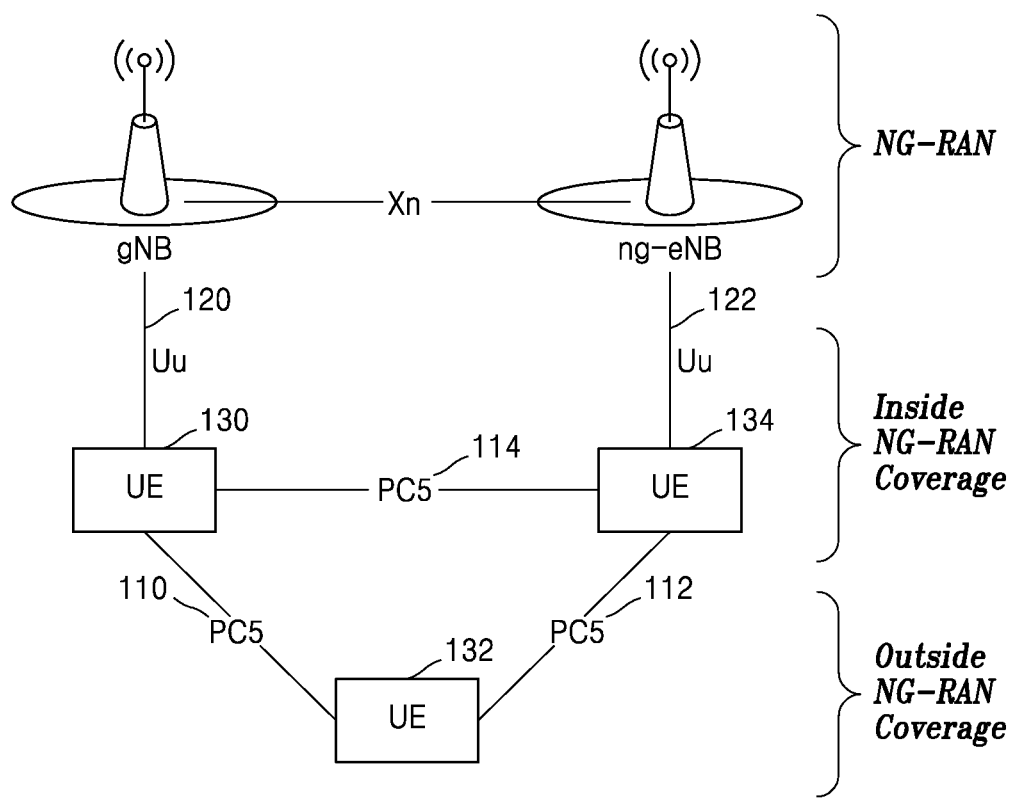
FIG. 1 illustrates a diagram of sidelink communication according to embodiments of the present disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IOT devices, sensors, and other wireless communication devices.

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IOT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

CA/Multi-connectivity in fifth generation wireless communication system: The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

PDCCH in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations is signaled by GNB for each configured BWP of serving cell wherein each search configuration is uniquely identified by a search space identifier. Search space identifier is unique amongst the BWPs of a serving cell. Identifier of search space configuration to be used for specific purpose such as paging reception, SI reception, random access response reception is explicitly signaled by gNB for each configured BWP. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP of serving cell wherein each coreset configuration is uniquely identified by an coreset identifier. Coreset identifier is unique amongst the BWPs of a serving cell. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends on radio frame for each supported SCS is predefined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by GNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-Inactivity Timer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported such as contention based random access, contention free random access and each of these can be one 2 step or 4 step random access.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+ 14*80*8*ul_carrier_id, where s_id is the index of the first orthogonal frequency division multiplexing (OFDM) symbol of the PRACH occasion where UE has transmitted Msg1, i.e. RA preamble; 0≤ s_id<14; t_id is the index of the first slot of the PRACH occasion (0≤t_id<80); f_id is the index of the PRACH occasion within the slot in the frequency domain (0≤ f_id<8), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signalled by gNB, UE select the signalled carrier for performing Random Access procedure. If the carrier to use for the Random Access procedure is not explicitly signalled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.
else if 2 step contention free random access resources are signaled by gNB for this random access procedure, UE selects 2 step RACH.
else if 4 step contention free random access resources are signaled by gNB for this random access procedure, UE selects 4 step RACH.
else if the UL BWP selected for this random access procedure is configured with only 2 step RACH resources, UE selects 2 step RACH.
else if the UL BWP selected for this random access procedure is configured with only 4 step RACH resources, UE selects 4 step RACH.
else if the UL BWP selected for this random access procedure is configured with both 2 step and 4 step RACH resources,
if RSRP of the downlink pathloss reference is below a configured threshold, UE selects 4 step RACH. Otherwise UE selects 2 step RACH.

System information acquisition in fifth generation wireless communication system: In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:
the MIB is always transmitted on the BCH with a periodicity of 80 ms and repetitions made within 80 ms and it includes parameters that are needed to acquire SIB1 from the cell.
the SIB1 is transmitted on the DL-SCH with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length. The scheduling information in SIB 1 includes an indicator for each SI message, which indicates whether the concerned SI message is being broadcasted or not. If at least one SI message is not being broadcasted, SIB1 may include random access resources (PRACH preamble(s) and PRACH resource (s)) for requesting gNB to broadcast one or more SI message(s).
SIBs other than SIB1 are carried in System Information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

Paging in fifth generation wireless communication system: In the 5th generation (also referred as NR or New Radio) wireless communication system, UE can be in one of the following RRC state: RRC_IDLE, RRC_INACTIVE, and RRC_CONNECTED. The RRC states can further be characterized as follows:

In RRC_IDLE state, a UE specific DRX may be configured by upper layers (i.e. NAS). The UE monitors Short Messages transmitted with P-RNTI over DCI; Monitors a Paging channel for CN paging using 5G-S-TMSI; Performs neighboring cell measurements and cell (re-) selection; Acquires system information and can send SI request (if configured). In RRC_INACTIVE state, a UE specific DRX may be configured by upper layers or by RRC layer; In this state, UE stores the UE Inactive AS context. A RAN-based notification area is configured by RRC layer. The UE monitors Short Messages transmitted with P-RNTI over DCI; Monitors a Paging channel for CN paging using 5G-S-TMSI and RAN paging using fullI-RNTI; Performs neighbouring cell measurements and cell (re-)selection; Performs RAN-based notification area updates periodically and when moving outside the configured RAN-based notification area; Acquires system information and can send SI request (if configured).

In the RRC_CONNECTED, the UE stores the AS context. Unicast data is transmitted/received to/from UE. At lower layers, the UE may be configured with a UE specific DRX. The UE, monitors Short Messages transmitted with P-RNTI over DCI, if configured; Monitors control channels associated with the shared data channel to determine if data is scheduled for it; Provides channel quality and feedback information; Performs neighbouring cell measurements and measurement reporting; Acquires system information.

In the RRC_CONNECTED, network may initiate suspension of the RRC connection by sending RRCRelease with suspend configuration. When the RRC connection is suspended, the UE stores the UE Inactive AS context and any configuration received from the network, and transits to RRC_INACTIVE state. If the UE is configured with SCG, the UE releases the SCG configuration upon initiating a RRC Connection Resume procedure. The RRC message to suspend the RRC connection is integrity protected and ciphered.

The resumption of a suspended RRC connection is initiated by upper layers when the UE needs to transit from RRC_INACTIVE state to RRC_CONNECTED state or by RRC layer to perform a RNA update or by RAN paging from NG-RAN. When the RRC connection is resumed, network configures the UE according to the RRC connection resume procedure based on the stored UE Inactive AS context and any RRC configuration received from the network. The RRC connection resume procedure re-activates AS security and re-establishes SRB(s) and DRB(s). In response to a request to resume the RRC connection, the network may resume the suspended RRC connection and send UE to RRC_CONNECTED, or reject the request to resume and send UE to RRC_INACTIVE (with a wait timer), or directly re-suspend the RRC connection and send UE to RRC_INACTIVE, or directly release the RRC connection and send UE to RRC_IDLE, or instruct the UE to initiate NAS level recovery (in this case the network sends an RRC setup message).

Upon initiating the resume procedure, UE:

apply the default LI parameter values as specified in corresponding physical layer specifications, except for the parameters for which values are provided in SIB1; apply the default MAC Cell Group configuration; apply the CCCH configuration; start timer T319; apply the timeAlignmentTimerCommon included in SIB1; apply the default SRB1 configuration; set the variable pendingRNA-Update to false; initiate transmission of the RRCResumeRequest message or RRCResumeRequest1; restore the RRC configuration, RoHC state, the stored QoS flow to DRB mapping rules and the KgNB and KRRCint keys from the stored UE Inactive AS context except for the following: masterCellGroup, mrdc-SecondaryCellGroup, if stored; and pdcp-Config; set the resumeMAC-I to the 16 least significant bits of the MAC-I calculated: with the $K_{RRCint}$ key in the UE Inactive AS Context and the previously configured integrity protection algorithm; and with all input bits for COUNT, BEARER and DIRECTION set to binary ones; derive the $K_{gNB}$ key based on the current $K_{gNB}$ key or the NH, using the stored nextHopChaining Count value; derive the $K_{RRCenc}$ key, the $K_{RRCint}$ key, the $K_{UPint}$ key and the $K_{UPenc}$ key; configure lower layers to apply integrity protection for all signaling radio bearers except SRB0 using the configured algorithm and the $K_{RRCint}$ key and $K_{UPint}$ key, i.e., integrity protection shall be applied to all subsequent messages received and sent by the UE; configure lower layers to apply ciphering for all signaling radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE; re-establish PDCP entities for SRB1; resume SRB1; transmit RRCResumeRequest or RRCResumeRequest1.

In 5G wireless communication system, small data transmission (SDT) in RRC_INACTIVE is supported. The uplink data can be transmitted in Msg3 in case of 4 step RA procedure for SDT and in MsgA in case of 2 step RA procedure for SDT and in preconfigured CG resource in case of CG based SDT procedure.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In the 5th generation (also referred as NR or New Radio) wireless communication system, the UE may use Discontinuous Reception (DRX) in RRC_IDLE and RRC_INACTIVE state in order to reduce power consumption. In the RRC_IDLE/RRC_INACTIVE state UE wake ups at regular intervals (i.e. every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e. S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more POs to receive SI update notification and to receive emergency notifications. In RRC connected state, UE can monitor any PO in paging DRX cycle and monitors at least one PO in SI modification period. In the RRC idle/inactive mode UE monitors PO every DRX cycle in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

The PF for a UE is the radio frame with system frame number 'SFN' which satisfies the equation (SFN+PF_offset) mod T=(T div N)*(UE_ID mod N).

Index (i_s), indicating the index of the PO is determined by i_s=floor(UE_ID/N) mod Ns.

T is DRX cycle of the UE.

In RRC_INACTIVE state, T is determined by the shortest of the UE specific DRX value configured by RRC, UE specific DRX value configured by NAS, and a default DRX value broadcast in system information.

In RRC_IDLE state, T is determined by the shortest of UE specific DRX value configured by NAS, and a default DRX value broadcast in system information. If UE specific DRX is not configured by upper layers (i.e. NAS), the default value is applied.

N: number of total paging frames in T

Ns: number of paging occasions for a PF

PF_offset: offset used for PF determination

UE_ID: 5G-S-TMSI mod 1024

Parameters Ns, nAndPagingFrameOffset, and the length of default DRX Cycle are signaled in SIB1. The values of N and PF_offset are derived from the parameter nAndPagingFrameOffset. If the UE has no 5G-S-TMSI, for instance when the UE has not yet registered onto the network, the UE shall use as default identity UE_ID=0 in the PF and i_s formulas above.

The PDCCH monitoring occasions for paging are determined based on paging search space configuration (paging-SearchSpace) signaled by gNB.

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformationBlock1 received from gNB. The parameter first-PDCCH-MonitoringOccasionOfPO is signalled in SIB1 for paging in initial DL BWP. For paging in a DL BWP other than the initial DL BWP, the parameter first-PDCCH-MonitoringOccasionOfPO is signaled in the corresponding BWP configuration.

The PDCCH addressed to P-RNTI carries information according to DCI format 1_0. The following information is transmitted by means of the DCI format 1_0 with CRC scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—$\lceil \log_2(N_{RB}^{DL,BWP} (N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits. If only the short message is carried, this bit field is reserved.

VRB-to-PRB mapping—1 bit If only the short message is carried, this bit field is reserved.

Modulation and coding scheme—5 bits. If only the short message is carried, this bit field is reserved.

TB scaling—2 bits If only the short message is carried, this bit field is reserved.

Reserved bits—6 bits

Table 1 may define Short Message indicator.

TABLE 1

| Bit field | Short Message indicator |
| --- | --- |
| 00 | Reserved |
| 01 | Only scheduling information for Paging is present in the DCI |
| 10 | Only short message is present in the DCI |
| 11 | Both scheduling information for Paging and short message are present in the DCI |

Table 2 defines Short Message. Bit 1 is the most significant bit.

TABLE 2

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3-8 | Reserved |

In RRC IDLE and RRC INACTIVE state, UE may use SSBs for AGC, time/frequency tracking, RRM measurement for the serving cell, RRM measurement for neighbor cell and for paging reception. SSBs comprising of PSS/SSS/PBCH are periodically broadcasted by a cell. Since the periodicity of SSBs can be longer it is being discussed that TRS/CSI-RS occasion(s) that are configured for connected mode UEs in a cell can be shared to idle/inactive mode UEs. Idle/inactive UE may use the TRS/CSI-RS occasion(s) that are shared to it for functionalities such as AGC, time/frequency tracking, RRM measurement for serving cell, RRM measurement for neighbor cell and for paging reception. The configuration (such time and frequency resources, periodicity, etc.) of TRS/CSI-RS occasion(s) for idle/inactive mode UE(s) is provided by RRC signaling in system information.

TRS/CSI RS can be dynamically switched on/OFF in a cell. In case TRS/CSI RS is switched off, gNB can remove the configuration of TRS/CSI RS occasions from SIB and send SI update notification to UE. In case TRS is switched on, gNB can add the configuration of TRS/CSI RS occasions in SIB and send SI update notification to UE. The above approach is simple and reuses existing SI framework. However, the above approach would require UE to acquire SIB1 every time TRS is switched on/off. It may also impact other UEs who are not interested in TRS/CSI RS as they all will acquire SIB1 upon receiving SI update notification and determine which SIB is updated. So an enhanced method of indicating availability/unavailability of TRS/CSI RSs for RRC IDLE UEs and RRC INACTIVE UEs is needed.

SI change indication and PWS notification in in fifth generation wireless communication system: A modification period is used, i.e. updated SI message (other than SI message for ETWS, CMAS and positioning assistance data) is broadcasted in the modification period following the one where SI change indication is transmitted. The modification period boundaries are defined by SFN values for which SFN mod m=0, where m is the number of radio frames comprising the modification period. The modification period is configured by system information. The UE receives indications about SI modifications and/or PWS notifications using Short Message transmitted with P-RNTI over DCI. Repetitions of SI change indication may occur within preceding modification period.

UEs in RRC_IDLE or in RRC_INACTIVE shall monitor for SI change indication in its own paging occasion every DRX cycle. UEs in RRC_CONNECTED shall monitor for SI change indication in any paging occasion at least once per modification period if the UE is provided with common search space, including pagingSearchSpace, searchSpaceSIB1 and searchSpaceOtherSystemInformation, on the active BWP to monitor paging.

ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once every defaultPagingCycle if the UE is provided with common search space, including pagingSearchSpace, searchSpaceSIB1 and searchSpaceOtherSystemInformation, on the active BWP to monitor paging.

Sidelink Communication: 4G and 5G wireless communication system supports vehicular communication services. Vehicular communication services, represented by V2X services, can consist of the following four different types: V2V, V2I, V2N and V2P. In fifth generation (also referred as NR or New Radio) wireless communication system, V2X communication is being enhanced to support enhanced V2X use cases, which are broadly arranged into four use case groups:

1) Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.
2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a broader and holistic view of the local situation. High data rate is one of the key characteristics.
3) Advanced Driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.
4) Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

FIG. 1 illustrates a diagram of sidelink communication according to embodiments of the present disclosure.

V2X services can be provided by PC5 interface 110, 112, 114 and/or Uu interface 120, 132. Support of V2X services via PC5 interface 110, 112, 114 is provided by NR sidelink communication or V2X sidelink communication, which is a mode of communication whereby UEs 130, 132, 134 can communicate with each other directly over the PC5 interface 110, 112, 114 using NR technology or EUTRA technology respectively without traversing any network node. This communication mode is supported when the UE is served by RAN and when the UE is outside of RAN coverage. Only the UEs authorized to be used for V2X services can perform NR or V2X sidelink communication. The NG-RAN architecture supports the PC5 interface 110, 112, 114 as illustrated in FIG. 1. Sidelink transmission and reception over the PC5 interface 110, 112, 114 are supported when the UE is inside NG-RAN coverage, irrespective of which RRC state the UE is in, and when the UE is outside NG-RAN coverage. Support of V2X services via the PC5 interface can be provided by NR Sidelink Communication and/or V2X Sidelink Communication. NR Sidelink Communication may be used to support other services than V2X services.

NR or V2X Sidelink Communication can support three types of transmission modes. (1) Unicast transmission, characterized by support of at least one PC5-RRC connection between peer UEs; Transmission and reception of control information and user traffic between peer UEs in sidelink; Support of sidelink HARQ feedback; Support of RLC AM; and Support of sidelink RLM for both peer UEs to detect RLF. (2) Groupcast transmission, characterized by: Transmission and reception of user traffic among UEs belonging to a group in sidelink; Support of sidelink HARQ feedback. (3) Broadcast transmission, characterized by: Transmission and reception of user traffic among UEs in sidelink.

The AS protocol stack for the control plane in the PC5 interface consists of RRC, PDCP, RLC and MAC sublayer, and the physical layer. The AS protocol stack for user plane in the PC5 interface consists of SDAP, PDCP, RLC and MAC sublayer, and the physical layer. Sidelink Radio bearers (SLRB) are categorized into two groups: sidelink data radio bearers (SL DRB) for user plane data and sidelink signaling radio bearers (SL SRB) for control plane data. Separate SL SRBs using different SCCHs are configured for PC5-RRC and PC5-S signaling respectively.

The MAC sublayer provides the following services and functions over the PC5 interface:

Radio resource selection; Packet filtering; Priority handling between uplink and sidelink transmissions for a given UE; Sidelink CSI reporting. With LCP restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant Type 1. For packet filtering, a SL-SCH MAC header including portions of both Source Layer-2 ID and a Destination Layer-2 ID is added to each MAC PDU. LCID included within a MAC subheader uniquely identifies a logical channel within the scope of the Source Layer-2 ID and Destination Layer-2 ID combination. The following logical channels are used in sidelink:

Sidelink Control Channel (SCCH): a sidelink channel for transmitting control information from one UE to other UE(s);

Sidelink Traffic Channel (STCH): a sidelink channel for transmitting user information from one UE to other UE(s);

Sidelink Broadcast Control Channel (SBCCH): a sidelink channel for broadcasting sidelink system information from one UE to other UE(s).

The following connections between logical channels and transport channels exist:

SCCH can be mapped to SL-SCH;
STCH can be mapped to SL-SCH;
SBCCH can be mapped to SL-BCH.

The RRC sublayer provides the following services and functions over the PC5 interface:

Transfer of a PC5-RRC message between peer UEs;
Maintenance and release of a PC5-RRC connection between two UEs;
Detection of sidelink radio link failure for a PC5-RRC connection.

A PC5-RRC connection is a logical connection between two UEs for a pair of Source and Destination Layer-2 IDs which is considered to be established after a corresponding PC5 unicast link is established as specified in TS 23.287. There is one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions. If it is not interested in sidelink transmission, if sidelink RLF on the PC5-RRC connection is declared, or if the Layer-2 link release procedure is completed as specified in TS 23.287, UE releases the PC5-RRC connection.

Sidelink or PC5 interface supports UE-to-UE direct communication using the sidelink resource allocation modes, physical-layer signals/channels. Two sidelink resource allocation modes are supported: mode 1 and mode 2. In mode 1, the sidelink resource allocation is provided by the network. In mode 2, UE decides the SL transmission resources in the resource pool(s).

Physical Sidelink Control Channel (PSCCH) indicates resource and other transmission parameters used by a UE for PSSCH. PSCCH transmission is associated with a DM-RS. Sidelink control information (1st stage SCI) is transmitted on PSCCH.

Physical Sidelink Shared Channel (PSSCH) transmits the transport blocks (TBs) of data themselves, and control information for HARQ procedures and CSI feedback triggers, etc. control information is referred as $2^{nd}$ stage SCI. At least 6 OFDM symbols within a slot are used for PSSCH transmission. PSSCH transmission is associated with a DM-RS and may be associated with a PT-RS.

Physical Sidelink Feedback Channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The Sidelink synchronization signal consists of sidelink primary and sidelink secondary synchronization signals (S-PSS, S-SSS), each occupying 2 symbols and 127 subcarriers. Physical Sidelink Broadcast Channel (PSBCH) occupies 9 and 5 symbols for normal and extended cyclic prefix cases respectively, including the associated DM-RS.

Sidelink HARQ feedback uses PSFCH and can be operated in one of two options. In one option, which can be configured for unicast and groupcast, PSFCH transmits either ACK or NACK using a resource dedicated to a single PSFCH transmitting UE. In another option, which can be configured for groupcast, PSFCH transmits NACK, or no PSFCH signal is transmitted, on a resource that can be shared by multiple PSFCH transmitting UEs.

For transmitting data over PC5 interface, transmitter UE first transmits 1st Stage SCI over PSCCH resource. $1^{st}$ stage SCI includes information about the transport block such as: Priority, Frequency resource assignment, Time resource assignment, resource reservation period, DMRS pattern, 2nd stage SCI format, MCS, number of DMRS port, etc. Transmitter UE then transmits 2nd stage SCI over PSSCH. The second stage SCI includes information such as, HARQ process number, NDI, RV, Source ID, Destination ID, HARQ feedback enabled/disabled indicator, cast type, CSI request, Zone ID, range, etc. Transmitter UE then transmits TB carrying SL MAC PDU over PSSCH.

<(Un-)Availability of TRS/CSI RSs for RRC IDLE and RRC INACTIVE UEs>

Embodiment 1-1: Single Notification for TRS and/or CSI RS in a Short Message

Figure 2:
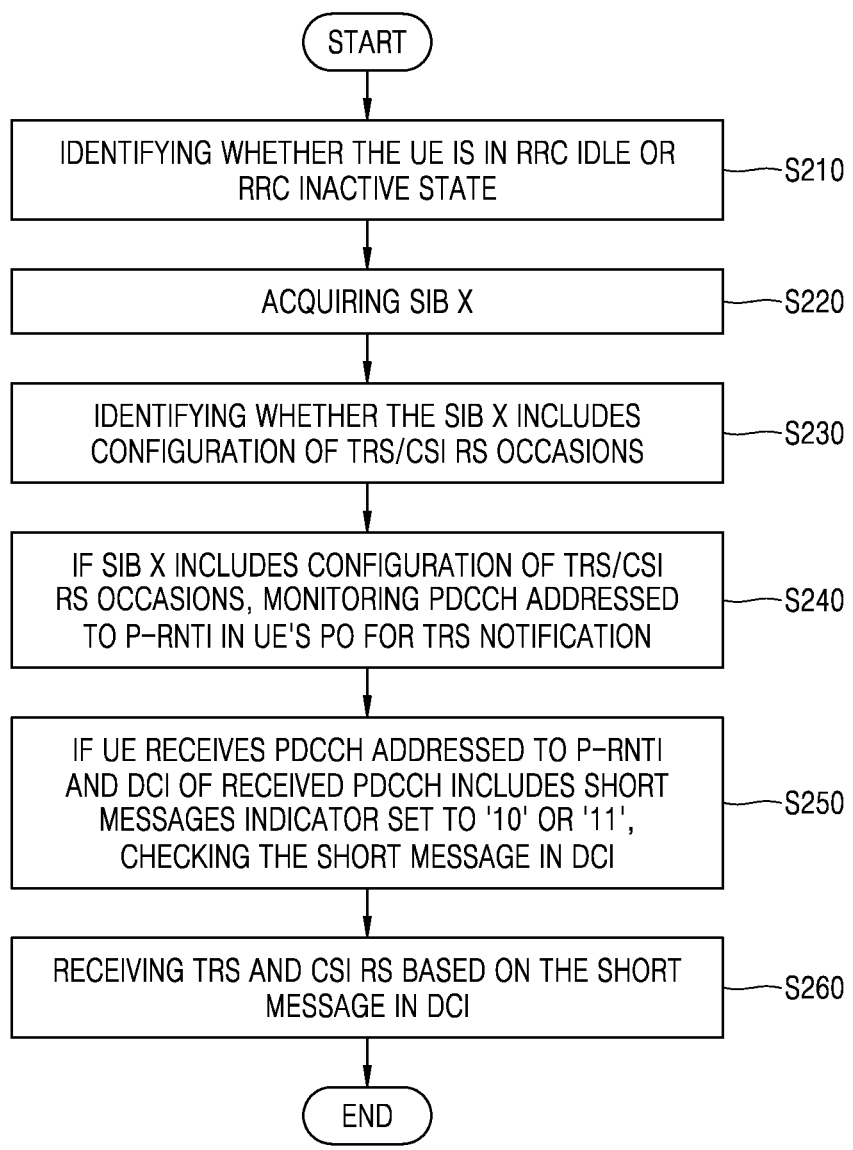
FIG. 2 illustrates a flowchart of a method performed by a UE to identify a single notification for TRS and CSI RS in a short message according to embodiments of the present disclosure.

FIG. 2 illustrates a flowchart of a method performed by a UE to identify a single notification for TRS and CSI RS in a short message according to embodiments of the present disclosure.

In an exemplary embodiment, a new notification (trsNotification) may be included in a short message included in PDCCH addressed to P-RNTI.

In an exemplary embodiment, the PDCCH addressed to P-RNTI may carry information according to DCI format 1_0. For example, the following information may be transmitted by means of the DCI format 1_0 with CRC scrambled by P-RNTI:

Short Messages Indicator—2 bits according to Table 1.
Short Messages—8 bits according to Table 2. If only the scheduling information for Paging is carried, this bit field is reserved.
Frequency domain resource assignment—$\lceil \log_2(N_{RB}^{DL,BWP}(N_{RB}^{DL,BWP}+1)/2) \rceil$ bits. If only the short message is carried, this bit field is reserved.
$N_{RB}^{DL,BWP}$ is the size of CORESET 0
Time domain resource assignment—4 bits (e.g., 4 bits as defined in Subclause 5.1.2.1 of [6, TS38.214]). If only the short message is carried, this bit field is reserved.
VRB-to-PRB mapping—1 bit (e.g., 1 bit according to Table 7.3.1.1.2-33 of TS 38.212). If only the short message is carried, this bit field is reserved.
Modulation and coding scheme—5 bits. (e.g., 5 bits as defined in Subclause 5.1.3 of [6, TS38.214], using Table 5.1.3.1-1 of TS 38.214). If only the short message is carried, this bit field is reserved.
TB scaling—2 bits. (e.g., 2 bits as defined in Subclause 5.1.3.2 of [6, TS38.214]) If only the short message is carried, this bit field is reserved.
Reserved bits—6 bits Table 3 may define the Short Message including trsNotification. Bit 1 may be the most significant bit. In an alternate embodiment, instead of 3rd bit any other bit from bits 4 to 8 can be used for trsNotification.

TABLE 3

| Bit | Short Message |
|---|---|
| 1 | SystemInfoModification |
|   | If set to 1: indication of a BCCH modification other than SIB6, SIB7 and SIB8. |
| 2 | etwsAndCmasIndication |
|   | If set to 1: indication of an ETWS primary notification and/or an ETWS secondary notification and/or a CMAS notification. |
| 3 | trsNotification |
|   | if set to 1: indication of an TRS/CSI RS availability notification |
| 4-8 | Reserved |

In step S210, the UE may identify whether the UE is in RRC IDLE or RRC INACTIVE state.

In step S220, the UE may acquire the SIB X. The SIB X may be the SIB which is used by gNB to configure TRS/CSI RS occasions to RRC IDLE UEs and RRC INACTIVE UEs.

In step S230, the UE may identify whether the SIB X includes a configuration of TRS/CSI RS occasions. In step S240, If SIBX includes configuration of TRS/CSI RS occasions:

UE may monitor PDCCH addressed to P-RNTI in UE's PO for trsNotification.

In step S250, if UE receives PDCCH addressed to P-RNTI and DCI of received PDCCH includes Short Messages Indicator set to '10' or '11':

UE may check the short message in DCI.

In step S260, UE may receive TRS/CSI RS based on the short message in DCI. If trsNotification bit is set to 1, TRS/CSI RS are transmitted by gNB in TRS/CSI RS occasions according to following rule:

In one embodiment, if trsNotification set to 1 is received in the SI modification period 'N', TRS/CSI RS are transmitted by GNB in TRS/CSI RS occasions in the SI modification period 'N'. In an embodiment, TRS/CSI RS are transmitted by GNB in TRS/CSI RS occasions in 'X' SI modification periods from SI modification period 'N' or SI modification period 'N+1', where parameter X is signaled by gNB.

In another embodiment, if trsNotification set to 1 is received in the SI modification period 'N', TRS/CSI RS are transmitted by GNB in TRS/CSI RS occasions in the SI modification period 'N+1'

In another embodiment, if trsNotification set to 1 is received in the SI modification period 'N', TRS/CSI RS are transmitted by GNB in TRS/CSI RS occasions in the SI modification period 'N' and 'N+1'

In another embodiment, if trsNotification set to 1 is received, TRS/CSI RS are transmitted by GNB in TRS/CSI RS occasions which occurs after this notification until the trsNotification set to 0 is received or until the TRS/CSI RS configuration is removed from SIB X, whichever occurs first.

In another embodiment, if trsNotification set to 1 is received in the activation period 'N', TRS/CSI RS are transmitted by GNB in TRS/CSI RS occasions in the activation period 'N'. Length of activation period in multiple of default DRX cycle or in units of slots/subframes/frames is signaled by gNB in SI. Activation period may start in SFN X where X mod activation period=0; or Activation period may start in SFN X where X mod activation period=offset where offset is also signaled by gNB in SI. In an embodiment, TRS/CSI RS are transmitted by GNB in TRS/CSI RS occasions in 'X' activation periods from activation period 'N' or activation period 'N+1', where parameter X is signaled by gNB.

In another embodiment, if trsNotification set to 1 is received in the activation period 'N', TRS/CSI RS are transmitted by GNB in TRS/CSI RS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the activation period 'N', TRS/CSI RS are transmitted by GNB in TRS/CSI RS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the (default) DRX cycle 'N', TRS/CSI RS are transmitted by GNB in TRS/CSI RS occasions in the (default) DRX cycle 'N'. In an embodiment, TRS/CSI RS are transmitted by GNB in TRS/CSI RS occasions in 'X' DRX cycles from DRX cycle 'N' or DRX cycle 'N+1', where parameter X is signaled by gNB.

In another embodiment, if trsNotification set to 1 is received in the (default) DRX cycle 'N', TRS/CSI RS are transmitted by GNB in TRS/CSI RS occasions in the (default) DRX cycle 'N+1'

In another embodiment, if trsNotification set to 1 is received in the (default) DRX cycle 'N', TRS/CSI RS are transmitted by GNB in TRS/CSI RS occasions in the (default) DRX cycle 'N' and 'N+1'

Embodiment 1-2: Separate Notification for TRS and CSI RS in Short Message

Figure 3:
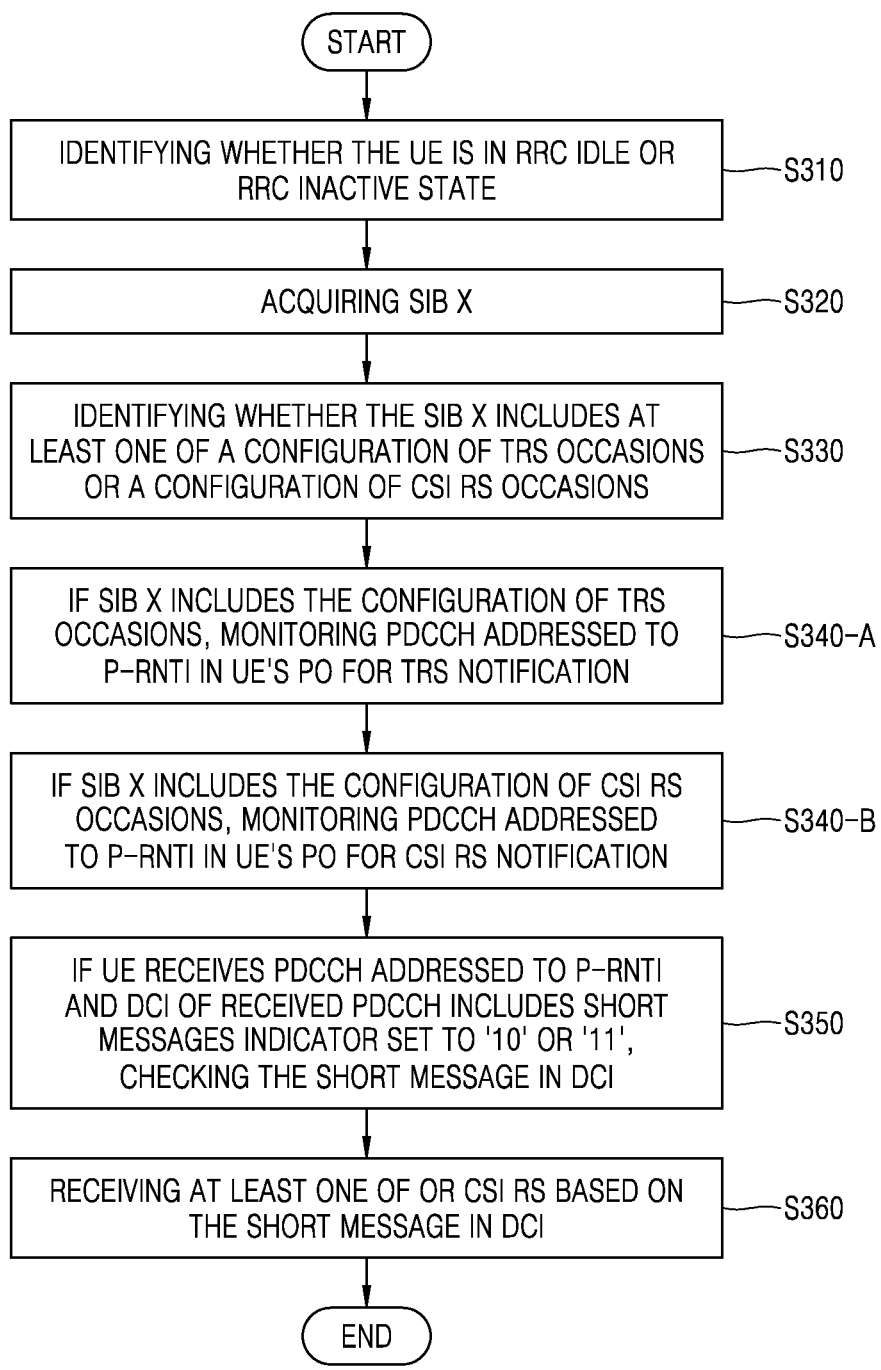
FIG. 3 illustrates a flowchart of a method performed by a UE to identify a separate notification for TRS and CSI RS in a short message according to embodiments of the present disclosure.

FIG. 3 illustrates a flowchart of a method performed by a UE to identify a separate notification for TRS and CSI RS in a short message according to embodiments of the present disclosure.

In an exemplary embodiment, new notifications (trsNotification and CsirsNotification) may be included in a short message where the short message is included in PDCCH addressed to P-RNTI.

In an exemplary embodiment, the PDCCH addressed to P-RNTI may carry information according to DCI format 1_0. For example, the following information may be transmitted by means of the DCI format 1_0 with CRC scrambled by P-RNTI:

Short Messages Indicator—2 bits according to Table 1.

Short Messages—8 bits according to Table 2. If only the scheduling information for Paging is carried, this bit field is reserved.

Frequency domain resource assignment—$\lceil \log_2(N_{RB}^{DL,BWP}(N_{RB}^{DL,BWP}+1)/2) \rceil$ bits. If only the short message is carried, this bit field is reserved.

$N_{RB}^{DL,BWP}$ is the size of CORESET 0

Time domain resource assignment—4 bits (e.g., 4 bits as defined in Subclause 5.1.2.1 of [6, TS38.214]). If only the short message is carried, this bit field is reserved.

VRB-to-PRB mapping—1 bit (e.g., 1 bit according to Table 7.3.1.1.2-33 of TS 38.212). If only the short message is carried, this bit field is reserved.

Modulation and coding scheme—5 bits. (e.g., 5 bits as defined in Subclause 5.1.3 of [6, TS38.214], using Table 5.1.3.1-1 of TS38.214). If only the short message is carried, this bit field is reserved.

TB scaling—2 bits. (e.g., 2 bits as defined in Subclause 5.1.3.2 of [6, TS38.214]). If only the short message is carried, this bit field is reserved.

Reserved bits—6 bits

Table 4 may define the Short Message including trsNotification. Bit 1 may be the most significant bit. In an alternate embodiment, instead of 3$^{rd}$ bit and 4$^{th}$ bit any other bits from bits 4 to 8 can be used for trsNotification and CsirsNotification.

TABLE 4

| Bit | Short Message |
|---|---|
| 1 | SystemInfoModification<br>If et to 1: indication of a BCCH modification other than SIB6, SIB7 and SIB8. |
| 2 | etw sAndCmasIndication<br>If set to 1: indication of an ETWS primary notification and/or an ETWS secondary notification and/or a CMAS notification. |
| 3 | trsNotification<br>if set to 1: indication of an TRS availability notification |
| 4 | CsirsNotification<br>if set to 1: indication of an CSI RS availability notification |
| 5-8 | Reserved |

In step S310, the UE may identify whether the UE is in RRC IDLE or RRC INACTIVE state.

In step S320, UE may acquire the SIB X. The SIB X may be the SIB which is used by GNB to configure TRS/CSI RS occasions to RRC IDLE UEs and RRC INACTIVE UEs.

In step S330, the UE may identify whether the SIB X includes at least one of a configuration of TRS occasions or a configuration of CSI RS occasions.

In step S340-A, if SIB X includes the configuration of TRS occasions:
 UE monitors PDCCH addressed to P-RNTI in UE's PO for trsNotification.

In step S340-B, if SIB X includes the configuration of CSI RS occasions:
 UE monitors PDCCH addressed to P-RNTI in UE's PO for CsirsNotification In step S350, If UE receives PDCCH addressed to P-RNTI and DCI of received PDCCH includes Short Messages Indicator set to '10' or '11':
 UE may check the short message in DCI.

In step S360, UE may receive at least one of TRS or CSI RS based on the short message in DCI.
 If trsNotification bit is set to 1, TRS are transmitted by GNB in TRS occasions according to following rule:
 In one embodiment, if trsNotification set to 1 is received in the SI modification period 'N', TRS are transmitted by GNB in TRS occasions in the SI modification period 'N'. In an embodiment, TRS are transmitted by GNB in TRS occasions in 'X' SI modification periods from SI modification period 'N' or SI modification period 'N+1', where parameter X is signaled by gNB.
 In another embodiment, if trsNotification set to 1 is received in the SI modification period 'N', TRS are transmitted by GNB in TRS occasions in the SI modification period 'N+1'
 In another embodiment, if trsNotification set to 1 is received in the SI modification period 'N', TRS are transmitted by GNB in TRS occasions in the SI modification period 'N' and 'N+1'
 In another embodiment, if trsNotification set to 1 is received, TRS are transmitted by GNB in TRS occasions which occurs after this notification until the trsNotification set to 0 is received or until the TRS configuration is removed from SIB X, whichever occurs first.
 In another embodiment, if trsNotification set to 1 is received in the activation period 'N', TRS are transmitted by GNB in TRS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, TRS are transmitted by GNB in TRS occasions in 'X' activation periods from activation period 'N' or activation period 'N+1', where parameter X is signaled by gNB.

In another embodiment, if trsNotification set to 1 is received in the activation period 'N', TRS are transmitted by GNB in TRS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the activation period 'N', TRS are transmitted by GNB in TRS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the (default) DRX cycle 'N', TRS are transmitted by GNB in TRS occasions in the (default) DRX cycle 'N'. In an embodiment, TRS are transmitted by GNB in TRS occasions in 'X' DRX cycles from DRX cycle 'N' or DRX cycle 'N+1', where parameter X is signaled by gNB.

In another embodiment, if trsNotification set to 1 is received in the (default) DRX cycle 'N', TRS are transmitted by GNB in TRS occasions in the (default) DRX cycle 'N+1'

In another embodiment, if trsNotification set to 1 is received in the (default) DRX cycle 'N', TRS are transmitted by GNB in TRS occasions in the (default) DRX cycle 'N' and 'N+1'

If CsirsNotification bit is set to 1, CSI RS are transmitted by GNB in CSI RS occasions according to following rule:

In one embodiment, if CsirsNotification set to 1 is received in the SI modification period 'N', TRS are transmitted by GNB in TRS occasions in the SI modification period 'N'. In an embodiment, TRS are transmitted by GNB in TRS occasions in 'X' SI modification periods from SI modification period 'N' or SI modification period 'N+1', where parameter X is signaled by gNB.

In another embodiment, if CsirsNotification set to 1 is received in the SI modification period 'N', CSI RS are transmitted by GNB in CSI RS occasions in the SI modification period 'N+1'

In another embodiment, if CsirsNotification set to 1 is received in the SI modification period 'N', CSI RS are transmitted by GNB in CSI RS occasions in the SI modification period 'N' and 'N+1'

In another embodiment, if CsirsNotification set to 1 is received, CSI RS are transmitted by GNB in CSI RS occasions which occurs after this notification until the CsirsNotification set to 0 is received or until the CSI RS configuration is removed from SIB X, whichever occurs first.

In another embodiment, if CsirsNotification set to 1 is received in the activation period 'N', CSI RS are transmitted by GNB in CSI RS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, CSI RS are transmitted by GNB in CSI RS occasions in 'X' activation periods from activation period 'N' or activation period 'N+1', where parameter X is signaled by gNB.

In another embodiment, if CsirsNotification set to 1 is received in the activation period 'N', CSI RS are transmitted by GNB in CSI RS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if CsirsNotification set to 1 is received in the activation period 'N', CSI RS are transmitted by GNB in CSI RS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if CsirsNotification set to 1 is received in the (default) DRX cycle 'N', CSI RS are transmitted by GNB in CSI RS occasions in the (default) DRX cycle 'N'. In an embodiment, CSI RS are transmitted by GNB in CSI RS occasions in 'X' DRX cycles from DRX cycle 'N' or DRX cycle 'N+1', where parameter X is signaled by gNB.

In another embodiment, if CsirsNotification set to 1 is received in the (default) DRX cycle 'N', CSI RS are transmitted by GNB in CSI RS occasions in the (default) DRX cycle 'N+1'

In another embodiment, if CsirsNotification set to 1 is received in the (default) DRX cycle 'N', CSI RS are transmitted by GNB in CSI RS occasions in the (default) DRX cycle 'N' and 'N+1'

Figure 4:
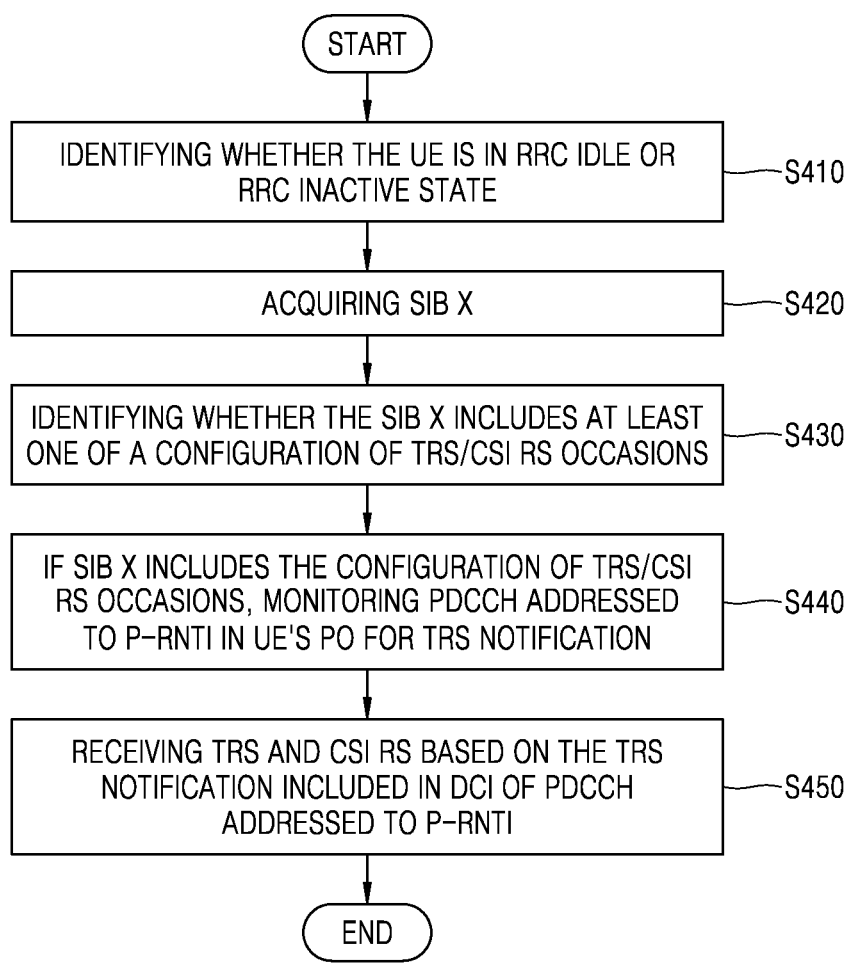
FIG. 4 illustrates a flowchart of a method performed by a UE to identify a single notification for TRS and CSI RS in DCI of PDCCH addressed to P-RNTI transmitted in paging occasion according to embodiments of the present disclosure.

Embodiment 1-3: Single Notification for TRS and/or CSI RS in DCI of PDCCH Addressed to P-RNTI Transmitted in PO FIG. 4 illustrates a flowchart of a method performed by a UE to identify a single notification for TRS and CSI RS in DCI of PDCCH addressed to P-RNTI transmitted in paging occasion according to embodiments of the present disclosure.

In an exemplary embodiment, a new notification (trsNotification) may be included in DCI of PDCCH addressed to P-RNTI.

In an exemplary embodiment, the PDCCH addressed to P-RNTI may carry information according to DCI format 1_0. For example, the following information may be transmitted by means of the DCI format 1_0 with CRC scrambled by P-RNTI:

Short Messages Indicator—2 bits according to Table 1.
Short Messages—8 bits according to Table 2. If only the scheduling information for Paging is carried, this bit field is reserved.
Frequency domain resource assignment $\lceil \log_2(N_{RB}^{DL,BWP}(N_{RB}^{DL,BWP}+1)/2) \rceil$ bits. If only the short message is carried, this bit field is reserved.
$N_{RB}^{DL,BWP}$ is the size of CORESET 0
Time domain resource assignment—4 bits (e.g., 4 bits as defined in Subclause 5.1.2.1 of [6, TS38.214]). If only the short message is carried, this bit field is reserved.
VRB-to-PRB mapping—1 bit (e.g., 1 bit according to Table 7.3.1.1.2-33 of TS 38.212). If only the short message is carried, this bit field is reserved.
Modulation and coding scheme—5 bits. (e.g., 5 bits as defined in Subclause 5.1.3 of [6, TS38.214], using Table 5.1.3.1-1 of TS38.214). If only the short message is carried, this bit field is reserved.
TB scaling—2 bits. (e.g., 2 bits as defined in Subclause 5.1.3.2 of [6, TS38.214]) If only the short message is carried, this bit field is reserved.
trsNotification
Reserved bits—5 bits In step S410, the UE may identify whether the UE is in RRC IDLE or RRC INACTIVE state.

In step S420, the UE may acquire the SIB X. The SIB X may be the SIB which is used by GNB to configure TRS/CSI RS occasions to RRC IDLE UEs and RRC INACTIVE UEs.

In step S430, the UE may identify whether the SIB X includes a configuration of TRS/CSI RS occasions.

In step S440, if SIB X includes configuration of TRS/CSI RS occasions:

UE monitors PDCCH addressed to P-RNTI in UE's PO for trsNotification.

In step S450, UE may receive TRS/CSI RS based on the trsNotification included in DCI of PDCCH addressed to P-RNTI. If UE receives PDCCH addressed to P-RNTI and DCI of received PDCCH includes trsNotification:

If trsNotification bit is set to 1, TRS/CSI RS are transmitted by GNB in TRS/CSI RS occasions according to following rule:
In one embodiment, if trsNotification set to 1 is received in the SI modification period 'N', TRS/CSI RS are transmitted by GNB in TRS/CSI RS occasions in the SI modification period 'N'. In an embodiment, TRS/CSI RS are transmitted by GNB in TRS/CSI RS occasions in 'X' SI modification periods from SI modification period 'N' or SI modification period 'N+1', where parameter X is signaled by gNB.
In another embodiment, if trsNotification set to 1 is received in the SI modification period 'N', TRS/CSI RS are transmitted by GNB in TRS/CSI RS occasions in the SI modification period 'N+1'
In another embodiment, if trsNotification set to 1 is received in the SI modification period 'N', TRS/CSI RS are transmitted by GNB in TRS/CSI RS occasions in the SI modification period 'N' and 'N+1'
In another embodiment, if trsNotification set to 1 is received, TRS/CSI RS are transmitted by GNB in TRS/CSI RS occasions which occurs after this notification until the trsNotification set to 0 is received or until the TRS/CSI RS configuration is removed from SIB X, whichever occurs first.
In another embodiment, if trsNotification set to 1 is received in the activation period 'N', TRS/CSI RS are transmitted by GNB in TRS/CSI RS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, TRS/CSI RS are transmitted by GNB in TRS/CSI RS occasions in 'X' activation periods from activation period 'N' or activation period 'N+1', where parameter X is signaled by gNB.
In another embodiment, if trsNotification set to 1 is received in the activation period 'N', TRS/CSI RS are transmitted by GNB in TRS/CSI RS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.
In another embodiment, if trsNotification set to 1 is received in the activation period 'N', TRS/CSI RS are transmitted by GNB in TRS/CSI RS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.
In another embodiment, if trsNotification set to 1 is received in the (default) DRX cycle 'N', TRS/CSI RS are transmitted by GNB in TRS/CSI RS occasions in the (default) DRX cycle 'N'. In an embodiment, TRS/CSI RS are transmitted by GNB in TRS/CSI RS occasions in 'X' DRX cycles from DRX cycle 'N' or DRX cycle 'N+1', where parameter X is signaled by gNB.
In another embodiment, if trsNotification set to 1 is received in the (default) DRX cycle 'N', TRS/CSI RS are transmitted by GNB in TRS/CSI RS occasions in the (default) DRX cycle 'N+1'
In another embodiment, if trsNotification set to 1 is received in the (default) DRX cycle 'N', TRS/CSI RS are transmitted by GNB in TRS/CSI RS occasions in the (default) DRX cycle 'N' and 'N+1'

Figure 5:
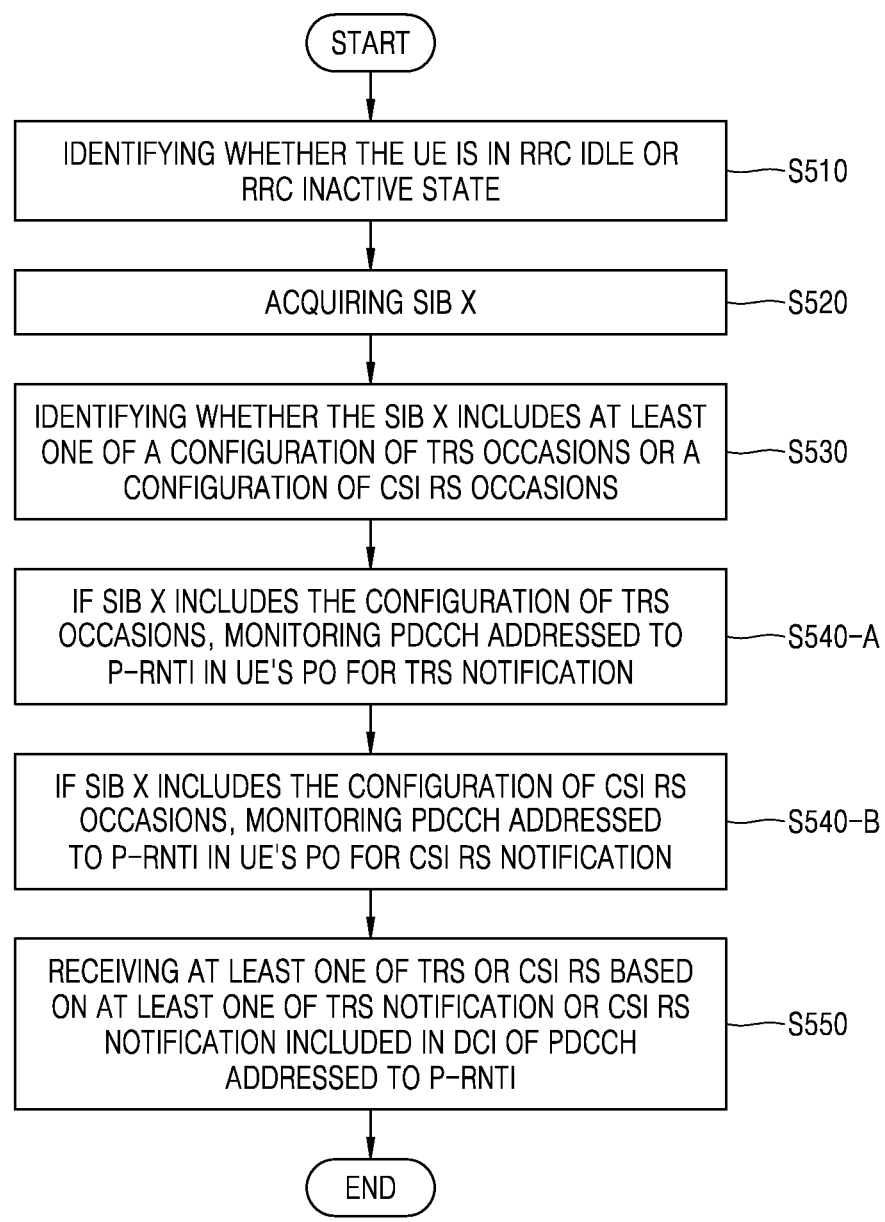
FIG. 5 illustrates a flowchart of a method performed by a UE to identify a separate notification for TRS and CSI RS in DCI of PDCCH addressed to P-RNTI transmitted in paging occasion according to embodiments of the present disclosure.

Embodiment 1-4: Separate Notification for TRS and CSI RS in DCI of PDCCH Addressed to P-RNTI Transmitted in PO FIG. 5 illustrates a flowchart of a method performed by a UE to identify a separate notification for TRS and CSI RS in DCI of PDCCH addressed to P-RNTI transmitted in paging occasion according to embodiments of the present disclosure.

In an exemplary embodiment, new notifications (trsNotification and CsirsNotification) may be included in DCI of PDCCH addressed to P-RNTI.

In an exemplary embodiment, the PDCCH addressed to P-RNTI may carry information according to DCI format 1_0. For example, the following information may be transmitted by means of the DCI format 1_0 with CRC scrambled by P-RNTI:

Short Messages Indicator—2 bits according to Table 1.
Short Messages—8 bits according to Table 2. If only the scheduling information for Paging is carried, this bit field is reserved.
Frequency domain resource assignment $\lceil \log_2(N_{RB}^{DL,BWP}(N_{RB}^{DL,BWP}+1)/2) \rceil$ bits. If only the short message is carried, this bit field is reserved.
$N_{RB}^{DL,BWP}$ is the size of CORESET 0
Time domain resource assignment—4 bits (e.g., 4 bits as defined in Subclause 5.1.2.1 of [6, TS38.214]). If only the short message is carried, this bit field is reserved.
VRB-to-PRB mapping—1 bit (e.g., 1 bit according to Table 7.3.1.1.2-33 of TS 38.212). If only the short message is carried, this bit field is reserved.
Modulation and coding scheme—5 bits. (e.g., 5 bits as defined in Subclause 5.1.3 of [6, TS38.214], using Table 5.1.3.1-1 of TS38.214). If only the short message is carried, this bit field is reserved.
TB scaling—2 bits. (e.g., 2 bits as defined in Subclause 5.1.3.2 of [6, TS38.214]) If only the short message is carried, this bit field is reserved.
trsNotification
CsirsNotification
Reserved bits—4 bits In step S510, the UE may identify whether the UE is in RRC IDLE or RRC INACTIVE state.

In step S520, the UE may acquire the SIB X. The SIB X may be the SIB which is used by GNB to configure TRS/CSI RS occasions to RRC IDLE UEs and RRC INACTIVE UEs.

In step S530, the UE may identify whether the SIB X includes at least one of a configuration of TRS occasions or a configuration of CSI RS occasions.

In step S540-A, if SIB X includes the configuration of TRS occasions:
UE monitors PDCCH addressed to P-RNTI in UE's PO for trsNotification In step S540-B, if SIBX includes the configuration of CSI RS occasions:
UE monitors PDCCH addressed to P-RNTI in UE's PO for CsirsNotification.

In step S550, UE may receive at least one of TRS or CSI RS based on at least one of trsNotification or CsirsNotification included in DCI of PDCCH addressed to P-RNTI. If UE receives PDCCH addressed to P-RNTI and DCI of received PDCCH includes at least one of trsNotification, or CsirsNotification:

If trsNotification bit is set to 1, TRS are transmitted by GNB in TRS occasions according to following rule:
In one embodiment, if trsNotification set to 1 is received in the SI modification period 'N', TRS are transmitted by GNB in TRS occasions in the SI modification period 'N'. In an embodiment, TRS are transmitted by GNB in TRS occasions in 'X' SI modification periods from SI modification period 'N' or SI modification period 'N+1', where parameter X is signaled by gNB.
In another embodiment, if trsNotification set to 1 is received in the SI modification period 'N', TRS are transmitted by GNB in TRS occasions in the SI modification period 'N+1'
In another embodiment, if trsNotification set to 1 is received in the SI modification period 'N', TRS are transmitted by GNB in TRS occasions in the SI modification period 'N' and 'N+1'
In another embodiment, if trsNotification set to 1 is received, TRS are transmitted by GNB in TRS occasions which occurs after this notification until the trsNotification set to 0 is received or until the TRS configuration is removed from SIB X, whichever occurs first.
In another embodiment, if trsNotification set to 1 is received in the activation period 'N', TRS are transmitted by GNB in TRS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, TRS are transmitted by GNB in TRS occasions in 'X' activation periods from activation period 'N' or activation period 'N+1', where parameter X is signaled by gNB.
In another embodiment, if trsNotification set to 1 is received in the activation period 'N', TRS are transmitted by GNB in TRS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.
In another embodiment, if trsNotification set to 1 is received in the activation period 'N', TRS are transmitted by GNB in TRS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.
In another embodiment, if trsNotification set to 1 is received in the (default) DRX cycle 'N', TRS are transmitted by GNB in TRS occasions in the (default) DRX cycle 'N'. In an embodiment, TRS are transmitted by GNB in TRS occasions in 'X' DRX cycles from DRX cycle 'N' or DRX cycle 'N+1', where parameter X is signaled by gNB.
In another embodiment, if trsNotification set to 1 is received in the (default) DRX cycle 'N', TRS are transmitted by GNB in TRS occasions in the (default) DRX cycle 'N+1'
In another embodiment, if trsNotification set to 1 is received in the (default) DRX cycle 'N', TRS are transmitted by GNB in TRS occasions in the (default) DRX cycle 'N' and 'N+1'
If CsirsNotification bit is set to 1, CSI RS are transmitted by GNB in CSI RS occasions according to following rule:
In one embodiment, if CsirsNotification set to 1 is received in the SI modification period 'N', TRS are transmitted by GNB in TRS occasions in the SI modification period 'N'. In an embodiment, TRS are transmitted by GNB in TRS occasions in 'X' SI modification periods from SI modification period 'N' or SI modification period 'N+1', where parameter X is signaled by gNB.

In another embodiment, if CsirsNotification set to 1 is received in the SI modification period 'N', CSI RS are transmitted by GNB in CSI RS occasions in the SI modification period 'N+1'

In another embodiment, if CsirsNotification set to 1 is received in the SI modification period 'N', CSI RS are transmitted by GNB in CSI RS occasions in the SI modification period 'N' and 'N+1'

In another embodiment, if CsirsNotification set to 1 is received, TRS are transmitted by GNB in CSI RS occasions which occurs after this notification until the CsirsNotification set to 0 is received or until the CSI RS configuration is removed from SIB X, whichever occurs first.

In another embodiment, if CsirsNotification set to 1 is received in the activation period 'N', CSI RS are transmitted by GNB in CSI RS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, CSI RS are transmitted by GNB in CSI RS occasions in 'X' activation periods from activation period 'N' or activation period 'N+1', where parameter X is signaled by gNB.

In another embodiment, if CsirsNotification set to 1 is received in the activation period 'N', CSI RS are transmitted by GNB in CSI RS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if CsirsNotification set to 1 is received in the activation period 'N', CSI RS are transmitted by GNB in CSI RS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if CsirsNotification set to 1 is received in the (default) DRX cycle 'N', CSI RS are transmitted by GNB in CSI RS occasions in the (default) DRX cycle 'N'. In an embodiment, CSI RS are transmitted by GNB in CSI RS occasions in 'X' DRX cycles from DRX cycle 'N' or DRX cycle 'N+1', where parameter X is signaled by gNB.

In another embodiment, if CsirsNotification set to 1 is received in the (default) DRX cycle 'N', CSI RS are transmitted by GNB in CSI RS occasions in the (default) DRX cycle 'N+1'

In another embodiment, if CsirsNotification set to 1 is received in the (default) DRX cycle 'N', CSI RS are transmitted by GNB in CSI RS occasions in the (default) DRX cycle 'N' and 'N+1'

Figure 6:
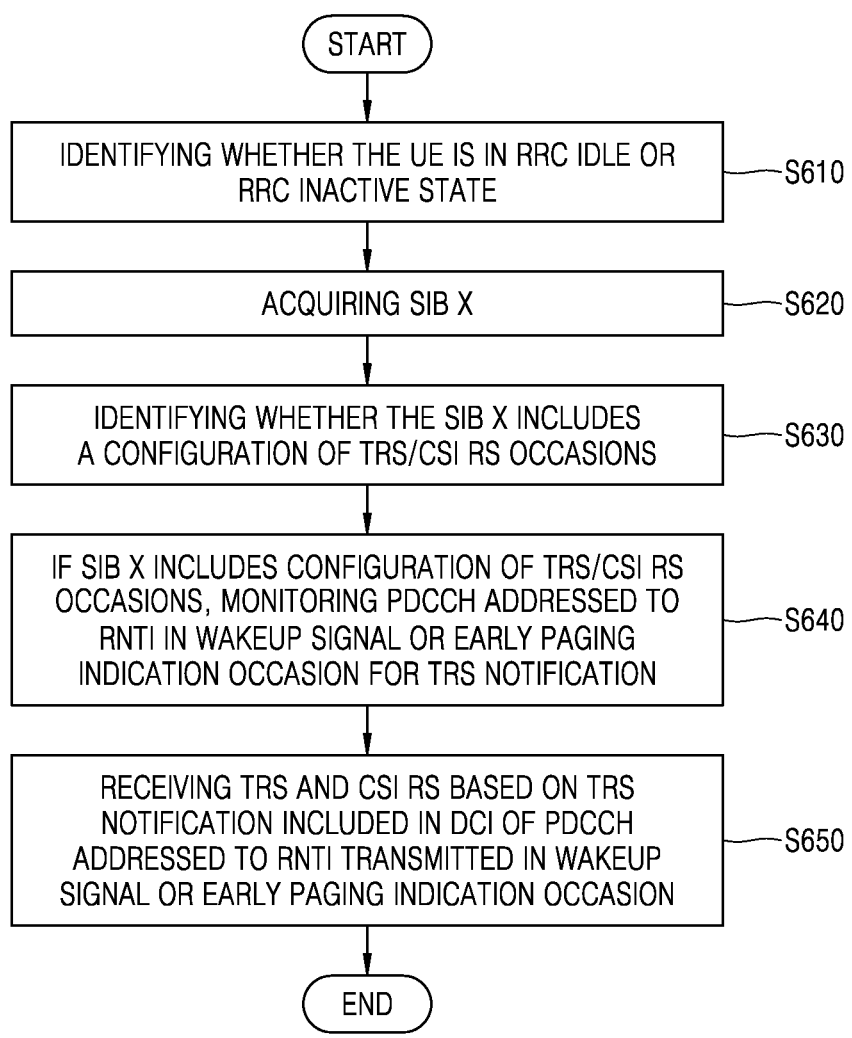
FIG. 6 illustrates a flowchart of a method performed by a UE to identify a single notification for TRS and CSI RS in DCI of PDCCH addressed to RNTI transmitted in wakeup signal or early paging indication occasion according to embodiments of the present disclosure.

Embodiment 1-5: Single Notification for TRS and/or CSI RS in DCI of PDCCH Addressed to RNTI Transmitted in Wakeup Signal or Early Paging Indication Occasion FIG. 6 illustrates a flowchart of a method performed by a UE to identify a single notification for TRS and CSI RS in DCI of PDCCH addressed to RNTI transmitted in wakeup signal or early paging indication occasion according to embodiments of the present disclosure.

In an exemplary embodiment, a new notification (trsNotification) may be included in DCI of PDCCH addressed to RNTI transmitted in wakeup signal or early paging indication occasion. Wake up signal or early paging indication is transmitted before the PO. Early paging indication is transmitted in the PDCCH monitoring occasions for early paging indication before the PO. RNTI for early paging indication can be P-RNTI or any other pre-defined RNTI.

In step S610, the UE may identify whether the UE is in RRC IDLE or RRC INACTIVE state.

In step S620, the UE may acquire the SIB X. The SIB X may be the SIB which is used by GNB to configure TRS/CSI RS occasions to RRC IDLE UEs and RRC INACTIVE UEs.

In step S630, the UE may identify whether the SIB X includes a configuration of TRS/CSI RS occasions.

In step S640, if SIBX includes the configuration of TRS/CSI RS occasions:
UE may monitor PDCCH addressed to RNTI in wakeup signal or early paging indication occasion for trsNotification In one embodiment, the UE may also monitor PDCCH addressed to P-RNTI in PO for trsNotification (e.g. in case trsNotification is not received in wakeup signal or early paging indication occasion) as in embodiment 1-3.

In step S650, UE may receive TRS and CSI RS based on trsNotification included in DCI of PDCCH addressed to RNTI transmitted in wakeup signal or early paging indication occasion by gNB. If UE receives PDCCH addressed to RNTI in wakeup signal or early paging indication occasion and DCI of received PDCCH includes trsNotification:
If trsNotification bit is set to 1, TRS/CSI RS are transmitted by GNB in TRS/CSI RS occasions according to following rule:
In one embodiment, if trsNotification set to 1 is received in the SI modification period 'N', TRS/CSI RS are transmitted by GNB in TRS/CSI RS occasions in the SI modification period 'N'. In an embodiment, TRS/CSI RS are transmitted by GNB in TRS/CSI RS occasions in 'X' SI modification periods from SI modification period 'N' or SI modification period 'N+1', where parameter X is signaled by gNB.
In another embodiment, if trsNotification set to 1 is received in the SI modification period 'N', TRS/CSI RS are transmitted by GNB in TRS/CSI RS occasions in the SI modification period 'N+1'
In another embodiment, if trsNotification set to 1 is received in the SI modification period 'N', TRS/CSI RS are transmitted by GNB in TRS/CSI RS occasions in the SI modification period 'N' and 'N+1'
In another embodiment, if trsNotification set to 1 is received, TRS/CSI RS are transmitted by GNB in TRS/CSI RS occasions which occurs after this notification until the trsNotification set to 0 is received or until the TRS/CSI RS configuration is removed from SIB X, whichever occurs first.
In another embodiment, if trsNotification set to 1 is received in the activation period 'N', TRS/CSI RS are transmitted by GNB in TRS/CSI RS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, TRS/CSI RS are transmitted by GNB in TRS/CSI RS occasions in 'X' activation periods from activation period 'N' or activation period 'N+1', where parameter X is signaled by gNB.

In another embodiment, if trsNotification set to 1 is received in the activation period 'N', TRS/CSI RS are transmitted by GNB in TRS/CSI RS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the activation period 'N', TRS/CSI RS are transmitted by GNB in TRS/CSI RS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the (default) DRX cycle 'N', TRS/CSI RS are transmitted by GNB in TRS/CSI RS occasions in the (default) DRX cycle 'N'. In an embodiment, TRS/CSI RS are transmitted by GNB in TRS/CSI RS occasions in 'X' DRX cycles from DRX cycle 'N' or DRX cycle 'N+1', where parameter X is signaled by gNB.

In another embodiment, if trsNotification set to 1 is received in the (default) DRX cycle 'N', TRS/CSI RS are transmitted by GNB in TRS/CSI RS occasions in the (default) DRX cycle 'N+1'

In another embodiment, if trsNotification set to 1 is received in the (default) DRX cycle 'N', TRS/CSI RS are transmitted by GNB in TRS/CSI RS occasions in the (default) DRX cycle 'N' and 'N+1'

Figure 7:
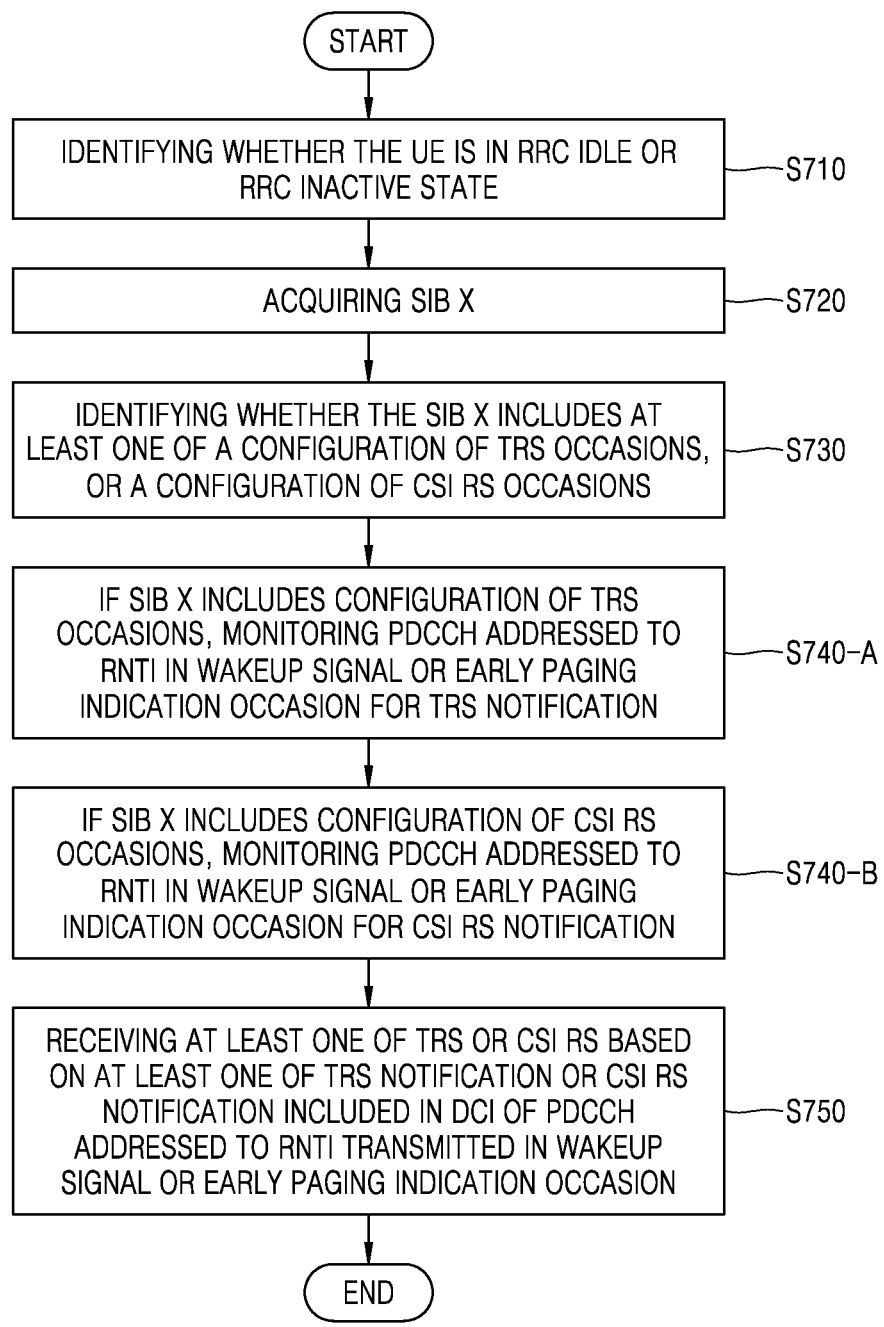
FIG. 7 illustrates a flowchart of a method performed by a UE to identify a separate notification for TRS and CSI RS in DCI of PDCCH addressed to RNTI transmitted in wakeup signal or early paging indication occasion according to embodiments of the present disclosure.

Embodiment 1-6: Separate Notification for TRS and CSI RS in DCI of PDCCH Addressed to RNTI Transmitted in Wakeup Signal or Early Paging Indication Occasion FIG. 7 illustrates a flowchart of a method performed by a UE to identify a separate notification for TRS and CSI RS in DCI of PDCCH addressed to RNTI transmitted in wakeup signal or early paging indication occasion according to embodiments of the present disclosure.

In an exemplary embodiment, new notifications (trsNotification and CsirsNotification) may be included in DCI of PDCCH addressed to RNTI transmitted in wakeup signal or early paging indication occasion. Early paging indication is transmitted in the PDCCH monitoring occasions for early paging indication before the PO. RNTI for early paging indication can be P-RNTI or any other pre-defined RNTI.

In step S710, the UE may identify whether the UE is in RRC IDLE or RRC INACTIVE state.

In step S720, the UE may acquire the SIB X. The SIB X may be the SIB which is used by GNB to configure TRS/CSI RS occasions to RRC IDLE UEs and RRC INACTIVE UEs.

In step S730, the UE may identify whether the SIB X includes at least one of configuration of TRS occasions, or configuration of CSI RS occasions.

In step S740-A, if SIB X includes configuration of TRS occasions:
  UE may monitor PDCCH addressed to RNTI in wakeup signal or early paging indication occasion for trsNotification In one embodiment, the UE may also monitor PDCCH addressed to P-RNTI in PO for trsNotification (e.g. in case trsNotification is not received in wakeup signal or early paging indication occasion) as in embodiment 1-4.

In step S740-B, If SIBX includes configuration of CSI RS occasions:
  UE monitors PDCCH addressed to RNTI in wakeup signal or early paging indication occasion for CsirsNotification In one embodiment, the UE may also monitor PDCCH addressed to P-RNTI in PO for CsirsNotification (e.g. in case CsirsNotification is not received in wakeup signal or early paging indication occasion) as in embodiment 1-5.

In step S750, UE may receive at least one of TRS or CSI RS based on at least one of trsNotification or CsirsNotification included in DCI of PDCCH addressed to RNTI transmitted in wakeup signal or early paging indication occasion by gNB. If UE receives PDCCH addressed to RNTI in wakeup signal or early paging indication occasion and DCI of received PDCCH includes at least one of trsNotification, or CsirsNotification,
  If trsNotification bit is set to 1, TRS are transmitted by GNB in TRS occasions according to following rule:
  In one embodiment, if trsNotification set to 1 is received in the SI modification period 'N', TRS are transmitted by GNB in TRS occasions in the SI modification period 'N'. In an embodiment, TRS are transmitted by GNB in TRS occasions in 'X' SI modification periods from SI modification period 'N' or SI modification period 'N+1', where parameter X is signaled by gNB.

In another embodiment, if trsNotification set to 1 is received in the SI modification period 'N', TRS are transmitted by GNB in TRS occasions in the SI modification period 'N+1'

In another embodiment, if trsNotification set to 1 is received in the SI modification period 'N', TRS are transmitted by GNB in TRS occasions in the SI modification period 'N' and 'N+1'

In another embodiment, if trsNotification set to 1 is received, TRS are transmitted by GNB in TRS occasions which occurs after this notification until the trsNotification set to 0 is received or until the TRS configuration is removed from SIB X, whichever occurs first.

In another embodiment, if trsNotification set to 1 is received in the activation period 'N', TRS are transmitted by GNB in TRS occasions in the activation period 'N'. Length of activation period in multiple of default DRX cycle or in units of slots/subframes/frames is signaled by gNB in SI. Activation period starts in SFN X where X mod activation period=0; or Activation period starts in SFN X where X mod activation period=offset where offset is also signaled by gNB in SI. In an embodiment, TRS are transmitted by GNB in TRS occasions in 'X' activation periods from activation period 'N' or activation period 'N+1', where parameter X is signaled by gNB.

In another embodiment, if trsNotification set to 1 is received in the activation period 'N', TRS are transmitted by GNB in TRS occasions in the activation period 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the activation period 'N', TRS are transmitted by GNB in TRS occasions in the activation period 'N' and 'N+1'. Length of activation period in multiple of default DRX cycle or in units of slots/subframes/frames is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if trsNotification set to 1 is received in the (default) DRX cycle 'N', TRS are transmitted by GNB in TRS occasions in the (default) DRX cycle 'N'. In an embodiment, TRS are transmitted by GNB in TRS occasions in 'X' DRX cycles from DRX cycle 'N' or DRX cycle 'N+1', where parameter X is signaled by gNB.

In another embodiment, if trsNotification set to 1 is received in the (default) DRX cycle 'N', TRS are transmitted by GNB in TRS occasions in the (default) DRX cycle 'N+1'

In another embodiment, if trsNotification set to 1 is received in the (default) DRX cycle 'N', TRS are transmitted by GNB in TRS occasions in the (default) DRX cycle 'N' and 'N+1'

If CsirsNotification bit is set to 1, CSI RS are transmitted by GNB in CSI RS occasions according to following rule:

In one embodiment, if CsirsNotification set to 1 is received in the SI modification period 'N', TRS are transmitted by GNB in TRS occasions in the SI modification period 'N'. In an embodiment, TRS are transmitted by GNB in TRS occasions in 'X' SI modification periods from SI modification period 'N' or SI modification period 'N+1', where parameter X is signaled by gNB.

In another embodiment, if CsirsNotification set to 1 is received in the SI modification period 'N', CSI RS are transmitted by GNB in CSI RS occasions in the SI modification period 'N+1'

In another embodiment, if CsirsNotification set to 1 is received in the SI modification period 'N', CSI RS are transmitted by GNB in CSI RS occasions in the SI modification period 'N' and 'N+1'

In another embodiment, if CsirsNotification set to 1 is received, TRS are transmitted by GNB in CSI RS occasions which occurs after this notification until the CsirsNotification set to 0 is received or until the CSI RS configuration is removed from SIB X, whichever occurs first.

In another embodiment, if CsirsNotification set to 1 is received in the activation period 'N', CSI RS are transmitted by GNB in CSI RS occasions in the activation period 'N'. Length of activation period in multiple of default DRX cycle is signaled by gNB in SI. Activation period starts in SFN X where X mod activation period=0; or Activation period starts in SFN X where X mod activation period=offset where offset is also signaled by gNB in SI. In an embodiment, CSI RS are transmitted by GNB in CSI RS occasions in 'X' activation periods from activation period 'N' or activation period 'N+1', where parameter X is signaled by gNB.

In another embodiment, if CsirsNotification set to 1 is received in the activation period 'N', CSI RS are transmitted by GNB in CSI RS occasions in the activation period 'N+1'. Length of activation period in multiple of default DRX cycle is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if CsirsNotification set to 1 is received in the activation period 'N', CSI RS are transmitted by GNB in CSI RS occasions in the activation period 'N' and 'N+1'. Length of activation period in multiple of default DRX cycle is signaled by gNB in SI. Length of default DRX cycle is also signaled by gNB in SI. Activation period starts in SFN X where X mod activation period=0 or Activation period starts in SFN X where X mod activation period=offset where offset is also signaled by gNB in SI.

In another embodiment, if CsirsNotification set to 1 is received in the (default) DRX cycle 'N', CSI RS are transmitted by GNB in CSI RS occasions in the (default) DRX cycle 'N'. In an embodiment, CSI RS are transmitted by GNB in CSI RS occasions in 'X' DRX cycles from DRX cycle 'N' or DRX cycle 'N+1', where parameter X is signaled by gNB.

In another embodiment, if CsirsNotification set to 1 is received in the (default) DRX cycle 'N', CSI RS are transmitted by GNB in CSI RS occasions in the (default) DRX cycle 'N+1'

In another embodiment, if CsirsNotification set to 1 is received in the (default) DRX cycle 'N', CSI RS are transmitted by GNB in CSI RS occasions in the (default) DRX cycle 'N' and 'N+1'

<Early Paging Indication with Resource Information of Paging Message>

UE receives wakeup signal or early paging indication configuration from gNB for paging monitoring. Configuration can be received in system information or RRC signaling message. In an embodiment, the configuration is cell specific and UE applies the configuration to DL BWP in which UE monitors paging. In an embodiment, the configuration is BWP specific. For example, separate configuration is provided for each BWP in which paging is supported. In an embodiment, the configuration is provided only for initial DL BWP and UE uses it for receiving wakeup signal or early paging indication in initial DL BWP. In this case UE does not monitor wakeup signal or early paging indication in other DL BWPs. The configuration indicates the time occasions (or wakeup signal monitoring occasions or early paging indication monitoring occasions) and/or frequency domain resources (i.e. PRBs). The configuration includes, the length of one wakeup signal or early paging indication monitoring occasion in number of OFDM symbols, number of wakeup signal or early paging indication monitoring occasions per slot, number of slots carrying wakeup signal or early paging indication monitoring occasions, offset of first slot carrying wakeup signal or early paging indication monitoring occasions where offset is with respect to start of the paging frame (PF) or the start of paging occasion (PO). Note that wakeup signal or early paging indication precedes the PF and PO. The wakeup signal or early paging indication can be a PDCCH addressed to pre-defined RNTI or an RNTI signaled by gNB for early paging indication. In this case the wakeup signal monitoring occasion or early paging indication monitoring occasions can also be referred as PDCCH monitoring occasions for early paging indication. The PDCCH monitoring occasions for early paging indication or wakeup signal can be indicated by search space parameters. A list of search space configurations can be signaled by GNB. The search configuration to be used for early paging indication or wakeup signal can be signaled by gNB. gNB can indicate search space ID of search space configuration to be used for early paging indication or wakeup signal.

There can be a set of one or more wakeup signal monitoring occasions or early paging indication monitoring occasions or PDCCH monitoring occasions for early paging indication. UE monitors wakeup signal or paging early indication or PDCCH for early paging indication in this set of monitoring occasions. Each wakeup signal monitoring occasion or early paging indication monitoring occasion or PDCCH monitoring occasion for early paging indication in the set is associated with an SSB. This set can be per paging frame or per paging occasion. If the set is per paging frame, UEs belonging to different PO of the paging frame will monitor same set of wakeup signal monitoring occasions or early paging indication monitoring occasions or PDCCH monitoring occasions for early paging indication. If the set is per PO, UEs belonging to different PO of the paging frame monitor different set of wakeup signal monitoring occasions or early paging indication monitoring occasions or PDCCH monitoring occasions for early paging indication. Depending on the configuration it is possible several POs or PFs may have the same set of monitoring occasions for wakeup signal or early paging indication or for PDCCH of early paging indication.

The set of wakeup signal monitoring occasions or early paging indication monitoring occasions or PDCCH monitoring occasions for early paging indication consists of 'S*X' monitoring occasions. Parameter S and X are signaled by gNB. S is the number of transmitted SSBs and X is the number of monitoring occasion per SSB. If X is not signaled, X is assumed to be 1. The SSBs are sequentially mapped to 'S*X' monitoring occasions such that each SSB is mapped to a subset of "X" monitoring occasions sequentially. For example, if there are 4 SSB and X equals 2, first two monitoring occasions in set are mapped to first transmitted SSB, next two monitoring occasions in set are mapped to $2^{nd}$ transmitted SSB, next two monitoring occasions in set are mapped to 3rd transmitted SSB and so on.

Alternately, the set of wakeup signal monitoring occasions or early paging indication monitoring occasions or PDCCH monitoring occasions for early paging indication consists of 'S' monitoring occasions. Parameter S is signaled by gNB. S is the number of transmitted SSBs. Each transmitted SSB is sequentially mapped to these monitoring occasions in ascending order of SSB index.

The monitoring occasions overlapping with UL symbols are considered invalid. UE can identify the UL symbols based TDD configuration received from gNB. UE identifies its set of wakeup signal monitoring occasions or early paging indication monitoring occasions or PDCCH monitoring occasions for early paging indication from the valid monitoring occasions.

The valid wakeup signal monitoring occasions starting from the slot which is at an 'offset' before the start of PF (or PO in another embodiment) and in between this slot and start of PF (or PO in another embodiment) are sequentially numbered/indexed. The 'S*X' or 'S' monitoring occasions in ascending order are then used for monitoring wakeup signal or early paging indication or PDCCH for early paging indication.

The earliest set of 'S*X' valid monitoring occasions which is at an offset before the PF (in one embodiment) or PO (in another embodiment) are the monitoring occasions for monitoring wakeup signal or early paging indication or PDCCH for early paging indication. In an embodiment X is always 1.

Alternately, earliest set of 'S*X' valid monitoring occasions where the first monitoring occasion starts after an offset before the PF (in one embodiment) or PO (in another embodiment) are the monitoring occasions for monitoring wakeup signal or early paging indication or PDCCH for early paging indication. In an embodiment X is always 1.

Alternately, valid monitoring occasions before the PF (in one embodiment) or PO (in another embodiment) are sequentially numbered/indexed. The first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication.

Alternately, valid monitoring occasions before the PF (in one embodiment) or PO (in another embodiment) within a timer interval (duration) are sequentially numbered/indexed. The first occasion number is signaled by gNB. In case monitoring is per PO, starting occasion number is signaled for each PO of a PF. The earliest set of 'S*X' monitoring occasions from first occasion are the monitoring occasions for monitoring wakeup signal or early paging indication or PDCCH for early paging indication. The timer interval duration can be signaled by gNB or the timer interval duration can be timer interval between two PFs or the timer interval duration can be equal to SSB period or the timer interval duration can be equal to multiple of SSB period where SSB period is signaled by gNB.

Alternately, monitoring occasions for monitoring wakeup signal or early paging indication or PDCCH for early paging indication are the valid monitoring occasions in first 'duration' slots after an offset before the PF (in one embodiment) or PO (in another embodiment). Monitoring occasions according to search space occurs for duration slots periodically where duration and period are configured in search space configuration.

Alternately, monitoring occasions for monitoring wakeup signal or early paging indication or PDCCH for early paging indication are the 'S*X' consecutive valid monitoring occasions starting from first 'duration' slots after an offset before the PF (in one embodiment) or PO (in another embodiment). Monitoring occasions according to search space occurs for duration slots periodically where duration and period are configured in search space configuration.

Alternately, monitoring occasion for wakeup signal or early paging indication or PDCCH for early paging indication is same as the occasions where SSBs are transmitted in time domain. In frequency domain the PRBs for monitoring occasions are FDMed with SSB PRBs. The exact PRBs are signaled for monitoring occasions are signaled by gNB. UE monitors wakeup signal or early paging indication or PDCCH for early paging indication in the monitoring occasions of Nth SSB period before the start of PF (in one embodiment) or PO (in another embodiment). N can be pre-defined or signaled by gNB. Alternately, UE monitors wakeup signal or early paging indication or PDCCH for early paging indication in the monitoring occasions of Nth SSB period after an offset before the start of PF (in one embodiment) or PO (in another embodiment). N can be pre-defined or signaled by gNB.

UE also receives the paging configuration from gNB and determines UE's PF/PO as explained earlier every DRX cycle.

UE determines the Wakeup signal occasion(s) or early paging indication monitoring occasions or PDCCH monitoring occasions for early paging indication corresponding to UE's determined PF/PO. If the wakeup signal or early paging indication is received or PDCCH for early paging indication is received in determined monitoring occasions and the wakeup signal or early paging indication indicates that paging is there for UE, UE monitor UE's PO or UE monitors the PDCCH addressed to P-RNTI in UE's PO. Otherwise UE does not monitor the PO. This operation is performed by UE for its PO every DRX cycle. Note that UE needs to monitor PO i.e. receive and decode PDCCH addressed to P-RNTI in PO as the scheduling information for paging message is there in DCI of PDCCH transmitted in PO.

In order to reduce power consumption of UE, it is proposed to include scheduling information for paging message in DCI of wakeup signal or early paging indication. Upon receiving the early paging indication in monitoring occasions for early paging indication, UE does not need to monitor its PO for scheduling message for paging message.

Figure 8:
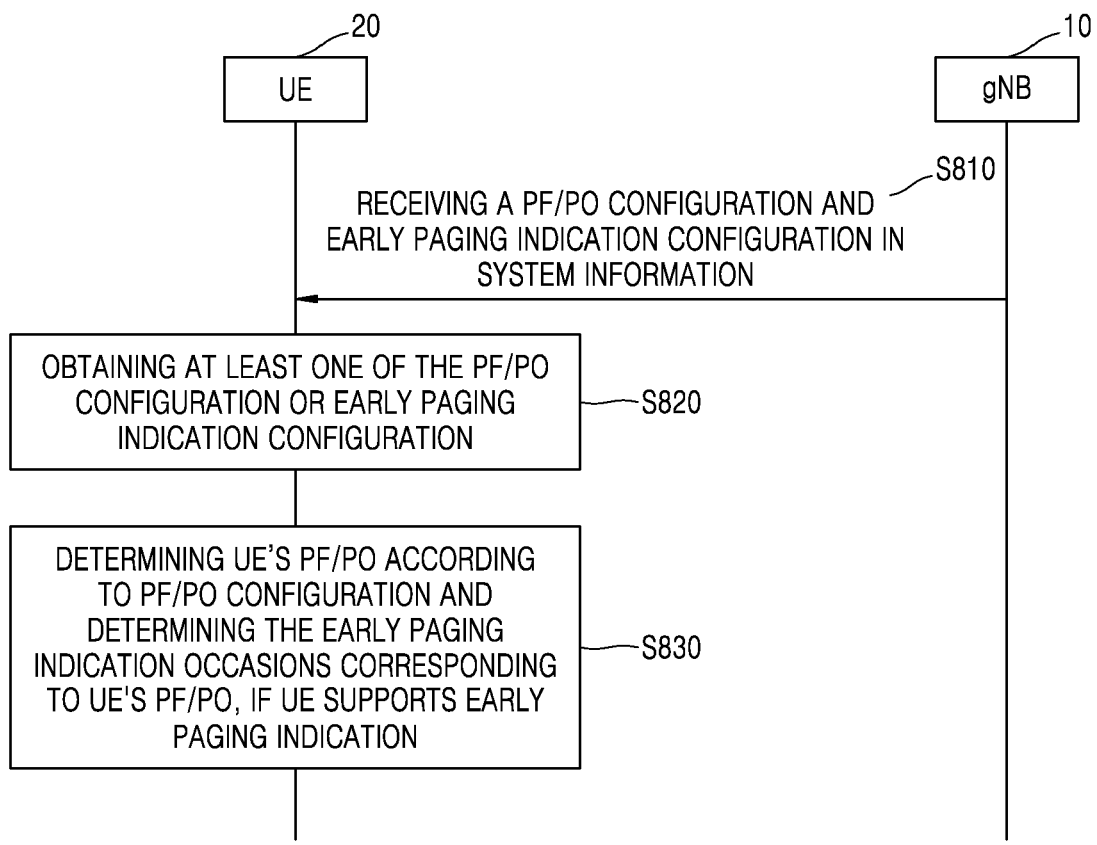
FIG. 8 illustrates a diagram of a method for transmitting and receiving scheduling information for a paging message in DCI of wakeup signal or early paging indication according to embodiments of the present disclosure.

FIG. 8 illustrates a diagram of a method for transmitting and receiving scheduling information for a paging message in DCI of wakeup signal or early paging indication according to embodiments of the present disclosure.

In step S810, gNB may transmit PF/PO configuration and early paging indication configuration.

1. gNB may transmit PF/PO configuration and early paging indication configuration in system information.
2. If paging is there for one or more UEs:
    gNB transmits a first PDCCH addressed to first RNTI in first set of PDCCH monitoring occasion(s), wherein these PDCCH monitoring occasions occurs before the paging occasion.
    gNB transmits second PDCCH addressed to second RNTI in second set of PDCCH monitoring occasion(s), wherein these PDCCH monitoring occasions are the monitoring occasions of PO.
    The DCI of first PDCCH includes scheduling information for paging message where scheduling information includes Frequency domain resource assignment, Time domain resource assignment, VRB-to-PRB mapping, Modulation and coding scheme, TB scaling. The time domain resource assignment is with respect to slot in which DCI of first PDCCH is received. DCI of first PDCCH also includes paging group/subgroup info which indicates which indicates the paging group(s)/subgroup(s) for which paging is there. DCI of first PDCCH may also include short message or SI update notification or emergency notification etc.
    The DCI of second PDCCH includes scheduling information for paging message where scheduling information includes Frequency domain resource assignment, Time domain resource assignment, VRB-to-PRB mapping, Modulation and coding scheme, TB scaling. The time domain resource assignment is with respect to slot in which DCI of second PDCCH is received. DCI of second PDCCH may also include short message or SI update notification or emergency notification etc.

Figure 9:
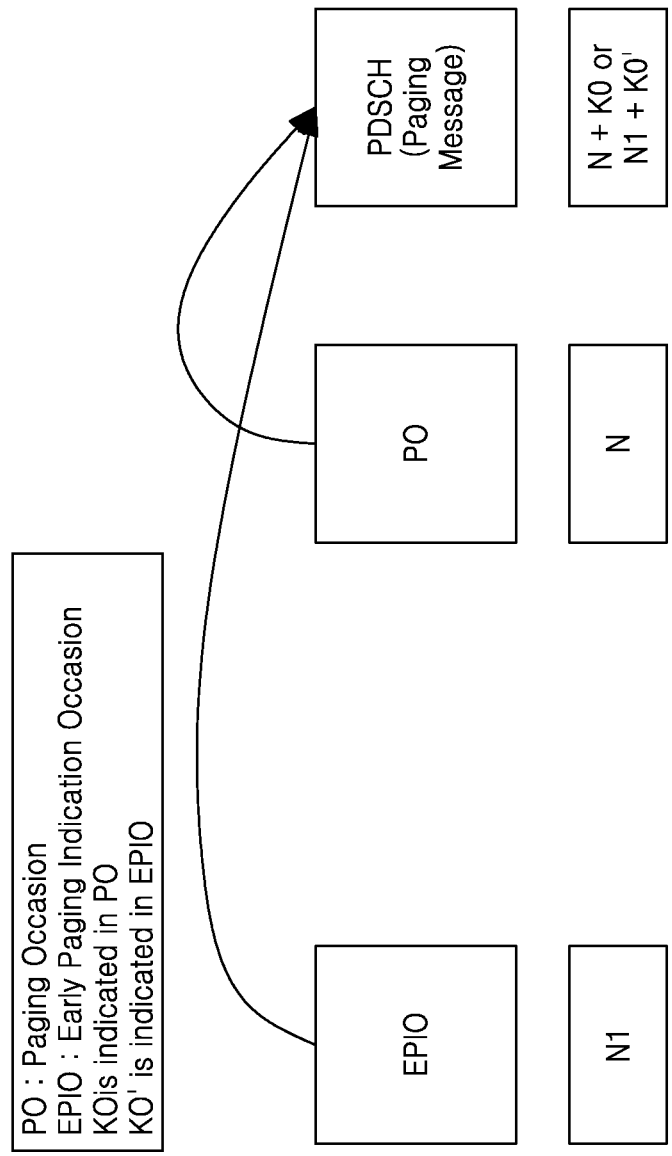
FIG. 9 illustrates a diagram for a case using the scheduling information in DCI of first PDCCH and scheduling information in DCI of second PDCCH for a paging message according to embodiments of the present disclosure.

FIG. 9 illustrates a diagram for a case using the scheduling information in DCI of first PDCCH and scheduling information in DCI of second PDCCH for a paging message according to embodiments of the present disclosure.

In an embodiment, the scheduling information in DCI of first PDCCH and scheduling information in DCI of second PDCCH is such that time and frequency domain resources, VRB-to-PRB mapping, Modulation and coding scheme, TB scaling are for the same scheduled paging message (or in other words corresponds to same TB). This is shown in FIG. 8. The advantage is that paging identity for UEs supporting early paging indication and not supporting early paging indication can be included in same paging message.

Figure 10:
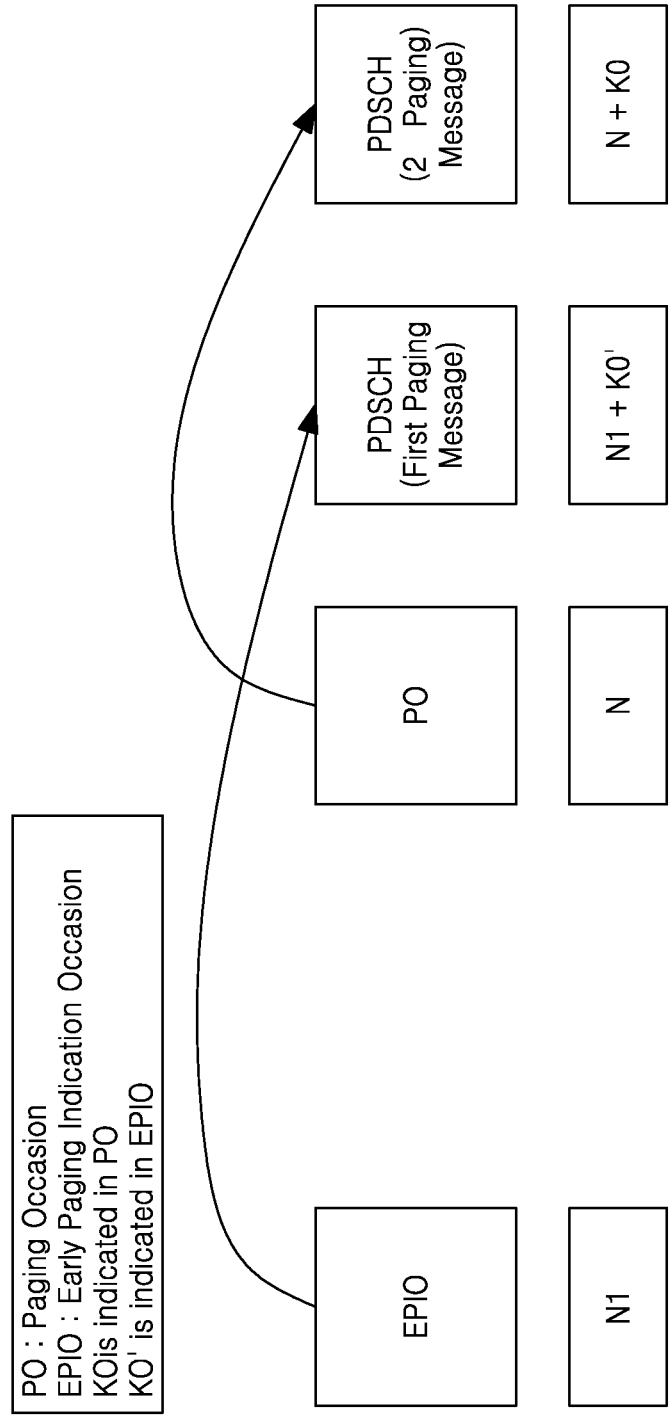
FIG. 10 illustrates a diagram for a case using the scheduling information in DCI of first PDCCH and scheduling information in DCI of the second PDCCH for paging messages respectively according to embodiments of the present disclosure.

FIG. 10 illustrates a diagram for a case using the scheduling information in DCI of first PDCCH and scheduling information in DCI of the second PDCCH for paging messages respectively according to embodiments of the present disclosure.

In an embodiment, the scheduling information in DCI of first PDCCH and scheduling information in DCI of second PDCCH is for a first and second paging message respectively. The first paging message include paging identity for UEs supporting early paging indication. The second paging message include paging identity for UEs not supporting early paging indication.

2. UE Receives the System Information from gNB.

In step S820, UE may obtain at least one of the PF/PO configuration or early paging indication configuration. In an embodiment, UE may obtain the PF/PO configuration from received system information. If UE supports early paging indication, UE also obtains early paging indication configuration from received system information.

In step S830, UE may determine UE's PF/PO according to PF/PO configuration. If UE supports early paging indication, UE also determines the early paging indication occasions corresponding to UE's PF/PO.

If UE supports early paging indication, UE monitors first PDCCH addressed to first RNTI in early paging indication occasion(s).

if first PDCCH is received and DCI indicates paging corresponding to paging group/subgroup of UE, UE obtains the scheduling information for paging message from DCI of first PDCCH. UE receives paging message in resources according to scheduling information.

In an embodiment, if UE fails to receive first PDCCH, UE monitors second PDCCH addressed to second RNTI in PO. In an embodiment, gNB may indicate whether UE should monitor second PDCCH addressed to second RNTI in PO when UE fails to receive first PDCCH If UE does not support early paging indication, UE monitors second PDCCH addressed to second RNTI in PO.

if second PDCCH is received and short message indicator in DCI indicates that paging message is scheduled, UE obtains the scheduling information for paging message from DCI of second PDCCH. UE receives paging message in resources according to scheduling information.

<UE to Network Relay and Paging Aspects>

Remote UE uses the UE to network relay UE to receive paging from gNB. Remote UE may communicate with UE to network relay UE over PC5 interface (interface between UEs on which UEs communicate with each other using sidelink communication). UE to network relay UE is a UE which is in coverage of gNB and may be in RRC_IDLE or RRC_INACTIVE or in RRC_CONNECTED state.

Embodiment 2-1

Remote UE may send its UE_ID and DRX cycle T to UE to network relay UE.
  T is the UE specific DRX cycle configured to Remote UE by network using NAS signaling
  T is the UE specific Inactive state DRX cycle configured to Remote UE by RRC signaling when UE entered RRC INACTIVE state
  if UE specific DRX cycle is configured by NAS as well as RRC signaling, T is the minimum of both these DRX cycles.
  UE_ID is equal to 5G S-TMSI mod 1024. In alternate embodiments, instead of 1024, one of other values such as 2048, 3072, 4096, 5120, 6144, 1024*X where X is an integer, etc. may be used to determine UE_ID.

UE to network relay UE may receive the paging configuration (N, Ns, default DRX cycle length, paging search space (and CORESET) configuration) in system information or in BWP configuration from gNB.
  For monitoring paging for Remote UE, UE to network relay UE determine PF/PO as follows:
  The PF is the radio frame with system frame number 'SFN' which satisfies the equation (SFN+PF_offset) mod T1=(T 1 div N)*(UE_ID mod N), where UE_ID is the UE_ID received from Remote UE, T1 is minimum of [DRX cycle T received from Remote UE and default DRX cycle length received from gNB]
  Index (i_s), indicating the index of the PO is determined by i_s=floor(UE_ID/N) mod Ns.
  N: number of total paging frames received from gNB
  Ns: number of paging occasions for a PF received from gNB
  PF_offset: offset used for PF determination and is received from gNB
  UE_ID: received from remote UE
    UE to network relay UE may monitor PF/PO determined above for receiving paging for Remote UE
    Upon receiving PDCCH addressed to P-RNTI in PO, UE to network relay UE may decode the TB scheduled by PDCCH and obtain the paging message from decoded TB.
  UE to network relay UE may forward the received paging message to Remote UE Embodiment 2-2

Remote UE send UE's UE_ID, DRX cycle T and paging identity (5G S-TMSI and/or I-RNTI) to UE to network relay UE. UE_ID can be skipped in an embodiment.
  T is the UE specific DRX cycle configured to Remote UE by network using NAS signaling
  T is the UE specific Inactive state DRX cycle configured to Remote UE by RRC signaling when UE entered RRC INACTIVE state
  if UE specific DRX cycle is configured by NAS as well as RRC signaling, T is the minimum of both these DRX cycles.
  UE_ID is equal to 5G S-TMSI mod 1024. In alternate embodiments, instead of 1024, one of other values such as 2048, 3072, 4096, 5120, 6144, 1024*X where X is an integer, etc. may be used to determine UE_ID.

In an embodiment, if Remote UE is in RRC_INACTIVE state, Remote UE can send indicator to UE to network relay UE, indicating to monitor PO with same index (i_s) as in RRC_IDLE case. In this case, Remote UE also sends to UE to network relay UE, UE specific DRX cycle configured to Remote UE by network using NAS signaling. In an embodiment, if Remote UE is in RRC_INACTIVE state and network supports monitor PO in RRC_INACTIVE with same index (i_s) as in RRC_IDLE, Remote UE can send indicator to UE to network relay UE, indicating to monitor PO with same index (i_s) as in RRC_IDLE case. In this case, Remote UE also sends to UE to network relay UE, UE specific DRX cycle configured to Remote UE by network using NAS signaling. Remote UE can know that network supports monitor PO in RRC_INACTIVE with same index (i_s) as in RRC_IDLE, via the system information which Remote UE has received from network or from UE to network Relay UE (UE to network Relay UE can receive the system information from gNB and forward the same to Remote UE), or via the RRCRelease message received by Remote UE from GNB. Remote UE may receive RRCRelease from gNB when the Remote UE was in RRC_CONNECTED state.

UE to network relay UE may receive the paging configuration (N, Ns, default DRX cycle length, paging search space (and CORESET) configuration) in system information or in BWP configuration from gNB.
  For monitoring paging for Remote UE, UE to network relay UE may determine PF/PO as follows:
  The PF is the radio frame with system frame number 'SFN' which satisfies the equation (SFN+PF_offset) mod T1=(T 1 div N)*(UE_ID mod N), where UE_ID is the UE_ID received from Remote UE, T1 is minimum of [DRX cycle T received from Remote UE and default DRX cycle length received from gNB]
  Index (i_s), indicating the index of the PO is determined by i_s=floor(UE_ID/N) mod Ns. N is signalled by network in terms of DRX cycle length (e.g. DRX cycle length, DRX cycle length/2, DRX cycle length/4, DRX cycle length/8, DRX cycle length/16). For calculating i_s, DRX cycle length is set to T1.
  If UE to network relay UE has received indication indicating to monitor PO with same index (i_s) as in RRC_IDLE from Remote UE and system information received from gNB by UE to network relay UE incudes indication to monitor PO in RRC_INACTIVE with same index as in RRC IDLE (or alternately, if UE to network relay UE has received indication indicating to monitor PO with same index (i_s) as in RRC_IDLE from Remote UE and system information received from gNB by UE to network relay UE incudes indication to monitor PO in RRC_INACTIVE with same index as in RRC IDLE, and Ns>1, and T1 is not equal to T2):
  Index (i_s), indicating the index of the PO is determined by i_s=floor(UE_ID/N) mod Ns where N is signalled by network in terms of DRX cycle length (e.g. DRX cycle length, DRX cycle length/2, DRX cycle length/4, DRX cycle length/8, DRX cycle length/16). For calculating i_s, DRX cycle length is set to T2 where T2=. minimum of [UE specific DRX cycle configured to Remote UE by network using NAS signaling and default DRX cycle length received from gNB]. UE specific DRX cycle configured to Remote UE by network using NAS signaling is received by UE to network relay UE from Remote UE.
- N: number of total paging frames received from gNB, signalled by network in terms of DRX cycle length (e.g. DRX cycle length, DRX cycle length/2, DRX cycle length/4, DRX cycle length/8, DRX cycle length/16)
- Ns: number of paging occasions for a PF received from gNB
- PF_offset: offset used for PF determination and is received from gNB
- UE_ID: received from remote UE or UE_ID equals to 5G S-TMSI received from Remote UE mod 1024. In alternate embodiments, instead of 1024, one of other values such as 2048, 3072, 4096, 5120, 6144, 1024*X where X is an integer, etc. may be used to determine UE_ID.
  - UE to network relay UE may monitor PF/PO determined above for receiving paging for Remote UE
  - Upon receiving PDCCH addressed to P-RNTI in PO, UE to network relay UE may decode the TB scheduled by PDCCH and obtains the paging message from decoded TB.
  - UE to network relay UE may check whether the received paging message includes UE's paging identity where paging identity is received from Remote UE.
- If received paging message includes UE's paging identity, UE to network relay UE may indicate to Remote UE that there is paging for it. If Remote UE has sent both 5G S-TMSI and I-RNTI to UE to network relay UE, UE to network relay UE can indicate that paging is CN paging if UE's 5GS TMSI is included in received paging message; UE to network relay UE can indicate that paging is RAN paging if UE's I-RNTI is included in received paging message Embodiment 2-3

UE to network relay UE may receive the paging configuration (N, Ns, default DRX cycle length, paging search space (and CORESET) configuration) in system information or in BWP configuration from gNB.

UE to network relay UE sends the paging configuration or default DRX cycle length to Remote UE.

Remote UE send its UE_ID and DRX cycle T to UE to network relay UE. UE_ID can be skipped in an embodiment.
- In RRC_INACTIVE state, T is determined by the shortest of the UE specific DRX value configured by RRC, UE specific DRX value configured by NAS, and a default DRX value received from UE to network relay UE.
- In RRC_IDLE state, T is determined by the shortest of UE specific DRX value configured by NAS, and a default DRX value received from UE to network relay UE. If UE specific DRX is not configured by upper layers (i.e. NAS), the default value is applied.
- UE_ID is equal to 5GS TMSI mod 1024. In alternate embodiments, instead of 1024, one of other values such as 2048, 3072, 4096, 5120, 6144, 1024*X where X is an integer, etc. may be used to determine UE_ID.

UE to network relay UE receives the paging configuration (N, Ns, default DRX cycle length, paging search space (and CORESET) configuration) in system information or in BWP configuration from gNB.
- For monitoring paging for Remote UE, UE to network relay UE determine PF/PO as follows:
- The PF is the radio frame with system frame number 'SFN' which satisfies the equation (SFN+PF_offset) mod T1=(T 1 div N)*(UE_ID mod N), where UE_ID is the UE_ID received from Remote UE, T1 DRX cycle length received from UE
- Index (i_s), indicating the index of the PO is determined by i_s=floor(UE_ID/N) mod Ns.
- N: number of total paging frames received from gNB, signalled by network in terms of DRX cycle length (e.g. DRX cycle length, DRX cycle length/2, DRX cycle length/4, DRX cycle length/8, DRX cycle length/16)
- Ns: number of paging occasions for a PF received from gNB
- PF_offset: offset used for PF determination and is received from gNB
- UE_ID: received from remote UE or UE_ID equals to 5G S-TMSI received from Remote UE mod 1024. In alternate embodiments, instead of 1024, one of other values such as 2048, 3072, 4096, 5120, 6144, 1024*X where X is an integer, etc. may be used to determine UE_ID.
  - UE to network relay UE may monitor PF/PO determined above for receiving paging for Remote UE
  - Upon receiving PDCCH addressed to P-RNTI in PO, UE to network relay UE may decode the TB scheduled by PDCCH and obtain the paging message from decoded TB.
  - UE to network relay UE may forward the received paging message to Remote UE.

Embodiment 2-4

UE to network relay UE may receive the paging configuration (N, Ns, default DRX cycle length, paging search space (and CORESET) configuration) in system information or in BWP configuration from gNB.

UE to network relay UE may send the paging configuration or default DRX cycle length to Remote UE.

Remote UE may send Remote UE's UE_ID, DRX cycle T and paging identity (5G S-TMSI and/or I-RNTI) to UE to network relay UE.
- In RRC_INACTIVE state, T is determined by the shortest of the UE specific DRX value configured by RRC, UE specific DRX value configured by NAS, and a default DRX value received from UE to network relay UE.
- In RRC_IDLE state, T is determined by the shortest of UE specific DRX value configured by NAS, and a default DRX value received from UE to network relay UE. If UE specific DRX is not configured by upper layers (i.e. NAS), the default value is applied.
- UE ID is equal to 5G S-TMSI mod 1024. In alternate embodiments, instead of 1024, one of other values such as 2048, 3072, 4096, 5120, 6144, 1024*X where X is an integer, etc. may be used to determine UE_ID.

UE to network relay UE may receive the paging configuration (N, Ns, default DRX cycle length, paging search space (and CORESET) configuration) in system information or in BWP configuration from gNB.
- For monitoring paging for Remote UE, UE to network relay UE may determine PF/PO as follows:
- The PF is the radio frame with system frame number 'SFN' which satisfies the equation (SFN+PF_offset) mod T1=(T 1 div N)*(UE_ID mod N), where UE_ID is the UE_ID received from Remote UE, T1 DRX cycle length received from UE Index (i_s), indicating the index of the PO is determined by i_s=floor(UE_ID/N) mod Ns.

N: number of total paging frames received from gNB

Ns: number of paging occasions for a PF received from gNB

PF_offset: offset used for PF determination and is received from gNB

UE_ID: received from remote UE

UE to network relay UE may monitor PF/PO determined above for receiving paging for Remote UE Upon receiving PDCCH addressed to P-RNTI in PO, UE to network relay UE may decode the TB scheduled by PDCCH and obtain the paging message from decoded TB.

UE to network relay UE may check whether the received paging message includes UE's paging identity where paging identity is received from Remote UE.

If received paging message includes UE's paging identity, UE to network relay UE indicates to Remote UE that there is paging for it. If Remote UE has sent both 5G S-TMSI and I-RNTI to UE to network relay UE, UE to network relay UE can indicate to Remote UE that paging is CN paging if Remote UE's 5G S-TMSI is included in received paging message; UE to network relay UE can indicate to Remote UE that paging is RAN paging if UE's I-RNTI is included in received paging message.

If the UE to network relay UE is in RRC CONNECTED, upon receiving request from Remote UE to monitor paging or for monitoring paging for remote UE, UE to network relay UE may inform gNB that it needs to monitor paging for Remote UE. gNB ensures that active BWP of UE to network relay UE is configured with search space (and CORESET) for monitoring paging. Note that UE to network relay UE monitors paging in UE to network relay UE's active BWP when active BWP of UE to network relay UE is configured with search space for monitoring paging.

Alternately, UE to network relay UE may inform the gNB about the paging identities of Remote UE's which, UE to network relay UE intends to monitor. gNB ensures that active BWP of UE to network relay UE is configured with search space for monitoring paging (i.e. common search space and corset for paging) or (e.g. if active BWP of UE to network relay UE is not configured with search space for monitoring paging) gNB can indicate to UE to network relay UE whenever there is paging for Remote UEs whose paging identities it has informed to gNB. gNB can send dedicated RRC message (PDCCH scheduling TB including dedicated RRC message is addressed to C-RNTI whereas PDCCH scheduling TB including paging message is addressed to P-RNTI) which includes paging identities of one or more paged UEs where paged UEs are those whose paging identities were informed to GNB by UE to network relay UE. In one embodiment, instead of paging identity, gNB can indicate the index of paging identity, where index refers to entry in the list of paging identities sent by UE to network relay UE to gNB. For example, let's say UE to network relay UE has sent a list of 5 paging identities to gNB. These 5 paging identities can be index sequentially from 0 to 4. 0 refers to first entry in the list, 1 refers to second entry in the list and so on.

In an embodiment, UE to network relay UE can indicate whether it is in RRC IDLE or RRC INACTIVE or RRC CONNECTED in relay discovery message transmitted by it. Remote UE interested in UE to network relay for paging monitoring or if Remote UE is in RRC IDLE or RRC INACTIVE, it may prioritise selecting a relay UE from relay UEs which are not in RRC CONNECTED state.

Recently UE-to-Network Relaying architecture is being studied where a Relay UE relays the traffic between a Remote UE and network. The UE-to-Network Relay enables coverage extension and power saving for the Remote UE. The communication between UE-to-Network Relay and gNB is based on 5G communication between UE and gNB. The communication between Remote UE and UE-to-Network Relay UE is based on sidelink communication. The UE-to-Network Relay UE can relay the paging and system information to the Remote UE. For paging, Relay UE monitors the Remote UE's Paging Occasion(s) in addition to its own Paging Occasion(s). If Relay UE is in RRC_CONNECTED and pagingSearchSpace is not configured in the active DL BWP, Relay UE cannot monitor any PO. Hence it cannot relay paging.

Embodiment 3-1

Figure 11:
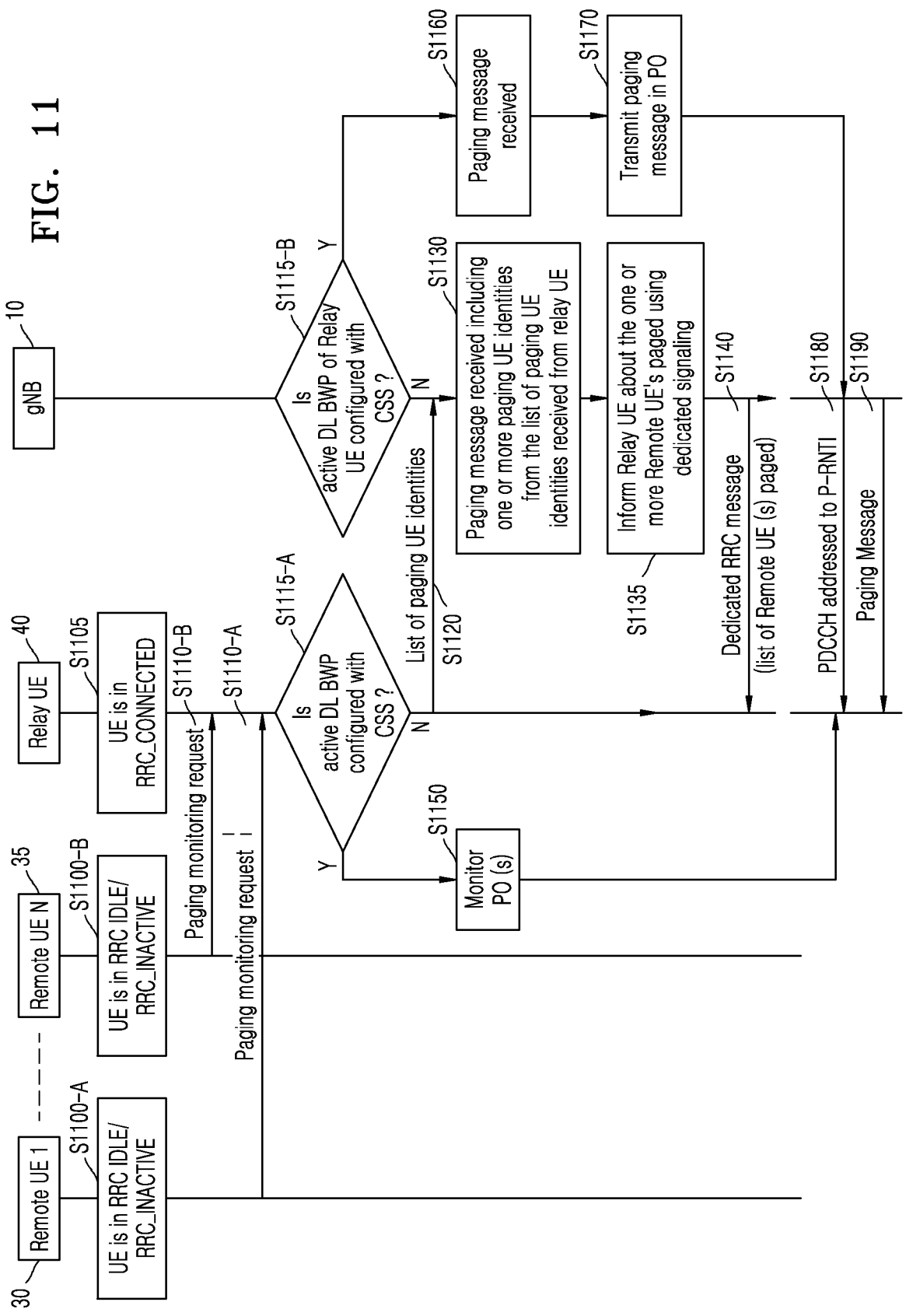
FIG. 11 illustrates a flowchart of a method for monitoring paging for Remote UE(s) according to embodiments of the present disclosure.

FIG. 11 illustrates a flowchart of a method for monitoring paging for Remote UE(s) according to embodiments of the present disclosure.

In one method of this disclosure (FIG. 11), the operation for monitoring paging for at least one Remote UE as follows:

At steps S1110-A and S1110-B, Remote UE(s) 30, 35 may transmit paging monitoring request to Relay UE 40.

For example, Remote UE(s) 30, 35 may send its 5G-S-TMSI to Relay UE 40 (also referred as UE to network relay UE); For example, Remote UE (s) 30, 35 may send its I-RNTI, if remote UE is in RRC_INACTIVE (referring to step S1100-A and S1100-B). These parameters can be sent by Remote UE 30, 35 to Relay UE 40 using RRC signaling message over sidelink signaling radio bearer (SL SLRB) or over sidelink data radio bearer. The signaling message carrying these parameters is transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In an embodiment, Relay UE 40 may be in RRC_CONNECTED state (referring to step S1105). In an embodiment, Relay UE 40 may receive the RRCReconfiguration message including DL BWP configuration(s).

At Step S1115-A, Relay UE 40 may check whether the active DL BWP is configured with search space for paging (i.e. parameter pagingSearchSpace (paging search space identifier) is signalled by gNB 10 in the DL BWP configuration). Search space for paging can also be referred as 'common search space and common corset for paging' or 'common search space' for paging.

If the active DL BWP of relay UE 40 is not configured with search space for paging (i.e. parameter pagingSearchSpace (paging search space identifier) is not signalled by gNB 10 in the DL BWP configuration):

a. At Step S1120, Relay UE 40 may send the list of paging identities (i.e. 5G-S-TMSI of Remote UE, I-RNTI of Remote UE) received from Remote UE(s) 30, 35 to gNB 10. For example, if Relay UE 40 is connected to two Remote UEs, Remote UE1 and Remote UE2, Relay UE receives, 5G-S-TMSI-1 and I-RNTI-1 from Remote UE1, 5G-S-TMSI-2 and I-RNTI-2 from Remote UE2, Relay UE 40 sends 5G-S-TMSI-1, I-RNTI-1 5G-S-TMSI-2, I-RNTI-2 to gNB 10. In an embodiment, gNB 10 can send two lists wherein one list includes 5G-S-TMSIs and second list includes I-RNTIs.
   b. At Step S1140, Relay UE 40 may receive dedicated RRC message including paging information of one or more Remote UE(s) 30, 35. The RRC message may be received over DCCH. The PDCCH scheduling TB including this RRC message is addressed to C-RNTI.
   In an embodiment, in step S1130, the paging information may include paging identities (5G-S-TMSI or I-RNTI) of one or more Remote UE(s) 30, 35.
      ii. In another embodiment, in step S1130, the paging information may include paging identity index (s) corresponding to paging identities in list of paging identities sent by Relay UE 40 to gNB 10.
      1. In an embodiment, each paging identity in the list of paging identities sent to gNB 10 by Relay UE 40 is indexed sequentially starting from zero. For example, if there are 4 entries in the list of paging identities, paging identity index of paging identity in first entry in list is zero, paging identity index of paging identity in second entry in list is one, paging identity index of paging identity in third entry in list is two, paging identity index of paging identity in fourth entry in list is three.
      2. In an embodiment, each paging identity in the list of paging identities sent to gNB 10 by Relay UE 40 is indexed sequentially starting from one. For example, if there are 4 entries in the list of paging identities, paging identity index of paging identity in first entry in list is one, paging identity index of paging identity in second entry in list is two, paging identity index of paging identity in third entry in list is three, paging identity index of paging identity in fourth entry in list is four.
      3. In an embodiment, Relay UE 40 can send paging identity index along with each paging identity
   If the active DL BWP of relay UE 40 is configured with search space for paging (i.e. parameter paging-SearchSpace (paging search space identifier) is signalled by gNB 10 in the DL BWP configuration):
      a. At step S1150, Relay UE 40 may monitor the Remote UE's PO for receiving paging for Remote UE.
      If 5G-S-TMSI is received from Remote UE and that 5G-S-TMSI (or corresponding paging identity index) is included in received paging message:
      Relay UE 40 may send CN paging indication to that Remote UE (using MAC CE or signalling message over sidelink signalling radio bearer or SCI). Relay UE may send 5G-S-TMSI to Remote UE.
      Access type (non3GPP) and/or paging cause received in paging message may also be sent to Remote UE.
      If I-RNTI is received from Remote UE and that I-RNTI (or corresponding paging identity index) is included in received paging message: Relay UE may send I-RNTI to Remote UE.
      Relay UE 40 may send RAN paging indication to that Remote UE (using MAC CE or signalling message over sidelink signalling radio bearer or SCI).
      Access type (non3GPP) and/or paging cause received in paging message may also be sent to Remote UE.
   gNB 10 operation: If the active DL BWP of relay UE 40 is not configured with search space for paging (i.e. parameter pagingSearchSpace (paging search space identifier) is not signalled by gNB 10 in the DL BWP configuration)
      a. If gNB 10 to which Relay UE 40 is connected, gNB 10 receives paging message for Remote UE(s) 30, 35. i.e. if gNB 10 receives paging message from CN or another GNB wherein the paging message includes one or more paging identities included in list of paging identities received from Relay UE 40, or if gNB receives DL data for the Remote UE in RRC_INACTIVE whose paging identity is received from relay UE In steps S1135-S1140, gNB 10 may send dedicated RRC message including paging information of Remote UE(s) 30, 35. The RRC message may be transmitted over DCCH. A MAC subheader may be included in the MAC PDU carrying the MAC SDU of this RRC message and LCID of DCCH is included in the MAC subheader. gNB 10 may transmit PDCCH addressed to C-RNTI and TB/MAC PDU carrying this RRC message on PDSCH.
   In an embodiment, in step S1130, the paging information may include paging identities (5G-S-TMSI, I-RNTI) of one or more Remote UE(s).
      ii. In another embodiment, in step S1130, the paging information may include paging identity index (s) corresponding to paging identities in list of paging identities sent by Relay UE 40 to gNB 10.
      1. In an embodiment, each paging identity in the list of paging identities sent to gNB 10 by Relay UE 40 is indexed sequentially starting from zero. For example, if there are 4 entries in the list of paging identities, paging identity index of paging identity in first entry in list is zero, paging identity index of paging identity in second entry in list is one, paging identity index of paging identity in third entry in list is two, paging identity index of paging identity in fourth entry in list is three.
      2. In an embodiment, each paging identity in the list of paging identities sent to gNB 10 by Relay UE 40 is indexed sequentially starting from one. For example, if there are 4 entries in the list of paging identities, paging identity index of paging identity in first entry in list is one, paging identity index of paging identity in second entry in list is two, paging identity index of paging identity in third entry in list is three, paging identity index of paging identity in fourth entry in list is four.
      3. In an embodiment, Relay UE 40 can send paging identity index along with each paging identity
      If the active DL BWP of relay UE 40 is configured with search space for paging (i.e. parameter paging-SearchSpace (paging search space identifier) is signalled by gNB 10 in the DL BWP configuration): gNB 10 may transmit paging message via PDCCH addressed to P-RNTI in PO and corresponding TB/MAC PDU carrying the paging message on PDSCH in steps S1170, S1180, and S1190. In this case MAC subheader is not included in the MAC PDU carrying the paging message MAC SDU.

Embodiment 3-2

Figure 12:
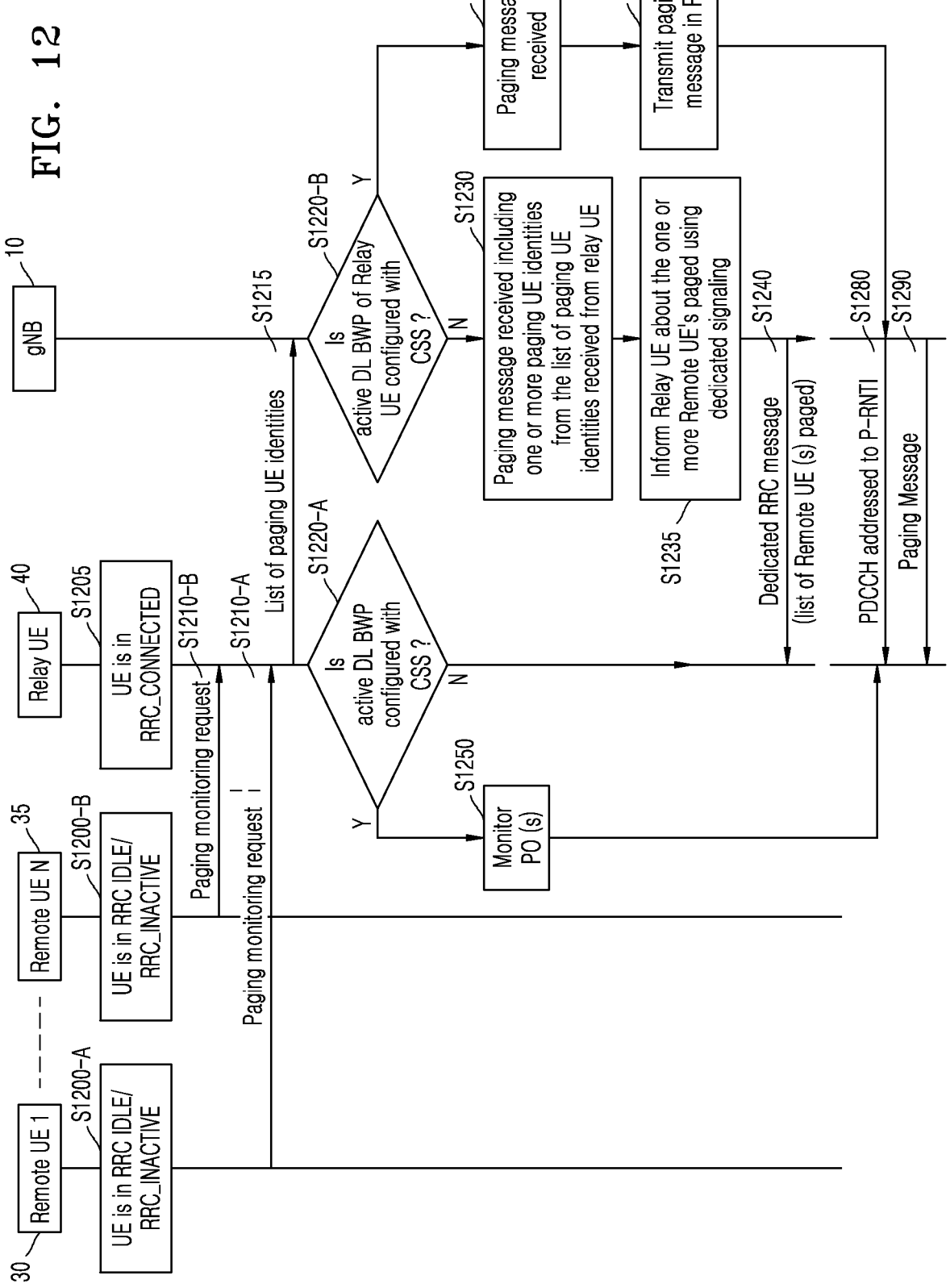
FIG. 12 illustrates a flowchart of a method for monitoring paging for Remote UE(s) according to embodiments of the present disclosure.

FIG. 12 illustrates a flowchart of a method for monitoring paging for Remote UE(s) according to embodiments of the present disclosure.

In one method of this disclosure (FIG. 12), the operation for monitoring paging for at least one Remote UE as follows:

At steps S1210-A and S1210-B, Remote UE(s) 30, 35 may transmit paging monitoring request to Relay UE 20.

For example, Remote UE(s) 30, 35 may send its 5G-S-TMSI to Relay UE 40; For example, Remote UE(s) 30, 35 may send its I-RNTI, if remote UE is in RRC_INACTIVE (referring to step S1100-a and S1100-b). These parameters can be sent by Remote UE 30, 35 to Relay UE 40 using RRC signaling message over sidelink signaling radio bearer (SL SLRB) or over sidelink data radio bearer. The signaling message carrying these parameters is transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In an embodiment, Relay UE 40 may be in RRC_CONNECTED state (referring to step S1205).

In an embodiment, Relay UE 40 may receive the RRCReconfiguration message including DL BWP configuration(s).

At Step S1215, Relay UE 40 may send the list of paging identities (i.e. 5G-S-TMSI of Remote UE, I-RNTI of Remote UE) received from Remote UE(s) 30, 35 to gNB 10. For example, if Relay UE 40 is connected to two Remote UEs, Remote UE1 and Remote UE2, Relay UE 40 receives, 5G-S-TMSI-1 and I-RNTI-1 from Remote UE1, 5G-S-TMSI-2 and I-RNTI-2 from Remote UE2, Relay UE 40 sends 5G-S-TMSI-1, I-RNTI-1 5G-S-TMSI-2, I-RNTI-2 to gNB 10. In an embodiment, gNB 10 can send two lists wherein one list includes 5G-S-TMSIs and second list includes I-RNTIs.

At Step S1220-A, Relay UE 40 may check whether the active DL BWP is configured with search space for paging (i.e. parameter pagingSearchSpace (paging search space identifier) is signalled by gNB 10 in the DL BWP configuration)

If the active DL BWP of relay UE 40 is not configured with search space for paging (i.e. parameter pagingSearchSpace (paging search space identifier) is not signalled by gNB 10 in the DL BWP configuration):
a. At Step S1240, Relay UE 40 may receive dedicated RRC message including paging information of one or more Remote UE(s) 30, 35. The RRC message may be received over DCCH.

In an embodiment, in step S1230, the paging information may include paging identities (5G-S-TMSI or I-RNTI) of one or more Remote UE(s).
  ii. In another embodiment, in step S1230, the paging information may include paging identity index (s) corresponding to paging identities in list of paging identities sent by Relay UE 40 to gNB 10.
  1. In an embodiment, each paging identity in the list of paging identities sent to gNB 10 by Relay UE 40 is indexed sequentially starting from zero. For example, if there are 4 entries in the list of paging identities, paging identity index of paging identity in first entry in list is zero, paging identity index of paging identity in second entry in list is one, paging identity index of paging identity in third entry in list is two, paging identity index of paging identity in fourth entry in list is three.
  2. In an embodiment, each paging identity in the list of paging identities sent to gNB 10 by Relay UE 40 is indexed sequentially starting from one. For example, if there are 4 entries in the list of paging identities, paging identity index of paging identity in first entry in list is one, paging identity index of paging identity in second entry in list is two, paging identity index of paging identity in third entry in list is three, paging identity index of paging identity in fourth entry in list is four.
  3. In an embodiment, Relay UE 40 can send paging identity index along with each paging identity
If the active DL BWP of relay UE 40 is configured with search space for paging (i.e. parameter paging-SearchSpace (paging search space identifier) is signalled by gNB 10 in the DL BWP configuration):
a. At step S1250, Relay UE 40 may monitor the Remote UE's PO for receiving paging for Remote UE.
If 5G-S-TMSI is received from Remote UE and that 5G-S-TMSI (or corresponding paging identity index) is included in received paging message
Relay UE 40 may send CN paging indication to that Remote UE (using MAC CE or signalling message over sidelink signalling radio bearer or SCI). Relay UE may send 5G-S-TMSI to Remote UE.
Access type (non3GPP) and/or paging cause received in paging message may also be sent to Remote UE
If I-RNTI is received from Remote UE and that I-RNTI (or corresponding paging identity index) is included in received paging message
Relay UE may send RAN paging indication to that Remote UE (using MAC CE or signalling message over sidelink signalling radio bearer or SCI). Relay UE may send I-RNTI to Remote UE.
Access type (non3GPP) and/or paging cause received in paging message may also be sent to Remote UE
gNB operation: If the active DL BWP of relay UE 40 is not configured with search space for paging (i.e. parameter pagingSearchSpace (paging search space identifier) is not signalled by gNB 10 in the DL BWP configuration)
a. If gNB 10 to which Relay UE 40 is connected, gNB 10 receives paging message for Remote UE(s) 30, 35. i.e. if gNB 10 receives paging message from CN or another GNB wherein the paging message includes one or more paging identities included in list of paging identities received from Relay UE 40 or if gNB receives DL data for the Remote UE in RRC_INACTIVE whose paging identity is received from relay UE: In steps S1235-S1240, gNB 10 may send dedicated RRC message including paging information of Remote UE(s) 30, 35. The RRC message may be transmitted over DCCH. A MAC subheader may be included in the MAC PDU carrying the MAC SDU of this RRC message and LCID of DCCH is included in the MAC subheader. gNB 10 may transmit PDCCH addressed to C-RNTI and TB/MAC PDU carrying this RRC message on PDSCH.

In an embodiment, in step S1230, the Paging information may include paging identities (5G-S-TMSI, I-RNTI) of one or more Remote UE(s).
  ii. In another embodiment, in step S1230, Paging information may include paging identity index (s) corresponding to paging identities in list of paging identities sent by Relay UE 40 to gNB 10.
  1. In an embodiment, each paging identity in the list of paging identities sent to gNB 10 by Relay UE 40 is indexed sequentially starting from zero. For example, if there are 4 entries in the list of paging identities, paging identity index of paging identity in first entry in list is zero, paging identity index of paging identity in second entry in list is one, paging identity index of paging identity in third entry in list is two, paging identity index of paging identity in fourth entry in list is three.
  2. In an embodiment, each paging identity in the list of paging identities sent to gNB 10 by Relay UE 40 is indexed sequentially starting from one. For example, if there are 4 entries in the list of paging identities, paging identity index of paging identity in first entry in list is one, paging identity index of paging identity in second entry in list is two, paging identity index of paging identity in third entry in list is three, paging identity index of paging identity in fourth entry in list is four.

3. In an embodiment, Relay UE 40 can send paging identity index along with each paging identity If the active DL BWP of relay UE 40 is configured with search space for paging (i.e. parameter pagingSearchSpace (paging search space identifier) is signalled by gNB 10 in the DL BWP configuration): gNB 10 may transmit paging message via PDCCH addressed to P-RNTI in PO and corresponding TB/MAC PDU carrying the paging message on PDSCH in steps S1270, S1280, and S1290. In this case MAC subheader is not included in the MAC PDU carrying the paging message MAC SDU.

In an alternate embodiment of Embodiment 3-1 and Embodiment 3-2:

In an embodiment, Remote UE 30 can inform new paging ID(s) (instead of 5G-S-TMSI/I-RNTI) to Relay UE 40.

There can be separate new paging ID for RRC IDLE and RRC INACTIVE.

new paging ID can be same for both RRC IDLE and RRC_INACTIVE

For example, in this case Remote UE can additionally indicate whether Remote UE wants to monitor RAN paging or not; or Remote UE can indicate its RRC state.

In an embodiment, Relay UE 40 may send the list of paging identities (i.e. new IDs) received from Remote UE(s) to gNB 10.

In an embodiment, Relay UE 40 will check for new paging ID (s) or corresponding paging identity indexes in received paging message from gNB 10 instead of I-RNTI/5G-S-TMSI of Remote UE.

Paging message from gNB 10 may indicate whether paging is RAN paging/CN paging (or UE state) if new paging ID is common for RRC IDLE and RRC_INACTIVE and is included in paging message.

In an embodiment, if new paging ID is received from Remote UE and that paging ID is included in received paging message Relay UE 40 may send paging indication to that Remote UE (using MAC CE or signalling message or SCI). Relay UE 40 may also indicate whether paging is RAN paging or CN paging.

Access type (non3GPP) and/or paging cause received in paging message may also be sent to Remote UE.

In the disclosure wherein the new paging ID is used instead of 5G-S-TMSI/I-RNTI, various aspects of new paging ID is as follows:

Option 1: CN Assigns the New ID

During registration or in RRC connected state (e.g. when UE is connected via relay UE), UE can request for new ID and network (i.e. AMF) can assign a new ID using NAS message.

For CN paging, AMF can include this new ID of remote UE instead of 5G-S-TMSI in paging message sent to the gNB 10. The gNB 10 then may include this in paging message transmitted in PDSCH.

For RAN paging, AMF can inform this new ID of remote UE to RAN (i.e. gNB) using RAN assistance information message and ID can then be stored in anchor gNB. The anchor gNB can include this new ID in paging message sent to another gNB. The gNB then includes this in paging message transmitted in PDSCH.

Option 2: RAN can Assign the New ID

When remote UE is connected state, remote UE can inform gNB 10 of remote UE's interest in relay operation and gNB 10 can assign the new ID.

When remote UE is Idle state:

when gNB 10 assigns ID to Remote UE in connected state, gNB 10 informs the UE's new ID to AMF. AMF stores the ID and links it with 5G-S-TMSI. In the CN paging message, AMF can include the ID of remote UE instead of 5G-S-TMSI in paging message sent to gNB 10. GNB 10 then may include this in paging message transmitted in PDSCH.

When remote UE is INACTIVE state:

For CN paging, operation can be as explained in case of Idle state

For RAN paging, new ID can be stored in anchor gNB. Anchor gNB can include the new ID in paging message sent to another gNB. GNB then includes this in paging message transmitted in PDSCH.

Embodiment 3-3

Figure 13:
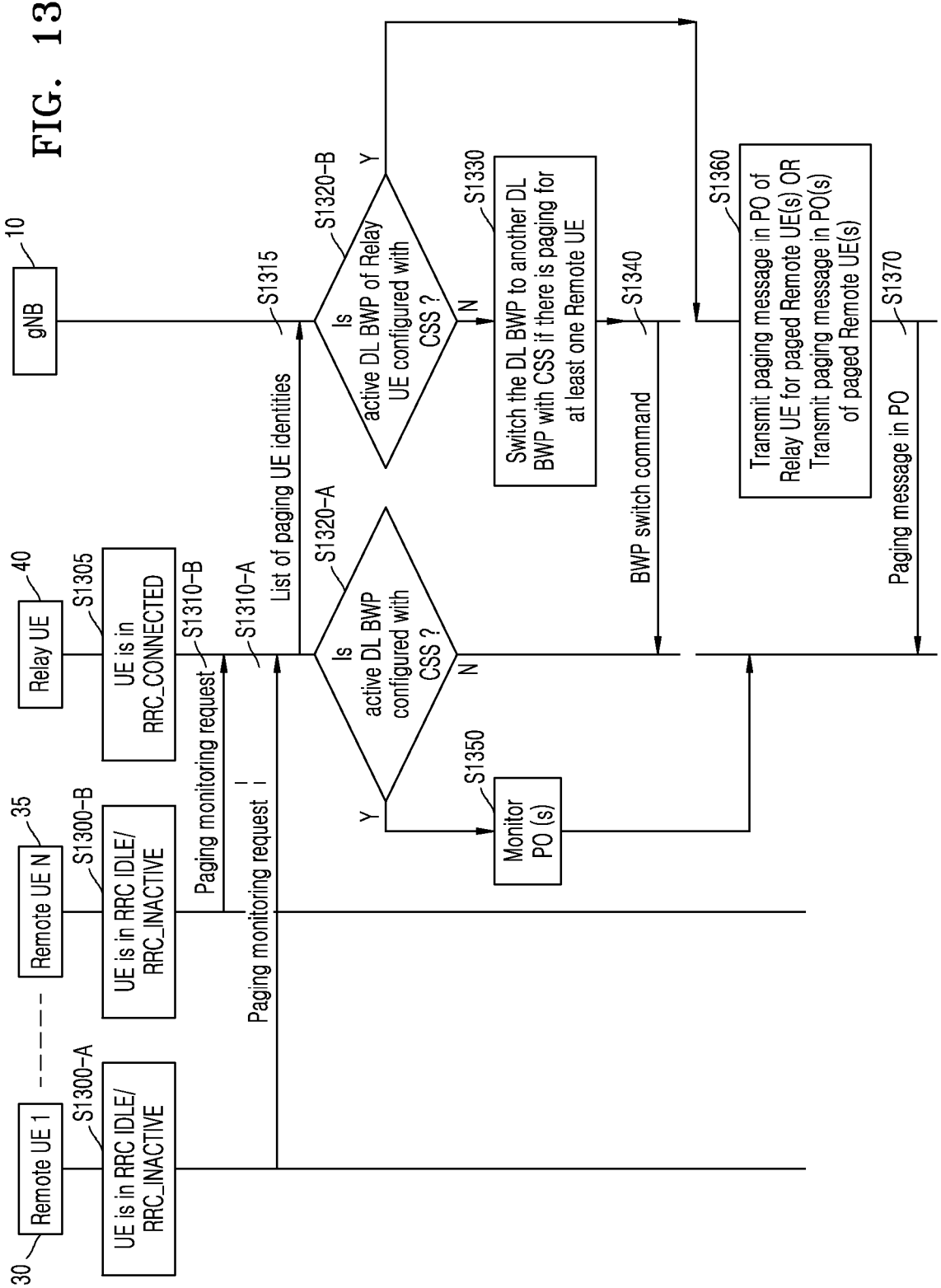
FIG. 13 illustrates a flowchart of a method for monitoring paging for Remote UE(s) according to embodiments of the present disclosure.

FIG. 13 illustrates a flowchart of a method for monitoring paging for Remote UE(s) according to embodiments of the present disclosure.

In one method of this disclosure (FIG. 13), the operation for monitoring paging for at least one Remote UE as follows:

At steps S1310-A and S1310-B, Remote UE(s) 30, 35 may transmit paging monitoring request to Relay UE 40.

For example, Remote UE(s) 30, 35 may sends its 5G-S-TMSI to Relay UE 40; For example, Remote UE(s) 30, 35 may send its I-RNTI, if remote UE is in RRC_INACTIVE (referring to step S1300-A and S1300-B). These parameters can be sent by Remote UE 30, 35 to Relay UE 40 using RRC signaling message over sidelink signaling radio bearer (SL SLRB) or over sidelink data radio bearer. The signaling message carrying these parameters is transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In an embodiment, Relay UE 40 may be in RRC_CONNECTED state (referring to step S1305).

In an embodiment, Relay UE 40 may receive the RRCReconfiguration message including DL BWP configuration (s)

At Step S1315, Relay UE 40 may send the list of paging identities (i.e. 5G-S-TMSI of Remote UE, I-RNTI of Remote UE) received from Remote UE(s) 30, 35 to gNB 10. For example, if Relay UE 40 is connected to two Remote UEs, Remote UE1 and Remote UE2, Relay UE 40 receives, 5G-S-TMSI-1 and I-RNTI-1 from Remote UE1, 5G-S-TMSI-2 and I-RNTI-2 from Remote UE2, Relay UE 40 sends 5G-S-TMSI-1, I-RNTI-1 5G-S-TMSI-2, I-RNTI-2 to gNB 10. In an embodiment, gNB 10 can send two lists wherein one list includes 5G-S-TMSIs and second list includes I-RNTIs.

At Step S1320-A, Relay UE 40 may check whether the active DL BWP is configured with search space for paging (i.e. parameter pagingSearchSpace (paging search space identifier) is signalled by gNB 10 in the DL BWP configuration). Search space for paging can also be referred as 'common search space and common corset for paging' or 'common search space' for paging.

If the active DL BWP of relay UE 40 is not configured with search space for paging (i.e. parameter paging- SearchSpace (paging search space identifier) is not signalled by gNB 10 in the DL BWP configuration):
a. Relay UE 40 does not monitor paging for Remote UE(s) 30, 35.
b. At Step S1340, Relay UE 40 may receive BWP switching command to switch to another BWP which is configured with search space for paging.

If the active DL BWP of relay UE 40 is configured with search space for paging (i.e. parameter pagingSearchSpace (paging search space identifier) is signalled by gNB 10 in the DL BWP configuration):
a. At Step S1350, Relay UE 40 may monitor the Remote UE's PO for receiving paging for Remote UE.

If 5G-S-TMSI is received from Remote UE and that 5G-S-TMSI is included in received paging message
Relay UE 40 may send CN paging indication to that Remote UE (using MAC CE or sidelink signalling message over sidelink signalling radio bearer or SCI). Relay UE may send 5G-S-TMSI to Remote UE.
Access type (non3GPP) and/or paging cause received in paging message may also be sent to Remote UE
If I-RNTI is received from Remote UE and that I-RNTI is included in received paging message
Relay UE 40 may send RAN paging indication to that Remote UE (using MAC CE or signalling message over sidelink signalling radio bearer or SCI). Relay UE may send I-RNTI to Remote UE
Access type (non3GPP) and/or paging cause received in paging message may also be sent to Remote UE.

gNB operation:
If the active DL BWP of relay UE 40 is not configured with search space for paging (i.e. parameter pagingSearchSpace (paging search space identifier) is not signalled by gNB 10 in the DL BWP configuration)
a. If gNB 10 to which Relay UE 40 is connected, receives paging message for Remote UE(s) 30, 35. i.e. if gNB 10 receives paging message from CN or another GNB wherein the paging message includes one or more paging identities included in list of paging identities received from Relay UE 40 or if gNB receives DL data for the Remote UE in RRC_INACTIVE whose paging identity is received from relay UE: In steps S1330-S1340, gNB 10 may send BWP switch command i.e. DCI indicating UE to switch to another BWP which is configured with search space for paging.
b. In steps S1360-S1370, gNB 10 then may transmit PDCCH addressed to P-RNTI in PO and corresponding paging message on PDSCH of new active DL BWP.

If the active DL BWP of relay UE 40 is configured with search space for paging (i.e. parameter pagingSearchSpace (paging search space identifier) is signalled by gNB 10 in the DL BWP configuration): gNB transmits PDCCH addressed to P-RNTI in PO and corresponding TB/MAC PDU carrying paging message on PDSCH. In this case MAC subheader is not included in the MAC PDU carrying the paging message MAC SDU.

In an embodiment, if the active DL BWP of relay UE 40 is not configured with search space for paging (i.e. parameter pagingSearchSpace (paging search space identifier) is not signalled by gNB in the DL BWP configuration): Relay UE 40 autonomously switches to initial DL BWP for PO monitoring for Remote UE(s) paging.

In an embodiment, if the active DL BWP of relay UE 40 is not configured with search space for paging (i.e. parameter pagingSearchSpace (paging search space identifier) is not signalled by gNB 10 in the DL BWP configuration):

Relay UE 40 may inform (using SCI or MAC CE or RRC message) remote UE that it cannot monitor paging. Upon receiving this information, Remote UE may choose (reselect) another relay.

In an embodiment of Embodiment 3-1 to Embodiment 3-3, when a Relay UE 40 handovers from one cell to another, source cell/gNB forwards the list of paging identities received by relay UE 40 to target cell/gNB. So that relay UE 40 does not have to send the list to target cell/gNB upon handover.

Recently UE-to-Network Relaying architecture is being studied where a Relay UE relays the traffic between a Remote UE and network. The UE-to-Network Relay enables coverage extension and power saving for the Remote UE. The communication between UE-to-Network Relay and gNB is based on 5G communication between UE and gNB. The communication between Remote UE and UE-to-Network Relay UE is based on sidelink communication. The UE-to-Network Relay UE can relay the paging and system information to the Remote UE. For paging, Relay UE monitors the Remote UE's Paging Occasion(s) in addition to its own Paging Occasion(s). The issue is how does the relay UE determines the paging occasion(s) of the Remote UE and monitor paging for Remote UE.

Embodiment 4-1

Figure 14:
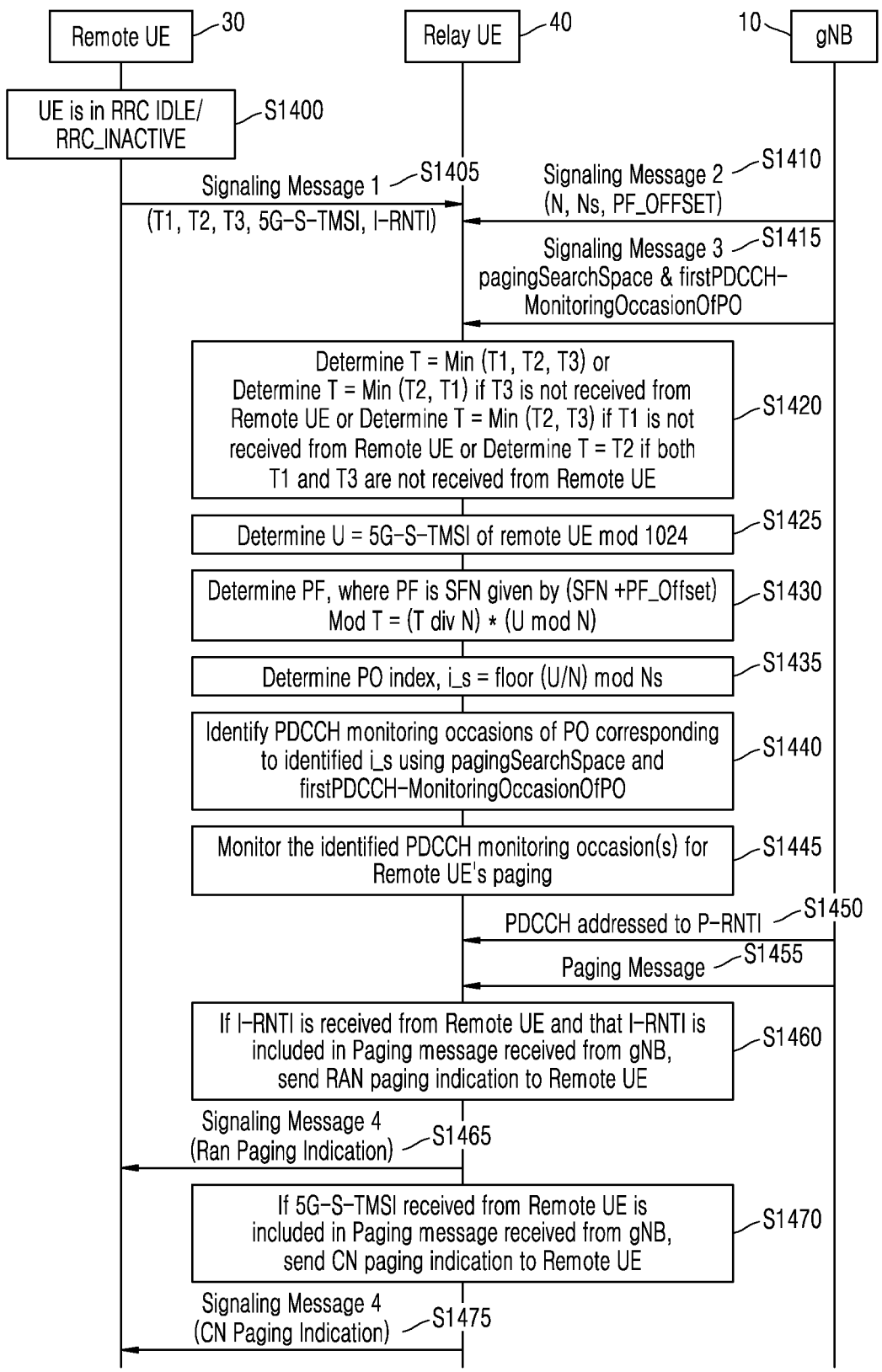
FIG. 14 illustrates a diagram of a method for determining the paging occasion(s) of the Remote UE and monitoring paging for Remote UE according to embodiments of the present disclosure.

FIG. 14 illustrates a diagram of a method for determining the paging occasion(s) of the Remote UE and monitoring paging for Remote UE according to embodiments of the present disclosure.

In one method of this disclosure (FIG. 14), Remote UE 30 may send the following parameter(s) to Relay UE 40 over the sidelink.

5G-S-TMSI of Remote UE 30;
I-RNTI of Remote UE 30, if remote UE 30 is in RRC_INACTIVE
Length of DRX cycle (T1) configured by upper layer (i.e. NAS) to Remote UE 30, if available/configured.
Length of Default DRX cycle (T2)
Length of DRX cycle configured by RAN to Remote UE 30 (T3), if remote UE 30 is in RRC_INACTIVE. The Remote UE 30 does not send this to Relay UE 40 if this parameter is not available/configured to Remote UE 30 by RAN. RAN may configure/signal this to UE using RRCRelease message when the Remote UE 30 was in RRC_CONNECTED. RAN may configure/signal this to UE using RRCRelease message during the small data transmission procedure/session when the Remote UE 30 was in RRC_INACTIVE.
Paging subgroup information (e.g. paging subgroup identity which may be received by Remote UE from CN i.e. AMF or which may be determined by Remote UE based on UE_ID), if available. Remote UE may indicate whether paging subgroup is received from CN or paging subgroup is determined by Remote UE based on Remote UE's identity. In an embodiment, this may be sent only if early paging indication is supported in the cell to which the Relay UE 40 is camped and/or Relay UE 40 supports early paging indication. Information that the cell to which the relay UE 40 is camped supports early paging indication can be obtained from relay discovery message or from system information sent by relay UE 40 to remote UE 30. Information that the relay UE 40 supports early paging indication can be obtained from signaling message transmitted by Relay UE 40 to Remote UE 30.

If Remote UE 30 supports e-DRX
  a. Length of e-DRX cycle and length of PTW. If PTW is separately configured for RRC_IDLE and RRC_INACTIVE, both PTWs are included. Similarly, e-DRX cycle length can be separately included for RRC_IDLE and RRC_INACTIVE.
  Indication that PO index (i_s) in RRC_INACTIVE is same as the PO index i_s for RRC_IDLE. Remote UE may send this indication 'if Remote UE support using the same i_s in PO determination in RRC INACTIVE state as in RRC_IDLE state' and 'Remote UE has received indication in RRCRelease message to enable the use of the same i_s in both RRC_INACTIVE and RRC_IDLE in PO determination (or Remote UE has received indication in system information to enable the use of the same i_s in both RRC INACTIVE and RRC_IDLE in PO determination)'. Alternately, Remote UE in RRC_INACTIVE state may send this indication 'if Remote UE support using the same i_s in PO determination in RRC INACTIVE state as in RRC_IDLE state' and 'Remote UE has received indication in RRCRelease message to enable the use of the same i_s in both RRC_INACTIVE and RRC_IDLE in PO determination (or Remote UE has received indication in system information to enable the use of the same i_s in both RRC INACTIVE and RRC_IDLE in PO determination)'.

The above parameters can be sent by Remote UE 30 to Relay UE 10 using RRC signaling message over sidelink signaling radio bearer (SL SLRB) or over sidelink data radio bearer. The signaling message carrying these parameters may be transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In this method of the disclosure Relay UE's operation for Remote UE's Paging is as follows:

At steps S1410 and S1415, Relay UE 40 may receive parameters N (number of paging frames), Ns (number of paging occasions), PF_Offset (paging frame offset), pagingSearchSpace (paging search space identifier) from gNB 10. The parameter firstPDCCH-MonitoringOccasionOfPO (list of first PDCCH monitoring occasion number of each of Ns POs) may also be received from gNB 10. N, Ns and PF_Offset are received from SIB1 transmitted by gNB 10. N is one of oneT, halfT, QuarterT, oneEigthT, oneSixteenthT. In other words, N is in units of DRX cycle length. It can have value equal to DRX cycle length, DRX cycle length/2, DRX cycle length/4, DRX cycle length/8, DRX cycle length/16. pagingSearchSpace and firstPDCCH-MonitoringOccasionOfPO are received in BWP configuration of DL BWP which the Relay UE 40 monitors for paging. If the Relay UE 40 is in RRC_IDLE/RRC_INACTIVE, DL BWP which the Relay UE 40 monitors for paging is the initial DL BWP. If the Relay UE 40 is in RRC_CONNECTED, DL BWP which the Relay UE 40 monitors for paging is the active DL BWP. Initial DL BWP configuration is received in SIB1 transmitted by gNB 10 if relay UE 40 is in RRC_IDLE/RRC_CONNECTED. If the Relay UE 40 is in RRC_CONNECTED, DL BWP configuration is received by Relay UE 40 in RRC Reconfiguration message.

At step S1405, Relay UE 40 may receive 5G-S-TMSI, I-RNTI (optional), T1 (optional), T2 and T3 (optional) from Remote UE 30 over sidelink (using mechanism as explained earlier).

At step S1420, Relay UE 40 may determine a value of T. For example, Relay UE 40 may determine T=Minimum (T1, T2, T3) or determine T=Minimum (T2, T1) if T3 is not received from Remote UE 30 or determine T=Min (T2, T3) if T1 is not received from Remote UE 30 or determines T=T2 if both T1 and T3 are not received from Remote UE 30.

At step S1425, Relay UE 40 may determine a value of U. For example, Relay UE 40 may determine U=5G-S-TMSI of remote UE mod 1024 (or 5G-S-TMSI of remote UE mod 2048 or 5G-S-TMSI of remote UE mod 4096)

At step S1430, Relay UE 40 may determine a value of PF. For example, Relay UE 40 may determine PF, where PF is SFN given by (SFN+PF_Offset) Mod T=(T div N)*(U mod N). For N, DRX cycle length is set to T. If N received from gNB is 'oneT', N equals T. If N received from gNB is 'halfT', N equals T/2. If N received from gNB is 'quarterT', N equals T/4. If N received from gNB is 'oneEighthT', N equals T/8. If N received from gNB is 'oneSixteenthT', N equals T/16.

At step S1435, Relay UE 40 may determine PO index. For example, Relay UE may determine the PO index, i_s=floor (U/N) mod Ns. For N to determine i_s, DRX cycle length is set to T. If N received from gNB is 'oneT', N equals T. If N received from gNB is 'halfT', N equals T/2. If N received from gNB is 'quarterT', N equals T/4. If N received from gNB is 'oneeEighthT', N equals T/8. If N received from gNB is 'oneSixteenthT', N equals T/16.

If indication that PO index (i_s) in RRC_INACTIVE is same as the PO index i_s for RRC_IDLE is received by Relay UE from Remote UE, For N to determine i_s, DRX cycle length is set to Tx=min (T1, T2) or Tx=T2 if T1 is not received from Remote UE. If N received from gNB is 'oneT', N equals Tx. If N received from gNB is 'halfT', N equals Tx/2. If N received from gNB is 'quarterT', N equals Tx/4. If N received from gNB is 'oneeEighthT', N equals Tx/8. If N received from gNB is 'oneSixteenthT', N equals Tx/16.

Alternately, if Remote UE is in RRC_INACTIVE and If indication that PO index (i_s) in RRC_INACTIVE is same as the PO index i_s for RRC_IDLE is received by Relay UE from Remote UE, For N to determine i_s, DRX cycle length is set to Tx=min (T1, T2) or Tx=T2 if T1 is not received from Remote UE. If N received from gNB is 'oneT', N equals Tx. If N received from gNB is 'halfT', N equals Tx/2. If N received from gNB is 'quarterT', N equals Tx/4. If N received from gNB is 'oneeEighthT', N equals Tx/8. If N received from gNB is 'oneSixteenthT', N equals Tx/16.

At step S1440, Relay UE 40 then may identify PDCCH monitoring occasions of PO corresponding to identified i_s using pagingSearchSpace and firstPDCCH-MonitoringOccasionOfPO (if received from gNB 10)

When SearchSpaceId=0 is configured for pagingSearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.
  When SearchSpaceId other than 0 is configured for pagingSearchSpace, the Relay UE 40 monitors the (i_s+1)$^{th}$ PO. The PDCCH monitoring occasions for paging are determined based on paging search space configuration (paging-SearchSpace) signaled by gNB 10. The PDCCH monitoring occasions for paging which are not overlapping with UL symbols (determined according to tdd-UL-DL-ConfigurationCommon received in SI) are sequentially numbered from zero starting from the 1st PDCCH monitoring occasion for paging in the PF. The gNB 10 may signal parameter firstPDCCH-MonitoringOccasionOfPO for each PO corresponding to a PF. When firstPDCCH-Monitoring OccasionOfPO is signalled, the $(i\_s+1)^{th}$ PO is a set of 'S*X' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S*X)^{th}$ PDCCH monitoring occasion for paging. 'S' is the number of actual transmitted SSBs determined according to parameter ssb-PositionsInBurst signalled in SystemInformationBlock1 received from gNB. X is the number of PDCCH monitoring occasions per SSB and signaled by GNB. If X is not signaled, it is assumed to be equal to 1. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

At step S1445, Relay UE 40 may monitor PDCCH addressed to P-RNTI in the PDCCH monitoring occasion(s) of PO identified above.

If I-RNTI is received from Remote UE 30, Relay UE 40 monitors CN paging and RAN paging for Remote UE 30.

If I-RNTI is not received from Remote UE 30, Relay UE 40 monitors only CN paging for Remote UE 30.

At step S1450, Relay UE 40 may receive PDCCH addressed to P-RNTI. Also, at step S1455, Relay UE 40 may receive paging message. If PDCCH addressed to P-RNTI is received in the monitored PO and DCI of paging message includes scheduling information (i.e. short message indicator in DCI is set to 01 or 11) for paging message, UE receives and decodes the TB based on the scheduling information and obtains the paging message from the decoded TB.

At step S1460, If I-RNTI is received from Remote UE 30 and that I-RNTI is included in received paging message At step S1465, Relay UE 40 sends RAN paging indication to that Remote UE 30 over sidelink (using MAC CE or signalling message over sidelink SRB or SCI).

Access type (non3GPP) and/or paging cause received in paging message may also be sent to Remote UE 30.

At step S1470, if 5G-S-TMSI is received from Remote UE 30 and that 5G-S-TMSI is included in received paging message.

At step S1475, Relay UE 40 sends CN paging indication to that Remote UE 30 (using MAC CE or signalling message over sidelink SRB or SCI).

Access type (non3GPP) and/or paging cause received in paging message may also be sent to Remote UE 30.

In an embodiment, relay UE 40 may just forward the received paging message from gNB 10 over the sidelink.

If early paging indication is supported by Relay UE 40 and early paging indication is supported by the cell on which Relay UE 40 is camped (or PCell in case Relay UE 40 is in RRC_CONNECTED):

Relay UE 40 may identify early paging indication monitoring occasions corresponding to determined PO above and monitor early paging indication If early paging indication includes/indicates Remote UE's paging sub group or Relay UE 40 fails to receive early paging indication, Relay UE 40 monitors Remote UEs PO (determined above).

If early paging indication does not includes/indicates Remote UE's paging sub group, Relay UE 40 may not monitor Remote UE's PO (determined above).

Remote UE's paging subgroup can be received by Relay UE 40 from Remote UE 30 OR Remote UE's paging subgroup can be identified by Relay UE 40 based on Remote UE ID ("if paging subgroup identity is not received from Remote UE and cell where Relay UE is currently camped supports UE ID based paging subgrouping" or "if paging subgroup identity received from UE is assigned by CN and cell where Relay UE is currently camped does not support CN based paging subgrouping but supports UE ID based paging subgrouping")

Remote UE's paging subgroup 'k'=(U/(N*Ns)) mod P, where P is number of paging sub groups received by relay UE from gNB 10.

In case the Relay UE 40 receives e-DRX configuration from Remote UE 30 and the cell on which relay UE 40 is camped (or PCell in case Relay UE is in RRC_CONNECTED) supports e-DRX, Relay UE 40 first identifies the PTW for Remote UE's paging Determining paging hyper frame (PH). PH is the H-SFN which satisfies the following equation:

$$H\text{-SFN mod } T_{eDRX.H} = (UE\_ID\_H \text{ mod } T_{eDRX.H}),$$

$T_{eDRX.H}$: eDRX cycle of the Remote UE in Hyperframes, ($T_{eDRX.H}$=1, 2, . . . , 256 Hyper-frames)

UE_ID_H: 10 most significant bits of the Hashed ID

Hashed_ID is Frame Check Sequence (FCS) for the bits b31, b30 . . . , b0 of 5G S-TMSI of Remote UE 5G S-TMSI is 48 bits comprising of AMF Set ID (10 bits), AMF pointer (6 bits) and 5G TMSI (32 bits)

Determining PTW_start. PTW_start denotes the first radio frame of the PH that is part of the PTW and has SFN satisfying the following equation:

$$SFN=256*ieDRX, \text{ where } ieDRX=\text{floor}(UE\_ID\_H/ TeDRX,H) \text{mod } 4$$

Relay UE 40 then applies the paging monitoring operation, as explained earlier under ' Relay UE's operation for Remote UE's Paging', within the PTW (i.e. SFN considered for PF determination are the one's which are within the PTW).

In an alternate embodiment of this method:

Remote UE 30 can inform new paging ID(s) (instead of 5G-S-TMSI/I-RNTI) to Relay UE 40.

There can be separate new paging ID for RRC IDLE and RRC INACTIVE new paging ID can be same for both RRC IDLE and RRC_INACTIVE In this case Remote UE can additionally indicate whether it wants to monitor RAN paging or not; or it can indicate its RRC state.

U=UE_ID i.e. 5G-S-TMSI of Remote UE mod 1024 is also informed to Relay UE 40 by Remote UE 30 and Relay UE 40 does not need to calculate it Relay UE 40 will check for new paging ID (s) in received paging message from gNB 10 instead of I-RNTI/5G-S-TMSI of Remote UE 30.

Paging message from gNB 10 indicates whether paging is RAN paging/CN paging (or UE state) if new paging ID is common for RRC IDLE and RRC_INACTIVE and is included in paging message If new paging ID is received from Remote UE 30 and that paging ID is included in received paging message Relay UE 40 sends paging indication to that Remote UE 30 (using MAC CE or signalling message or SCI). Relay UE 40 may also indicate whether paging is RAN paging or CN paging.

Access type (non3GPP) and/or paging cause received in paging message may also be sent to Remote UE 30.

In an embodiment, the method described herein is applied when Relay UE 40 is in RRC IDLE or Relay UE 40 is in RRC_INACTIVE or Relay UE 40 is in RRC_CONNECTED wherein the active DL BWP is configured with common search space for paging (pagingSearchSpace is signaled).

In an embodiment, when a Remote UE 30 whose paging is relayed by Relay UE 1 reselects another Relay UE 2, Remote UE sends parameters as explained earlier to Relay UE 2 and Relay UE 2 will monitor paging for Remote UE 30 as explained in this method. Upon reselection, Remote UE 30 may inform Relay UE1 that it's no longer need to monitor paging for it, Relay UE 1 releases the configuration/parameters received from Remote UE 30 and stops monitoring paging for Remote UE 30.

Embodiment 4-2

Figure 15:
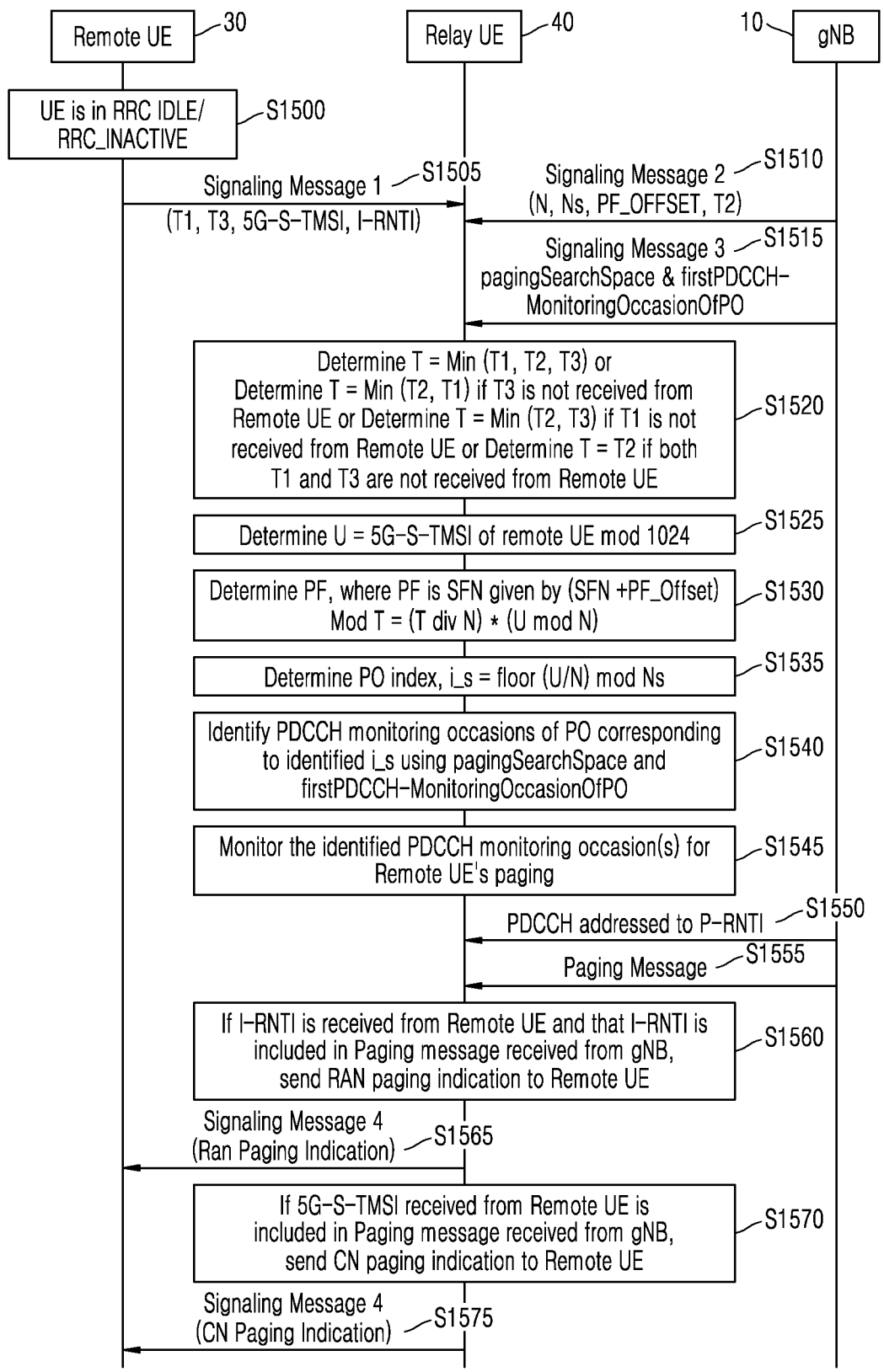
FIG. 15 illustrates a diagram of a method for determining the paging occasion(s) of the Remote UE and monitoring paging for Remote UE according to embodiments of the present disclosure.

FIG. 15 illustrates a diagram of a method for determining the paging occasion(s) of the Remote UE and monitoring paging for Remote UE according to embodiments of the present disclosure.

In one method of this disclosure (FIG. 15), Remote UE 30 may send the following parameter(s) to Relay UE 40 over the sidelink.

5G-S-TMSI of Remote UE 30;

I-RNTI of Remote UE 30, if remote UE 30 is in RRC_INACTIVE

Length of DRX cycle (T1) configured by upper layer (i.e. NAS) to Remote UE 30, if available/configured.

Length of DRX cycle (T3) configured by RAN to Remote UE 30, if remote UE 30 is in RRC_INACTIVE. The Remote UE 30 does not send this to Relay UE 40 if this parameter is not available/configured to Remote UE 30 by RAN. RAN may configure/signal this to UE using RRCRelease message when the Remote UE 30 was in RRC_CONNECTED. RAN may configure/signal this to UE using RRCRelease message during the small data transmission procedure/session when the Remote UE 30 was in RRC_INACTIVE.

Paging subgroup information (e.g. paging subgroup identity which may be received by Remote UE from CN i.e. AMF or which may be determined by Remote UE based on UE_ID), if available. Remote UE may indicate whether paging subgroup is received from CN or paging subgroup is determined by Remote UE based on Remote UE's identity. In an embodiment, this may be sent only if early paging indication is supported in the cell to which the Relay UE 40 is camped and/or Relay UE 40 supports early paging indication. Information that the cell to which the relay UE 40 is camped supports early paging indication can be obtained from relay discovery message or from system information sent by relay UE 40 to remote UE 30. Information that the relay UE 40 supports early paging indication can be obtained from signaling message transmitted by Relay UE 40 to Remote UE 30.

If Remote UE 30 supports e-DRX a. Length of e-DRX cycle and length of PTW. If PTW is separately configured for RRC_IDLE and RRC_INACTIVE, both PTW are included. Similarly, e-DRX cycle length can be separately included for RRC_IDLE and RRC_INACTIVE-Indication that PO index (i_s) in RRC_INACTIVE is same as the PO index i_s for RRC_IDLE. Remote UE may send this indication 'if Remote UE support using the same i_s in PO determination in RRC_INACTIVE state as in RRC_IDLE state' and 'Remote UE has received indication in RRCRelease message to enable the use of the same i_s in both RRC_INACTIVE and RRC_IDLE in PO determination (or Remote UE has received indication in system information to enable the use of the same i_s in both RRC_INACTIVE and RRC_IDLE in PO determination)'. Alternately, Remote UE in RRC_INACTIVE state may send this indication 'if Remote UE support using the same i_s in PO determination in RRC_INACTIVE state as in RRC_IDLE state' and 'Remote UE has received indication in RRCRelease message to enable the use of the same i_s in both RRC_INACTIVE and RRC_IDLE in PO determination (or Remote UE has received indication in system information to enable the use of the same i_s in both RRC_INACTIVE and RRC_IDLE in PO determination)'.

The above parameters can be sent by Remote UE 30 to Relay UE 40 using RRC signaling message over sidelink signaling radio bearer (SL SLRB) or over sidelink data radio bearer. The signaling message carrying these parameters is transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In this method of the disclosure Relay UE's operation for Remote UE's Paging is as follows:

At steps S1510 and S1515, Relay UE 40 may receive parameters N (number of paging frames), Ns (number of paging occasions), T2 (Default DRX Cycle), PF_Offset (paging frame offset), pagingSearchSpace (paging search space identifier) from gNB 10. The parameter firstPDCCH-MonitoringOccasionOfPO (list of first PDCCH monitoring occasion number of each of Ns POs) may also be received from gNB 10. N, Ns and PF_Offset are received from SIB1 transmitted by gNB 10. N is one of oneT, halfT, QuarterT, oneEigthT, oneSixteenthT. In other words, N is in units of DRX cycle length. It can have value equal to DRX cycle length, DRX cycle length/2, DRX cycle length/4, DRX cycle length/8, DRX cycle length/16. pagingSearchSpace and firstPDCCH-MonitoringOccasionOfPO are received in BWP configuration of DL BWP which the Relay UE 40 monitors for paging. If the Relay UE 40 is in RRC_IDLE/RRC_INACTIVE, DL BWP which the Relay UE 40 monitors for paging is the initial DL BWP. If the Relay UE 40 is in RRC_CONNECTED, DL BWP which the Relay UE 40 monitors for paging is the active DL BWP. Initial DL BWP configuration is received in SIB1 transmitted by gNB 10 if relay UE 40 is in RRC_IDLE/RRC_CONNECTED. If the Relay UE 40 is in RRC_CONNECTED, DL BWP configuration is received by Relay UE 40 in RRC Reconfiguration message.

At step S1505, Relay UE 40 may receive 5G-S-TMSI, I-RNTI (optional), T1 (optional), and T3 (optional) from Remote UE 30 over sidelink (using mechanism as explained earlier).

At step S1520, Relay UE 40 may determine a value of T. For example, Relay UE 40 may determine T=Minimum (T1, T2, T3) or determines T=Minimum (T2, T1) if T3 is not received from Remote UE 30 or determines T=Min (T2, T3) if T1 is not received from Remote UE 30 or determines T=T2 if both T1 and T3 are not received from Remote UE 30.

At step S1525, Relay UE 40 may determine a value of U. For example, Relay UE 40 may determine U=5G-S-TMSI of remote UE 30 mod 1024 (or 5G-S-TMSI of remote UE mod 2048 or 5G-S-TMSI of remote UE mod 4096).

At step S1530, Relay UE 40 may determine a value of PF. For example, Relay UE 40 may determine PF, where PF is SFN given by (SFN+PF_Offset) Mod T=(T div N)*(U mod N). For N to determine PF, DRX cycle length is set to T. If N received from gNB is 'oneT', N equals T. If N received from gNB is 'halfT', N equals T/2. If N received from gNB is 'quarterT', N equals T/4. If N received from gNB is 'oneeEighthT', N equals T/8. If N received from gNB is 'oneSixteenthT', N equals T/16.

At step S1535, Relay UE 40 may determine PO index. For example, Relay UE 40 may determine PO index, i_s=floor (U/N) mod Ns. For N to determine i_s, DRX cycle length is set to T. If N received from gNB is 'oneT', N equals T. If N received from gNB is 'halfT', N equals T/2. If N received from gNB is 'quarterT', N equals T/4. If N received from gNB is 'oneeEighthT', N equals T/8. If N received from gNB is 'oneSixteenthT', N equals T/16.

If indication that PO index (i_s) in RRC_INACTIVE is same as the PO index i_s for RRC_IDLE is received by Relay UE from Remote UE, For N to determine i_s, DRX cycle length is set to Tx=min (T1, T2) or Tx=T2 if T1 is not received from Remote UE. If N received from gNB is 'oneT', N equals Tx. If N received from gNB is 'halfT', N equals Tx/2. If N received from gNB is 'quarterT', N equals Tx/4. If N received from gNB is 'oneeEighthT', N equals Tx/8. If N received from gNB is 'oneSixteenthT', N equals Tx/16.

Alternately, if Remote UE is in RRC_INACTIVE and If indication that PO index (i_s) in RRC_INACTIVE is same as the PO index i_s for RRC_IDLE is received by Relay UE from Remote UE, For N to determine i_s, DRX cycle length is set to Tx=min (T1, T2) or Tx=T2 if T1 is not received from Remote UE. If N received from gNB is 'oneT', N equals Tx. If N received from gNB is 'halfT', N equals Tx/2. If N received from gNB is 'quarterT', N equals Tx/4. If N received from gNB is 'oneeEighthT', N equals Tx/8. If N received from gNB is 'oneSixteenthT', N equals Tx/16.

At step S1540, Relay UE 40 then may identify PDCCH monitoring occasions of PO corresponding to identified i_s using pagingSearchSpace and firstPDCCH-MonitoringOccasionOfPO (if received from gNB 10)

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the Relay UE 40 monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon received in SI) are sequentially numbered from zero starting from the 1st PDCCH monitoring occasion for paging in the PF. The gNB 10 may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S*X' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S*X)^{th}$ PDCCH monitoring occasion for paging. 'S' is the number of actual transmitted SSBs determined according to parameter ssb-PositionsInBurst signalled in SystemInformationBlock1 received from gNB 10. X is the number of PDCCH monitoring occasions per SSB and signaled by gNB 10. If X is not signaled, it is assumed to be equal to 1. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

At step S1545, Relay UE 40 may monitor PDCCH addressed to P-RNTI in the PDCCH monitoring occasion(s) of PO identified above.

If I-RNTI is received from Remote UE 30, Relay UE 40 monitors CN paging and RAN paging for Remote UE 30.

If I-RNTI is not received from Remote UE, Relay UE monitors only CN paging for Remote UE.

At step S1550, Relay UE 40 may receive PDCCH addressed to P-RNTI. Also, at step S1555, Relay UE 40 may receive paging message. If PDCCH addressed to P-RNTI is received in the monitored PO and DCI of paging message includes scheduling information (i.e. short message indicator in DCI is set to 01 or 11) for paging message, UE receives and decodes the TB based on the scheduling information and obtains the paging message from the decoded TB.

At step S1560, If I-RNTI is received from Remote UE 30 and that I-RNTI is included in received paging message At step S1565, Relay UE 40 sends RAN paging indication to that Remote UE 30 over sidelink (using MAC CE or signalling message over sidelink SRB or SCI)

Access type (non3GPP) and/or paging cause received in paging message may also be sent to Remote UE 30.

At step S1570, if 5G-S-TMSI is received from Remote UE 30 and that 5G-S-TMSI is included in received paging message At step S1575, Relay UE 40 sends CN paging indication to that Remote UE 30 (using MAC CE or signalling message over sidelink SRB or SCI)

Access type (non3GPP) and/or paging cause received in paging message may also be sent to Remote UE 30.

In an embodiment, relay UE 40 may just forward the received paging message from gNB 10 over the sidelink.

If early paging indication is supported by Relay UE 40 and early paging indication is supported by the cell on which Relay UE 40 is camped (or PCell in case Relay UE 40 is in RRC_CONNECTED)

Relay UE 40 may identify early paging indication monitoring occasions corresponding to determined PO above and monitor early paging indication If early paging indication includes/indicates Remote UE's paging sub group or Relay UE fails to receive early paging indication, Relay UE 40 monitors Remote UE's PO (determined above).

If early paging indication does not includes/indicates Remote UE's paging sub group, Relay UE 40 may not monitor Remote UE's PO (determined above).

Remote UE's paging subgroup can be identified by Relay UE 40 based on Remote UE ID Remote UE's paging subgroup can be received by Relay UE from Remote UE OR Remote UE's paging subgroup can be identified by Relay UE based on Remote UE ID ("if paging subgroup identity is not received from Remote UE and cell where Relay UE is currently camped supports UE ID based paging subgrouping" or "if paging subgroup identity received from UE is assigned by CN and cell where Relay UE is currently camped does not support CN based paging subgrouping but supports UE ID based paging subgrouping")

Remote UE's paging subgroup 'k'=(U/(N*Ns)) mod P, where P is number of paging sub groups received by relay UE 40 from gNB 10.

In case the Relay UE 40 receives e-DRX configuration from Remote UE 30 and the cell on which relay UE 40 is camped (or PCell in case Relay UE is in RRC_CONNECTED) supports e-DRX, Relay UE 40 first identifies the PTW for Remote UE's paging Determining paging hyper frame (PH). PH is the H-SFN which satisfies the following equation:

$$H\text{-SFN mod } T_{eDRX,H}=(UE\_ID\_H \text{ mod } T_{eDRX,H}),$$

$T_{eDRX,H}$: eDRX cycle of the Remote UE in Hyperframes, ($T_{eDRX,H}$=1, 2, . . . , 256 Hyper-frames)

UE_ID_H: 10 most significant bits of the Hashed ID

Hashed_ID is Frame Check Sequence (FCS) for the bits b31, b30 . . . , b0 of 5G S-TMSI of Remote UE 5G-S-TMSI is 48 bits comprising of AMF Set ID (10 bits), AMF pointer (6 bits) and 5G TMSI (32 bits)

Determining PTW_start. PTW_start denotes the first radio frame of the PH that is part of the PTW and has SFN satisfying the following equation:

$$SFN=256*ieDRX, \text{ where } ieDRX=floor(UE\_ID\_H/T\text{e}DRX,H) \text{ mod } 4$$

Relay UE 40 then applies the paging monitoring operation, as explained earlier under ' Relay UE's operation for Remote UE's Paging', within the PTW (i.e. SFN considered for PF determination are the one's which are within the PTW)

In an alternate embodiment of this method:

Remote UE 30 can inform new paging ID(s) (instead of 5G-S-TMSI/I-RNTI) to Relay UE 40.

There can be separate new paging ID for RRC IDLE and RRC INACTIVE new paging ID can be same for both RRC IDLE and RRC_INACTIVE In this case Remote UE 30 can additionally indicate whether it wants to monitor RAN paging or not; or it can indicate its RRC state.

U=UE_ID i.e. 5G-S-TMSI of Remote UE mod 1024 is also informed to Relay UE 40 by Remote UE 30 and Relay UE 40 does not need to calculate it Relay UE 40 will check for new paging ID (s) in received paging message from gNB 10 instead of I-RNTI/5G-S-TMSI of Remote UE 30.

Paging message from gNB indicates whether paging is RAN paging/CN paging (or UE state) if new paging ID is common for RRC IDLE and RRC_INACTIVE and is included in paging message If new paging ID is received from Remote UE 30 and that paging ID is included in received paging message Relay UE 40 sends paging indication to that Remote UE 30 (using MAC CE or signalling message or SCI). Relay UE 40 may also indicate whether paging is RAN paging or CN paging.

Access type (non3GPP) and/or paging cause received in paging message may also be sent to Remote UE In an embodiment, the method described herein is applied when Relay UE 40 is in RRC IDLE or Relay UE 40 is in RRC_INACTIVE or Relay UE 40 is in RRC_CONNECTED wherein the active DL BWP is configured with common search space for paging (pagingSearchSpace is signaled).

In an embodiment, when a Remote UE 30 whose paging is relayed by Relay UE 1 reselects another Relay UE 2, Remote UE sends parameters as explained earlier to Relay UE 2 and Relay UE 2 will monitor paging for Remote UE 30 as explained in this method. Upon reselection, Remote UE may inform Relay UE1 that it's no longer need to monitor paging for it, Relay UE 1 releases the configuration/parameters received from Remote UE 30 and stops monitoring paging for Remote UE 30.

Embodiment 4-3

Figure 16:
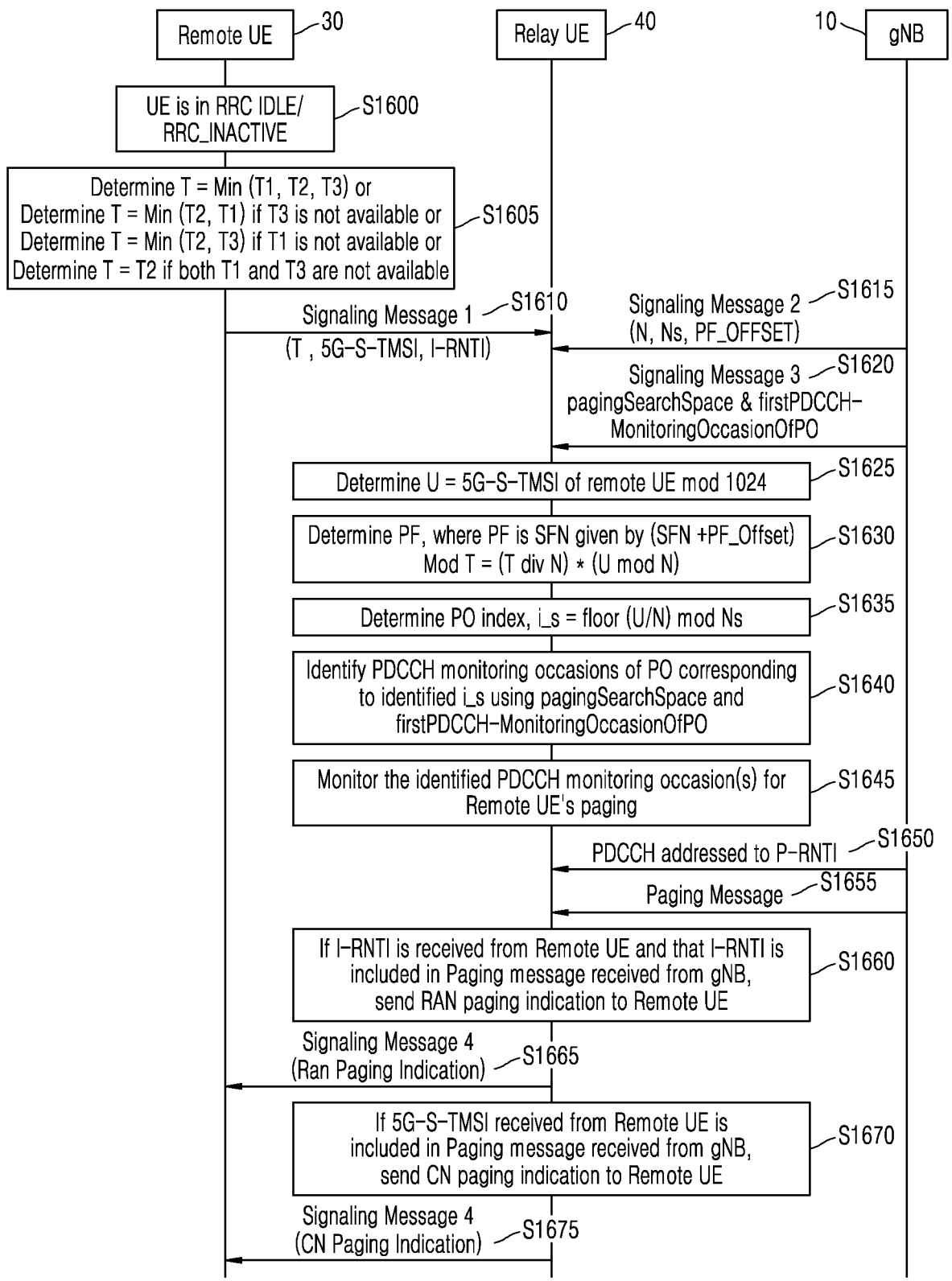
FIG. 16 illustrates a diagram of a method for determining the paging occasion(s) of the Remote UE and monitoring paging for Remote UE according to embodiments of the present disclosure.

FIG. 16 illustrates a diagram of a method for determining the paging occasion(s) of the Remote UE and monitoring paging for Remote UE according to embodiments of the present disclosure.

In one method of this disclosure (FIG. 16), Remote UE 30 may send the following parameter(s) to Relay UE 40 over the sidelink.

5G-S-TMSI of Remote UE 30;

I-RNTI of Remote UE 30, if remote UE 30 is in RRC_INACTIVE

Length of DRX cycle (T) where
a. T=Min (T1, T2, T3) or
b. T=Min (T2, T1) if T3 is not available
c. T=Min (T2, T3) if T1 is not available
d. T=T2 if both T1 and T3 are not available
T1=Length of DRX cycle configured by upper layer (i.e. NAS) to Remote UE 30;
T2=Length of Default DRX cycle
T3=Length of DRX cycle configured by RAN to Remote UE 30. RAN may configure/signal this to Remote UE 30 using RRCRelease message when the Remote UE 30 was in RRC_CONNECTED. RAN may configure/signal this to UE using RRCRelease message during the small data transmission procedure/session when the Remote UE 30 was in RRC_INACTIVE.
e. In an embodiment, T=T1 or T3 or minimum of (T1, T3)

Paging subgroup information (e.g. paging subgroup identity which may be received by Remote UE from CN i.e. AMF or which may be determined by Remote UE based on UE_ID), if available. Remote UE may indicate whether paging subgroup is received from CN or paging subgroup is determined by Remote UE based on Remote UE's identity. In an embodiment, this may be sent only if early paging indication is supported in the cell to which the Relay UE 40 is camped and/or Relay UE 40 supports early paging indication. Information that the cell to which the relay UE 40 is camped supports early paging indication can be obtained from relay discovery message or from system information sent by relay UE 40 to remote UE 30. Information that the relay UE 40 supports early paging indication can be obtained from signaling message transmitted by Relay UE 40 to Remote UE 30.

If Remote UE 30 supports e-DRX a. Length of e-DRX cycle and length of PTW. If PTW is separately configured for RRC_IDLE and RRC_INACTIVE, both PTW are included. Similarly, e-DRX cycle length can be separately included for RRC_IDLE and RRC_INACTIVE-Indication that PO index (i_s) in RRC_INACTIVE is same as the PO index i_s for RRC_IDLE. Remote UE may send this indication 'if Remote UE support using the same i_s in PO determination in RRC_INACTIVE state as in RRC_IDLE state' and 'Remote UE has received indication in RRCRelease message to enable the use of the same i_s in both RRC_INACTIVE and RRC_IDLE in PO determination (or Remote UE has received indication in system information to enable the use of the same i_s in both RRC_INACTIVE and RRC_IDLE in PO determination)'. Alternately, Remote UE in RRC_INACTIVE state may send this indication 'if Remote UE support using the same i_s in PO determination in RRC_INACTIVE state as in RRC_IDLE state' and 'Remote UE has received indication in RRCRelease message to enable the use of the same i_s in both RRC_INACTIVE and RRC_IDLE in PO determination (or Remote UE has received indication in system information to enable the use of the same i_s in both RRC_INACTIVE and RRC_IDLE in PO determination)'.

The above parameters can be sent by Remote UE 30 to Relay UE 40 using RRC signaling message over sidelink signaling radio bearer (SL SLRB) or over sidelink data radio bearer. The signaling message carrying these parameters is transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In this method of the disclosure Relay UE's operation for Remote UE's Paging is as follows:

At step S1605, Remote UE 30 may determine a value of T as described above.

At steps S1615 and S1620, Relay UE 40 may receive parameters N (number of paging frames), Ns (number of paging occasions), T2 (Default DRX Cycle), PF_Offset (paging frame offset), pagingSearchSpace (paging search space identifier) from gNB 10. The parameter firstPDCCH-MonitoringOccasionOfPO (list of first PDCCH monitoring occasion number of each of Ns POs) may also be received from gNB 10. N, Ns and PF_Offset are received from SIB1 transmitted by gNB. N is one of oneT, halfT, QuarterT, oneEigthT, oneSixteenthT. In other words, N is in units of DRX cycle length. It can have value equal to DRX cycle length, DRX cycle length/2, DRX cycle length/4, DRX cycle length/8, DRX cycle length/16. pagingSearchSpace and firstPDCCH-MonitoringOccasionOfPO are received in BWP configuration of DL BWP which the Relay UE 40 monitors for paging. If the Relay UE 40 is in RRC_IDLE/RRC_INACTIVE, DL BWP which the Relay UE 40 monitors for paging is the initial DL BWP. If the Relay UE 40 is in RRC_CONNECTED, DL BWP which the Relay UE 40 monitors for paging is the active DL BWP. Initial DL BWP configuration is received in SIB1 transmitted by gNB 10 if relay UE 40 is in RRC_IDLE/RRC_CONNECTED. If the Relay UE 40 is in RRC_CONNECTED, DL BWP configuration is received by Relay UE 40 in RRC Reconfiguration message.

At step S1610, Relay UE 40 may receive 5G-S-TMSI, I-RNTI (optional), T from Remote UE 30 over sidelink (using mechanism as explained earlier).

At step S1625, Relay UE 40 may determine a value of U. For example, Relay UE 40 may determine U=5G-S-TMSI of remote UE mod 1024 (or 5G-S-TMSI of remote UE mod 2048 or 5G-S-TMSI of remote UE mod 4096).

At step S1630, Relay UE 40 may determine a value of PF. For example, Relay UE 40 may determine PF, where PF is SFN given by (SFN+PF_Offset) Mod T=(T div N)*(U mod N). For N to determine PF, DRX cycle length is set to T. If N received from gNB is 'oneT', N equals T. If N received from gNB is 'halfT', N equals T/2. If N received from gNB is 'quarterT', N equals T/4. If N received from gNB is 'oneEighthT', N equals T/8. If N received from gNB is 'oneSixteenthT', N equals T/16.

At step S1635, Relay UE 40 may determine PO index. For example, Relay UE may determine PO index, i_s=floor (U/N) mod Ns. For N to determine i_s, DRX cycle length is set to T. If N received from gNB is 'oneT', N equals T. If N received from gNB is 'halfT', N equals T/2. If N received from gNB is 'quarterT', N equals T/4. If N received from gNB is 'oneeEighthT', N equals T/8. If N received from gNB is 'oneSixteenthT', N equals T/16. If indication that PO index (i_s) in RRC_INACTIVE is same as the PO index i_s for RRC_IDLE is received by Relay UE from Remote UE, For N to determine i_s, DRX cycle length is set to Tx=min (Length of DRX cycle configured by upper layer (i.e. NAS) to Remote UE, Default DRX cycle received from gNB in system info) or Tx=Default DRX cycle received from gNB in system info if Length of DRX cycle configured by upper layer (i.e. NAS) to Remote UE is not received from Remote UE. If N received from gNB is 'oneT', N equals Tx. If N received from gNB is 'halfT', N equals Tx/2. If N received from gNB is 'quarterT', N equals Tx/4. If N received from gNB is 'oneeEighthT', N equals Tx/8. If N received from gNB is 'oneSixteenthT', N equals Tx/16.

Alternately, if Remote UE is in RRC_INACTIVE and If indication that PO index (i_s) in RRC_INACTIVE is same as the PO index i_s for RRC_IDLE is received by Relay UE from Remote UE, For N to determine i_s, DRX cycle length is set to Tx=min (Length of DRX cycle configured by upper layer (i.e. NAS) to Remote UE, Default DRX cycle received from gNB in system info) or Tx=Default DRX cycle received from gNB in system info if Length of DRX cycle configured by upper layer (i.e. NAS) to Remote UE is not received from Remote UE. If N received from gNB is 'oneT', N equals Tx. If N received from gNB is 'halfT', N equals Tx/2. If N received from gNB is 'quarterT', N equals Tx/4. If N received from gNB is 'oneeEighthT', N equals Tx/8. If N received from gNB is 'oneSixteenthT', N equals Tx/16.

At step S1640, Relay UE 40 then may identify PDCCH monitoring occasions of PO corresponding to identified i_s using pagingSearchSpace and firstPDCCH-MonitoringOccasionOfPO (if received from gNB 10)

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon received in SI) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S*X' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S*X)^{th}$ PDCCH monitoring occasion for paging. 'S' is the number of actual transmitted SSBs determined according to parameter ssb-PositionsInBurst signalled in SystemInformationBlock1 received from gNB. X is the number of PDCCH monitoring occasions per SSB and signaled by GNB. If X is not signaled, it is assumed to be equal to 1. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

At step S1645, Relay UE 40 may monitor PDCCH addressed to P-RNTI in the PDCCH monitoring occasion(s) of PO identified above.

If I-RNTI is received from Remote UE 30, Relay UE 40 monitors CN paging and RAN paging for Remote UE 30.

If I-RNTI is not received from Remote UE 30, Relay UE 40 monitors only CN paging for Remote UE 30.

At step S1650, Relay UE 40 may receive PDCCH addressed to P-RNTI. Also, at step S1655, Relay UE 40 may receive paging message. If PDCCH addressed to P-RNTI is received in the monitored PO and DCI of paging message includes scheduling information (i.e. short message indicator in DCI is set to 01 or 11) for paging message, UE receives and decodes the TB based on the scheduling information and obtains the paging message from the decoded TB.

At step S1660, if I-RNTI is received from Remote UE 30 and that I-RNTI is included in received paging message At step S1665, Relay UE 40 sends RAN paging indication to that Remote UE 30 over sidelink (using MAC CE or signalling message over sidelink SRB or SCI)

Access type (non3GPP) and/or paging cause received in paging message may also be sent to Remote UE 30.

At step S1670, if 5G-S-TMSI is received from Remote UE and that 5G-S-TMSI is included in received paging message At step S1675, Relay UE 40 sends CN paging indication to that Remote UE 30 (using MAC CE or signalling message over sidelink SRB or SCI)

Access type (non3GPP) and/or paging cause received in paging message may also be sent to Remote UE 30.

In an embodiment, relay UE 40 may just forward the received paging message from gNB 10 over the sidelink.

If early paging indication is supported by Relay UE 40 and early paging indication is supported by the cell on which Relay UE 40 is camped (or PCell in case Relay UE 40 is in RRC_CONNECTED)

Relay UE 40 may identify early paging indication monitoring occasions corresponding to determined PO above and monitor early paging indication If early paging indication includes/indicates Remote UE's paging sub group or Relay UE 40 fails to receive early paging indication, Relay UE 40 monitors Remote UE's PO (determined above).

If early paging indication does not includes/indicates Remote UE's paging sub group, Relay UE 40 may not monitor Remote UE's PO (determined above).

Remote UE's paging subgroup can be identified by Relay UE 40 based on Remote UE ID Remote UE's paging subgroup can be received by Relay UE 40 from Remote UE 30 OR Remote UE's paging subgroup can be identified by Relay UE 40 based on Remote UE ID ("if paging subgroup identity is not received from Remote UE and cell where Relay UE is currently camped supports UE ID based paging subgrouping" or "if paging subgroup identity received from UE is assigned by CN and cell where Relay UE is currently camped does not support CN based paging subgrouping but supports UE ID based paging subgrouping")

Remote UE's paging subgroup 'k'=(U/(N*Ns)) mod P, where P is number of paging sub groups received by relay UE 40 from gNB 10.

In case the Relay UE 40 receives e-DRX configuration from Remote UE 30 and the cell on which relay UE 40 is camped (or PCell in case Relay UE 40 is in RRC_CONNECTED) supports e-DRX, Relay UE 40 first identifies the PTW for Remote UE's paging Determining paging hyper frame (PH). PH is the H-SFN which satisfies the following equation:

$H\text{-SFN mod } T_{eDRX.H} = (UE\_ID\_H \text{ mod } T_{eDRX.H})$, $T_{eDRX.H}$: eDRX cycle of the Remote UE in Hyperframes, ($T_{eDRX.H}$=1, 2, . . . , 256 Hyper-frames)

UE_ID_H: 10 most significant bits of the Hashed ID

Hashed_ID is Frame Check Sequence (FCS) for the bits b31, b30 . . . , b0 of 5G S-TMSI of Remote UE 5G-S-TMSI is 48 bits comprising of AMF Set ID (10 bits), AMF pointer (6 bits) and 5G TMSI (32 bits)

Determining PTW_start. PTW_start denotes the first radio frame of the PH that is part of the PTW and has SFN satisfying the following equation:

SFN=256*ieDRX, where ieDRX=floor(UE_ID_H/TeDRX,H)mod 4

Relay UE 40 then applies the paging monitoring operation, as explained earlier under ' Relay UE's operation for Remote UE's Paging', within the PTW (i.e. SFN considered for PF determination are the one's which are within the PTW)

In an alternate embodiment of this method:

Remote UE 30 can inform new paging ID(s) (instead of 5G-S-TMSI/I-RNTI) to Relay UE 40.

There can be separate new paging ID for RRC IDLE and RRC INACTIVE new paging ID can be same for both RRC IDLE and RRC_INACTIVE In this case Remote UE 30 can additionally indicate whether it wants to monitor RAN paging or not; or it can indicate its RRC state.

U=UE_ID i.e. 5G-S-TMSI of Remote UE mod 1024 is also informed to Relay UE 40 by Remote UE 30 and Relay UE 40 does not need to calculate it Relay UE 40 will check for new paging ID (s) in received paging message from gNB 10 instead of I-RNTI/5G-S-TMSI of Remote UE 30

Paging message from gNB 10 indicates whether paging is RAN paging/CN paging (or UE state) if new paging ID is common for RRC IDLE and RRC_INACTIVE and is included in paging message If new paging ID is received from Remote UE 30 and that paging ID is included in received paging message.

Relay UE 40 sends paging indication to that Remote UE 30 (using MAC CE or signalling message or SCI). Relay UE 40 may also indicate whether paging is RAN paging or CN paging.

Access type (non3GPP) and/or paging cause received in paging message may also be sent to Remote UE 30.

In an embodiment, the method described herein is applied when Relay UE 40 is in RRC IDLE or Relay UE 40 is in RRC_INACTIVE or Relay UE 40 is in RRC_CONNECTED wherein the active DL BWP is configured with common search space for paging (pagingSearchSpace is signaled).

In an embodiment, when a Remote UE 30 whose paging is relayed by Relay UE 1 reselects another Relay UE 2, Remote UE 30 sends parameters as explained earlier to Relay UE 2 and Relay UE 2 will monitor paging for Remote UE 30 as explained in this method. Upon reselection, Remote UE 30 may inform Relay UE1 that it's no longer need to monitor paging for it, Relay UE 1 releases the configuration/parameters received from Remote UE 30 and stops monitoring paging for Remote UE 30.

Embodiment 4-4

Figure 17:
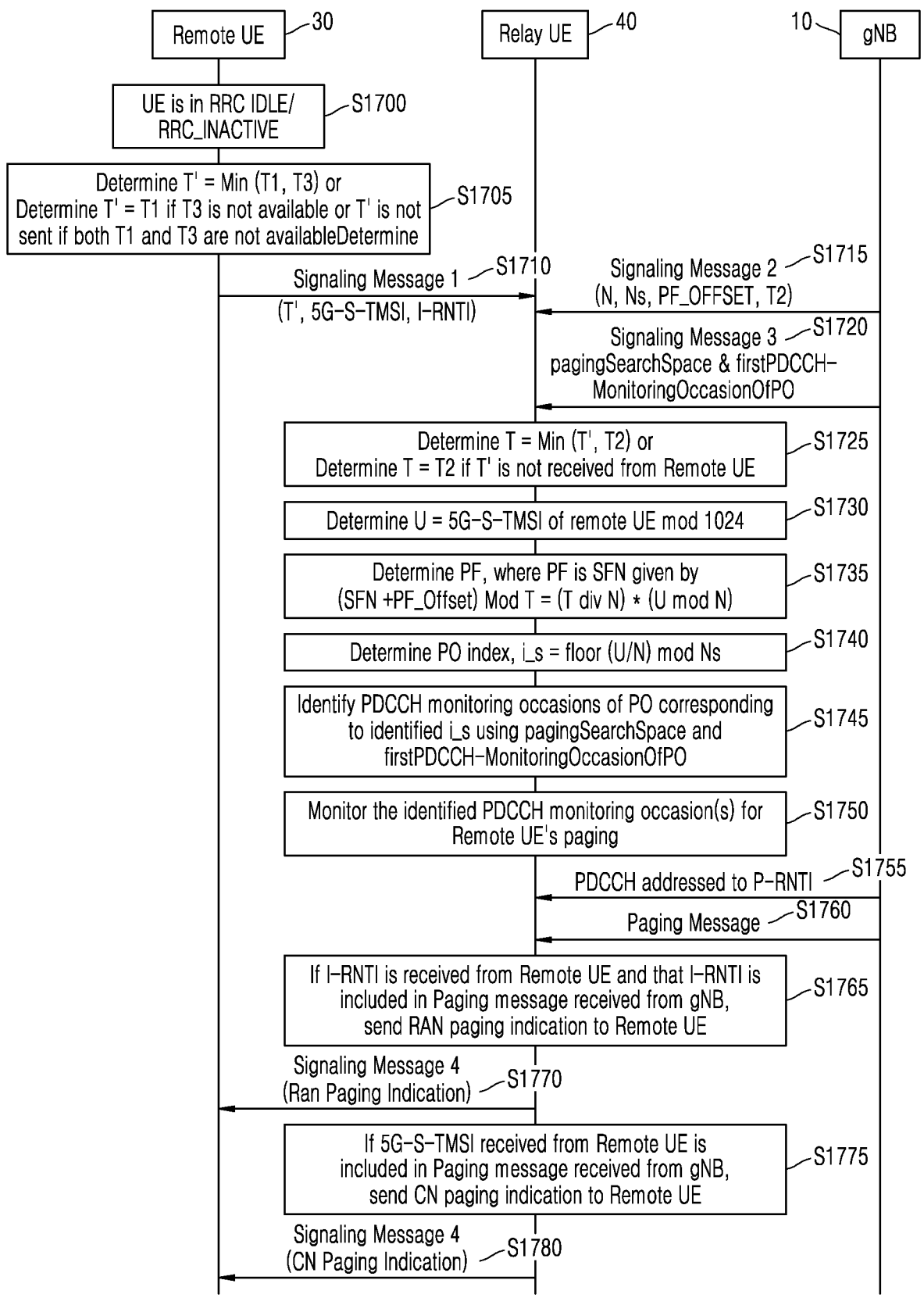
FIG. 17 illustrates a diagram of a method for determining the paging occasion(s) of the Remote UE and monitoring paging for Remote UE according to embodiments of the present disclosure.

FIG. 17 illustrates a diagram of a method for determining the paging occasion(s) of the Remote UE and monitoring paging for Remote UE according to embodiments of the present disclosure.

In one method of this disclosure (FIG. 17), Remote UE 30 may send the following parameter(s) to Relay UE 40 over the sidelink.

5G-S-TMSI of Remote UE 30;

I-RNTI of Remote UE 30, if remote UE 30 is in RRC_INACTIVE

Length of DRX cycle (T') where a. T'=Min (T1, T3) or b. T'=T1, if T3 is not available T' is not sent if both T1 and T3 are not available T1=Length of DRX cycle configured by upper layer (i.e. NAS) to Remote UE 30;

T3=Length of DRX cycle configured by RAN to Remote UE 30. RAN may configure/signal this to Remote UE 30 using RRCRelease message when the Remote UE 30 was in RRC_CONNECTED. RAN may configure/signal this to UE using RRCRelease message during the small data transmission procedure/session when the Remote UE 30 was in RRC_INACTIVE.

Paging subgroup information (e.g. paging subgroup identity which may be received by Remote UE from CN i.e. AMF or which may be determined by Remote UE based on UE_ID), if available. Remote UE may indicate whether paging subgroup is received from CN or paging subgroup is determined by Remote UE based on Remote UE's identity. In an embodiment, this may be sent only if early paging indication is supported in the cell to which the Relay UE 40 is camped and/or Relay UE 40 supports early paging indication. Information that the cell to which the relay UE 40 is camped supports early paging indication can be obtained from relay discovery message or from system information sent by relay UE 40 to remote UE 30. Information that the relay UE 40 supports early paging indication can be obtained from signaling message transmitted by Relay UE 40 to Remote UE 30.

If Remote UE 30 supports e-DRX a. Length of e-DRX cycle and length of PTW. If PTW is separately configured for RRC_IDLE and RRC_INACTIVE, both PTW are included. Similarly, e-DRX cycle length can be separately included for RRC_IDLE and RRC_INACTIVE The above parameters can be sent by Remote UE 30 to Relay UE 40 using RRC signaling message over sidelink signaling radio bearer (SL SLRB) or over sidelink data radio bearer. The signaling message carrying these parameters is transmitted in a MAC PDU wherein the Remote UE's layer 2 identity (or part of Remote UE's layer 2 identity) and Relay UE's layer 2 identity (part of Relay UE's layer 2 identity) is added in header of the MAC PDU. The MAC PDU is then transmitted over PSSCH.

In this method of the disclosure Relay UE's operation for Remote UE's Paging is as follows:

At step S1705, Remote UE 30 may determine a value of T as described above.

At steps S1715 and S1720, Relay UE 40 may receive parameters N (number of paging frames), Ns (number of paging occasions), T2 (Default DRX Cycle), PF_Offset (paging frame offset), pagingSearchSpace (paging search space identifier) from gNB 10. The parameter firstPDCCH-MonitoringOccasionOfPO (list of first PDCCH monitoring occasion number of each of Ns POs) may also be received from gNB 10. N, Ns and PF_Offset are received from SIB1 transmitted by gNB 10. N is one of oneT, halfT, QuarterT, oneEigthT, oneSixteenthT. In other words, N is in units of DRX cycle length. It can have value equal to DRX cycle length, DRX cycle length/2, DRX cycle length/4, DRX cycle length/8, DRX cycle length/16. pagingSearchSpace and firstPDCCH-MonitoringOccasionOfPO are received in BWP configuration of DL BWP which the Relay UE 40 monitors for paging. If the Relay UE 40 is in RRC_IDLE/RRC_INACTIVE, DL BWP which the Relay UE 40 monitors for paging is the initial DL BWP. If the Relay UE 40 is in RRC_CONNECTED, DL BWP which the Relay UE 40 monitors for paging is the active DL BWP. Initial DL BWP configuration is received in SIB1 transmitted by gNB 10 if relay UE 40 is in RRC_IDLE/RRC_CONNECTED. If the Relay UE 40 is in RRC_CONNECTED, DL BWP configuration is received by Relay UE 40 in RRC Reconfiguration message.

At step S1710, Relay UE 40 may receive 5G-S-TMSI, I-RNTI (optional), T from Remote UE 30 over sidelink (using mechanism as explained earlier).

At step S1725, Relay UE 40 may determine a value of T. For example, Relay UE 40 may determine T=Min (T', T2) or determines T=T2 if T' is not received from Remote UE 30.

At step S1730, Relay UE 40 may determine a value of U. For example, Relay UE 40 may determine U=5G-S-TMSI of remote UE mod 1024 (or 5G-S-TMSI of remote UE mod 2048 or 5G-S-TMSI of remote UE mod 4096).

At step S1735, Relay UE 40 may determine a value of PF. For example, Relay UE 40 may determine PF, where PF is SFN given by (SFN+PF_Offset) Mod T=(T div N)*(U mod N). For N to determine PF, DRX cycle length is set to T. If N received from gNB is 'oneT', N equals T. If N received from gNB is 'halfT', N equals T/2. If N received from gNB is 'quarterT', N equals T/4. If N received from gNB is 'oneeEighthT', N equals T/8. If N received from gNB is 'oneSixteenthT', N equals T/16.

At step S1740, Relay UE 40 may determine PO index. For example, Relay UE 40 may determine PO index, i_s=floor (U/N) mod Ns.

At step S1745, Relay UE 40 then may identify PDCCH monitoring occasions of PO corresponding to identified i_s using pagingSearchSpace and firstPDCCH-MonitoringOccasionOfPO (if received from gNB 10)

When SearchSpaceId=0 is configured for paging-SearchSpace, the PDCCH monitoring occasions for paging are same as for RMSI. When SearchSpaceId=0 is configured for pagingSearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the $(i\_s+1)^{th}$ PO. The PDCCH monitoring occasions for paging are determined based on paging search space configuration (paging-SearchSpace) signaled by gNB. The PDCCH monitoring occasions for paging which are not overlapping with UL symbols (determined according to tdd-UL-DL-ConfigurationCommon received in SI) are sequentially numbered from zero starting from the 1st PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S*X' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasion-OfPO parameter). Otherwise, the $(i\_s+1)^{th}$ PO is a set of 'S' consecutive PDCCH monitoring occasions for paging starting from the $(i\_s*S*X)^{th}$ PDCCH monitoring occasion for paging. 'S' is the number of actual transmitted SSBs determined according to parameter ssb-PositionsInBurst signalled in SystemInformation-Block1 received from gNB. X is the number of PDCCH monitoring occasions per SSB and signaled by GNB. If X is not signaled, it is assumed to be equal to 1. The parameter first-PDCCH-MonitoringOccasionOfPO is signaled in SIB1 for paging in initial DL BWP. For paging in a DL BWP other than the initial DL BWP, the parameter first-PDCCH-MonitoringOccasionOfPO is signaled in the corresponding BWP configuration.

At step S1750, Relay UE 40 may monitor PDCCH addressed to P-RNTI in the PDCCH monitoring occasion(s) of PO identified above.

If I-RNTI is received from Remote UE 30, Relay UE 40 monitors CN paging and RAN paging for Remote UE 30.

If I-RNTI is not received from Remote UE 30, Relay UE 40 monitors only CN paging for Remote UE 30.

At step S1755, Relay UE 40 may receive PDCCH addressed to P-RNTI. Also, at step S1760, Relay UE 40 may receive paging message.

If PDCCH addressed to P-RNTI is received in the monitored PO and DCI of paging message includes scheduling information (i.e. short message indicator in DCI is set to 01 or 11) for paging message, UE receives and decodes the TB based on the scheduling information and obtains the paging message from the decoded TB.

At step S1765, if I-RNTI is received from Remote UE 30 and that I-RNTI is included in received paging message At step S1770, Relay UE 40 sends RAN paging indication to that Remote UE 30 over sidelink (using MAC CE or signalling message or SCI)

Access type (non3GPP) and/or paging cause received in paging message may also be sent to Remote UE 30.

At step S1775, if 5G-S-TMSI is received from Remote UE 30 and that 5G-S-TMSI is included in received paging message At step S1780, Relay UE 40 sends CN paging indication to that Remote UE 30 (using MAC CE or signalling message or SCI)

Access type (non3GPP) and/or paging cause received in paging message may also be sent to Remote UE 30.

In an embodiment, relay UE 40 may just forward the received paging message from gNB 10 over the sidelink.

If early paging indication is supported by Relay UE 40 and early paging indication is supported by the cell on which Relay UE 40 is camped (or PCell in case Relay UE 40 is in RRC_CONNECTED)

Relay UE 40 may identify early paging indication monitoring occasions corresponding to determined PO above and monitor early paging indication If early paging indication includes/indicates Remote UE's paging sub group or Relay UE 40 fails to receive early paging indication, Relay UE 40 monitors Remote UE's PO (determined above).

If early paging indication does not includes/indicates Remote UEs paging sub group, Relay UE 40 may not monitor Remote UE's PO (determined above).

Remote UE's paging subgroup can be identified by Relay UE 40 based on Remote UE ID Remote UE's paging subgroup can be received by Relay UE 40 from Remote UE 30 OR Remote UE's paging subgroup can be identified by Relay UE 40 based on Remote UE ID ("if paging subgroup identity is not received from Remote UE and cell where Relay UE is currently camped supports UE ID based paging subgrouping" or "if paging subgroup identity received from UE is assigned by CN and cell where Relay UE is currently camped does not support CN based paging subgrouping but supports UE ID based paging subgrouping")

Remote UE's paging subgroup 'k'=(U/(N*Ns)) mod P, where P is number of paging sub groups received by relay UE 40 from gNB 10.

In case the Relay UE 40 receives e-DRX configuration from Remote UE 30 and the cell on which relay UE 40 is camped (or PCell in case Relay UE 40 is in RRC_CONNECTED) supports e-DRX, Relay UE 40 first identifies the PTW for Remote UE's paging Determining paging hyper frame (PH). PH is the H-SFN which satisfies the following equation:

H-SFN mod $T_{eDRX,H}$=(UE_ID_H mod $T_{eDRX,H}$), $T_{eDRX,H}$: eDRX cycle of the Remote UE in Hyper-frames, ($T_{eDRX,H}$=1, 2, ..., 256 Hyper-frames)
UE_ID_H: 10 most significant bits of the Hashed ID
Hashed_ID is Frame Check Sequence (FCS) for the bits b31, b30 ..., b0 of 5G S-TMSI of Remote UE
5G-S-TMSI is 48 bits comprising of AMF Set ID (10 bits), AMF pointer (6 bits) and 5G TMSI (32 bits)
Determining PTW_start. PTW_start denotes the first radio frame of the PH that is part of the PTW and has SFN satisfying the following equation:

SFN=256*ieDRX, where ieDRX=floor(UE_ID_H/ $T_e$DRX,H)mod 4

Relay UE 40 then applies the paging monitoring operation, as explained earlier under ' Relay UE's operation for Remote UE's Paging', within the PTW (i.e. SFN considered for PF determination are the one's which are within the PTW)
In an alternate embodiment of this method:
Remote UE 30 can inform new paging ID(s) (instead of 5G-S-TMSI/I-RNTI) to Relay UE 40.
There can be separate new paging ID for RRC IDLE and RRC INACTIVE
new paging ID can be same for both RRC IDLE and RRC_INACTIVE
  In this case Remote UE 30 can additionally indicate whether it wants to monitor RAN paging or not; or it can indicate its RRC state.
U=UE_ID i.e. 5G-S-TMSI of Remote UE mod 1024 is also informed to Relay UE 40 by Remote UE 30 and Relay UE 40 does not need to calculate it
Relay UE 40 will check for new paging ID (s) in received paging message from gNB 10 instead of I-RNTI/5G-S-TMSI of Remote UE
Paging message from gNB indicates whether paging is RAN paging/CN paging (or UE state) if new paging ID is common for RRC IDLE and RRC_INACTIVE and is included in paging message
If new paging ID is received from Remote UE 30 and that paging ID is included in received paging message
Relay UE 40 sends paging indication to that Remote UE 30 (using MAC CE or signalling message or SCI).
Relay UE 40 may also indicate whether paging is RAN paging or CN paging.
Access type (non3GPP) and/or paging cause received in paging message may also be sent to Remote UE 30
In an embodiment, the method described herein is applied when Relay UE 40 is in RRC IDLE or Relay UE 40 is in RRC_INACTIVE or Relay UE 40 is in RRC_CONNECTED wherein the active DL BWP is configured with common search space for paging (pagingSearchSpace is signaled).

In an embodiment, when a Remote UE 30 whose paging is relayed by Relay UE 1 reselects another Relay UE 2, Remote UE 30 sends parameters as explained earlier to Relay UE 2 and Relay UE 2 will monitor paging for Remote UE 30 as explained in this method. Upon reselection, Remote UE 30 may inform Relay UE1 that it's no longer need to monitor paging for it, Relay UE 1 releases the configuration/parameters received from Remote UE 30 and stops monitoring paging for Remote UE 30.

In Embodiment 4-1 to Embodiment 4-4, wherein new paging ID is used instead of 5G-S-TMSI/I-RNTI, various aspects of new paging ID is as follows:

Option 1: CN Assigns the New ID
  During registration or in RRC connected state (e.g. when UE is connected via relay UE 40), UE can request for new ID and network (i.e. AMF) can assign a new ID using NAS message.
  For CN paging, AMF can include this new ID of remote UE 30 instead of 5G-S-TMSI in paging message sent to gNB 10. gNB 10 then includes this in paging message transmitted in PDSCH.
  For RAN paging, AMF can inform this new ID of remote UE 30 to RAN (i.e. gNB) using RAN assistance information message and ID can then be stored in anchor gNB. Anchor gNB can include this new ID in paging message sent to another gNB. gNB 10 then includes this in paging message transmitted in PDSCH.
Option 2: RAN can Assign the New ID
  When remote UE 30 is connected state, it can inform gNB its interest in relay operation and gNB can assign the new ID.
  When remote UE 30 is Idle state:
    when gNB 10 assigns ID to Remote UE 30 in connected state, it informs the UEs new ID to AMF. AMF stores the ID and links it with 5G-S-TMSI. In the CN paging message, AMF can include the ID of remote UE instead of 5G-S-TMSI in paging message sent to gNB. GNB then includes this in paging message transmitted in PDSCH.
  When remote UE 30 is INACTIVE state:
    For CN paging, operation can be as explained in case of Idle state
    For RAN paging, new ID can be stored in anchor gNB. Anchor gNB can include the new ID in paging message sent to another gNB. GNB then includes this in paging message transmitted in PDSCH.

Preambles and RACH Resource for Feature/Feature Combination:

Random access resource (RACH occasions, Preambles) configuration for various feature/feature combinations is being discussed. Network can configure several RACH configuration(s) where each configuration corresponds to a feature/feature combination. This list of RACH configurations can be signaled per BWP or per cell in system information or in RRCReconfiguration message. "Redcap' refers to reduced capability UE, e.g. which supports Reduced number of UE RX/TX antennas, reduced bandwidth, relaxed UE processing time, relaxed UE processing capability, reduced Maximum number of DL MIMO layers, Relaxed maximum modulation order, Duplex operation. A RACH configuration corresponding to redcap ("Redcap indication" set to 'yes' in RACH configuration) means that RACH configuration is for reduced capability UE and redcap UE uses it when initiates random access procedure. "CE" refers to coverage extension. RACH configuration corresponding to CE ("CE indication' set to 'yes' in RACH configuration) means that it can be used by UE for which DL RSRP is <threshold. RACH configuration corresponding to SDT ("SDT indication" set to 'yes' in RACH configuration) means that it can be used by UE when UE initiates random access for small data transmission. RACH configuration corresponding to slicing means RACH configuration is associated with one of more slices and it can be used by UE if the slice in which it is interested in included in that RACH configuration. Table 5 is an example of various features/ feature combinations where each row indicates a feature/ feature combination with which a RACH configuration is associated. When UE initiates a random access procedure, it can select a RACH configuration if conditions corresponding to each of the associated features with this RACH configuration is met. For example, if RACH configuration is associated to redcap+SDT+Slicing+CE, UE can select this RACH configuration, if UE is redcap UE and this UE has initiated random access for SDT and this UE's DL RSRP is <threshold and this UEs interested slice is one of the slice with which the RACH configuration is associated.

TABLE 5

| Feature/Feature combination | Redcap | CE | SDT | Slicing |
|---|---|---|---|---|
| 0 | Yes | Yes | Yes | Yes |
| 1 | Yes | Yes | Yes | No |
| 2 | Yes | Yes | No | Yes |
| 3 | Yes | Yes | No | No |
| 4 | Yes | No | Yes | Yes |
| 5 | Yes | No | Yes | No |
| 6 | Yes | No | No | Yes |
| 7 | Yes | No | No | No |
| 8 | No | Yes | Yes | Yes |
| 9 | No | Yes | Yes | No |
| 10 | No | Yes | No | Yes |
| 11 | No | Yes | No | No |
| 12 | No | No | Yes | Yes |
| 13 | No | No | Yes | No |
| 14 | No | No | No | Yes |
| 15 | No | No | No | No |

In the existing design, when 2 step RA was introduced and ROs of 2 step RA was shared with ROs for 4 step RA, a pre-defined rule was introduced and according to this rule preamble per SSB per valid RO for 2 step RA immediately followed the preambles per SSB per valid RO for 4 step RA.

For Random access resource (RACH occasions, Preambles) configuration for various feature/feature combinations, ROs can be shared amongst one or more RACH configurations corresponding to feature/feature combinations listed in table 5. This means ROs of a RACH configuration corresponding to a feature/feature combination can be shared with legacy ROs and/or with ROs of RACH configurations corresponding to another feature/feature combination. The ROs of 2 step RA configuration of a feature/feature combination can be shared with ROs of 2 step RA configuration of another feature/feature combination and/or can be shared with ROs of 4 step RA configuration of another feature/feature combination. Similarly, the ROs of 4 step RA configuration of a feature/feature combination can be shared with ROs of 4 step RA configuration of another feature/feature combination and/or can be shared with ROs of 2 step RA configuration of another feature/feature combination. The pre-defined rule based approach is not suitable because of several feature/feature combinations and RO sharing options. So in an embodiment of invention network signals starting preamble index (S) for each RACH configuration corresponding to a feature/feature combination.

The starting preamble index is used to determine preambles for a feature/feature combination as follows:

S is the starting preamble index for the RACH configuration of a feature/feature combination. RACH configuration is a 2 step RACH configuration or a 4 step RACH configuration.

X is the contention based preambles per SSB for the RACH configuration of a feature/feature combination.

Y is the number of SSBs per RACH occasion for the RACH configuration of a feature/feature combination.

if Y<1, one SS/PBCH block is mapped to 1/Y consecutive valid PRACH occasions and X contention based preambles with consecutive indexes associated with the SS/PBCH block per valid PRACH occasion start from preamble index S.

If Y≥1, X contention based preambles with consecutive indexes associated with SS/PBCH block n, 0≤n≤Y−1, per valid PRACH occasion start from preamble index n·$N_{preamble}^{total}$/Y+S, where $N_{preamble}^{total}$ is total number of RA preambles.

Starting preamble index can be optionally configured. If not configured UE assumes Starting preamble index as zero.

In the existing design, PRACH configuration index (prach-ConfigurationIndex) in the 4 step RACH configuration indicates the ROs of a 4 step RACH configuration. PRACH configuration index in the 2 step RACH configuration indicates the ROs of a 2 step RACH configuration. A pre-defined PRACH configuration table indicate number of PRACH occasions in PRACH configuration period, PRACH configuration period, location of PRACH occasions in PRACH configuration period. prach-ConfigurationIndex is an index to an entry in this PRACH configuration table. In case ROs of a 2 step RACH configuration are shared with ROs of 4 step RACH configuration, PRACH configuration index is not signaled in 2 step RACH configuration. In case of shared ROs, msgA-SSB-SharedRO-MaskIndex is optionally signaled which indicates the subset of 4-step type ROs shared with 2-step random access type for each SSB. In case of shared ROs, if msgA-SSB-SharedRO-MaskIndex is not signaled then all ROs are shared.

For Random access resource (RACH occasions, Preambles) configuration for various feature/feature combinations, network can configure several RACH configuration (s) where each RACH configuration corresponds to a feature/feature combination in table 5. In case ROs of RACH configuration is shared, UE needs to know the RACH configuration for which the ROs is shared so that UE can determine the ROs for random access. Following options can be considered for the same:

Option 1: PRACH configuration index (prach-ConfigurationIndex) is always signaled in the RACH configuration corresponding to a feature/feature combination. SSB-SharedRO-MaskIndex is optionally signaled in the RACH configuration corresponding the feature/feature combination, which indicates the subset of ROs indicated by the PRACH configuration index that are available for this RACH configuration. If SSB-SharedRO-MaskIndex is not signaled, all ROs indicated by the PRACH configuration index are available for this RACH configuration. SSB-PerRACH-OccasionAndCB-PreamblesPerSSB is also always signaled in this RACH configuration which indicates number of SSBs per RO and number of contention based preambles per SSB.

FIG. 18 is a diagram illustrating a list of RACH configurations according to an embodiment of the present disclosure.

Option 2: PRACH configuration index (prach-ConfigurationIndex) is not always signaled in the RACH configuration corresponding to a feature/feature combination. It can be skipped in case ROs for the RACH configuration is shared with another RACH configuration. The index of RACH configuration with which the ROs are shared can be included in the RACH configuration. For example, let's say there are six RACH configurations in the list of RACH configurations. If $6^{th}$, $5^{th}$ and $3^{rd}$ RACH configuration's ROs are shared, prach-ConfigurationIndex can be included in the $3^{rd}$ RACH configuration and index (i.e. 2) of $3^{rd}$ RACH configuration in the list of RACH configuration is included in $5^{th}$ and $6^{th}$ RACH configuration as shown in FIG. 18, where each entry in the list of RACH configurations is sequentially indexed from zero.

Figure 19:
FIG. 19 is a diagram illustrating a list of RACH configurations according to an embodiment of the present disclosure.

FIG. 19 is a diagram illustrating a list of RACH configurations according to an embodiment of the present disclosure.

Alternately, Index of each RACH configuration can also be explicitly signaled by network in the RACH configuration e.g. network can assign same identity/index to RACH configurations which share ROs as shown in FIG. 19. Whether the ROs are shared with 2 step or 4 step RACH configuration can also be indicated.

In this option, SSB-SharedRO-MaskIndex can also be signaled as in case of option 1 in RACH configuration corresponding to a feature/feature combination. SSB-SharedRO-MaskIndex indicates the subset of shared ROs indicated by prach-ConfigurationIndex that are available for this RACH configuration. If SSB-SharedRO-MaskIndex is not signaled RACH configuration corresponding to a feature/feature combination, all ROs indicated by prach-ConfigurationIndex are available for this RACH configuration. Note that if prach-ConfigurationIndex is not signaled in the RACH configuration, UE applies the prach-ConfigurationIndex of the RACH configuration indicated by parameter index explained earlier.

In this option SSB-PerRACH-OccasionAndCB-PreamblesPerSSB can be skipped and CB-PreamblesPerSSB-PerSharedRO is included in some RACH configurations sharing ROs with other RACH configuration. SSB-PerRACH-OccasionAndCB-PreamblesPerSSB and PRACH configuration index is included in only one of the RACH configuration amongst the RACH configurations sharing ROs. Note that if SSB-PerRACH-OccasionAndCB-PreamblesPerSSB is not signaled in the RACH configuration, UE applies the number of SSBs per RO of the RACH configuration indicated by parameter index explained earlier.

Figure 20:
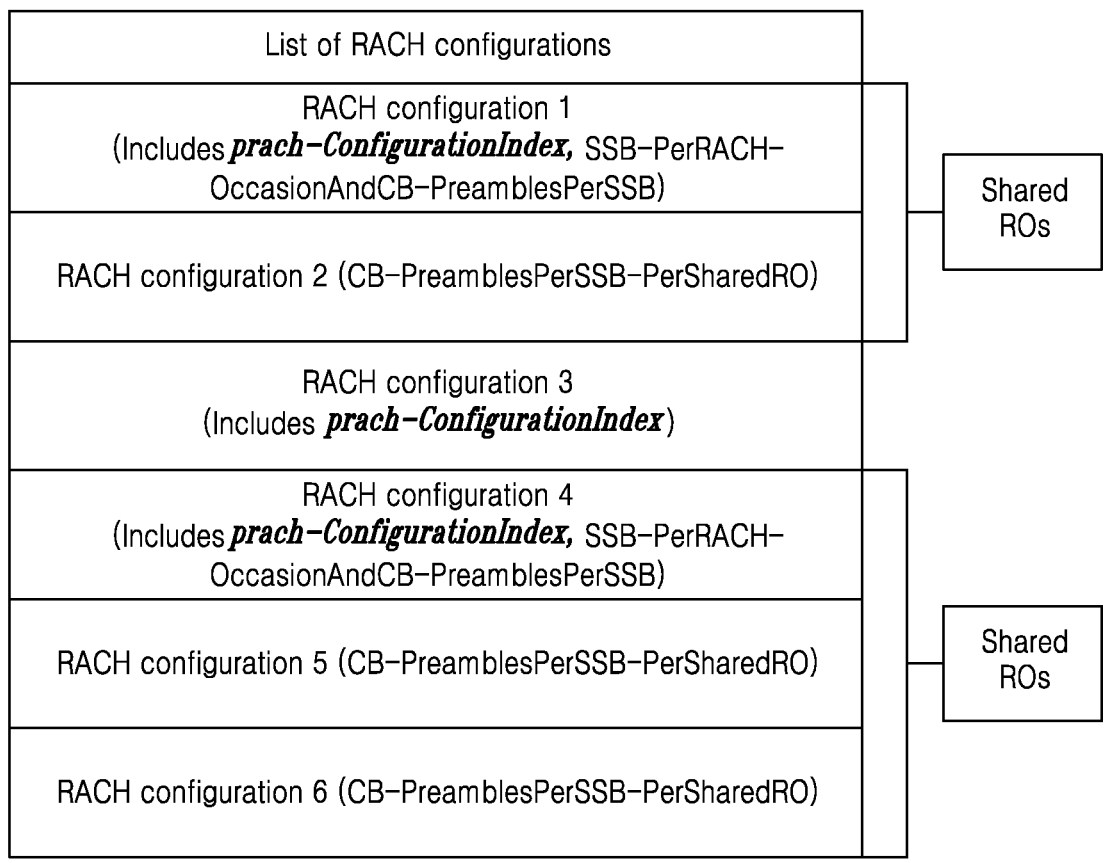
FIG. 20 is a diagram illustrating a list of RACH configurations according to an embodiment of the present disclosure.

FIG. 20 is a diagram illustrating a list of RACH configurations according to an embodiment of the present disclosure.

Option 3: PRACH configuration index (prach-ConfigurationIndex) is not always signaled in the RACH configuration corresponding to a feature/feature combination. It can be skipped in case ROs for the RACH configuration is shared with another RACH configuration. RACH configurations with shared ROs can be included one after another in the list of RACH configurations and PRACH configuration index can be included only for the first RACH configuration amongst the RACH configuration with shared ROs. This is illustrated in FIG. 20. If a RACH configuration in the list of RACH configurations has a prach-ConfigurationIndex, all the subsequent RACH configurations which does not include prach-ConfigurationIndex, until another RACH configuration which includes prach-ConfigurationIndex applies this prach-ConfigurationIndex. For example, in FIG. 20, RACH configuration 2 applies same prach-ConfigurationIndex and SSBs per ROs as the RACH configuration 1. RACH configuration 4 and 5 applies same prach-ConfigurationIndex and SSBs per ROs as the RACH configuration 4. If prach-ConfigurationIndex is not include in a RACH configuration, UE applies the prach-ConfigurationIndex in the earliest preceding RACH configuration in the list of RACH configurations for which prach-ConfigurationIndex is signaled.

In this option, SSB-SharedRO-MaskIndex can also be signaled as in case of option 1 in RACH configuration corresponding to a feature/feature combination. SSB-SharedRO-MaskIndex indicates the subset of shared ROs indicated by prach-ConfigurationIndex that are available for this RACH configuration. If SSB-SharedRO-MaskIndex is not signaled RACH configuration corresponding to a feature/feature combination, all ROs indicated by prach-ConfigurationIndex are available for this RACH configuration. Note that if prach-ConfigurationIndex is not signaled in the RACH configuration, UE applies the prach-ConfigurationIndex of another RACH configuration as explained earlier.

Upon initiation of random access procedure for a feature/feature combination, UE select the RACH configuration corresponding to the feature/feature combination from list of RACH configurations, UE determines the preambles corresponding to selected RACH configuration (as described earlier UE determines the preamble start index, SSBs per ROs, CB preambles per SSB to be applied for the selected RACH configuration and then determine preambles using these parameters) and the ROs corresponding to selected RACH configuration (as described earlier, UE determines the prach-ConfigurationIndex and SSB-SharedRO-MaskIndex (optional) to be applied for the selected RACH configuration and then determine ROs using these parameters), UE select a preamble and RO from the determined preambles and select a RO from the determined ROs and transmit selected preamble in the selected RO.

Figure 21:
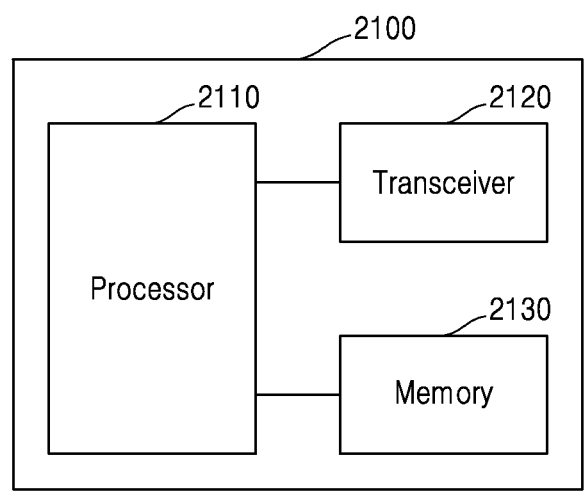
FIG. 21 is a diagram illustrating a UE according to an embodiment of the present disclosure.

FIG. 21 is a diagram illustrating a UE 2100 according to an embodiment of the present disclosure.

Referring to the FIG. 21, the UE 2100 may include a processor 2110, a transceiver 2120 and a memory 2130. However, all of the illustrated components are not essential. The UE 2100 may be implemented by more or less components than those illustrated in the FIG. 21. In addition, the processor 2110 and the transceiver 2120 and the memory 2130 may be implemented as a single chip according to another embodiment.

The UE 2100 may correspond to at least one of UE 20, remote UE 30, 35, or relay UE 40. The aforementioned components will now be described in detail.

The processor 2110 may include one or more processors or other processing devices that control the proposed function, process, and/or method. Operation of the UE 2100 may be implemented by the processor 2110.

The transceiver 2120 may be connected to the processor 2110 and transmit and/or receive a signal. In addition, the transceiver 2120 may receive the signal through a wireless channel and output the signal to the processor 2110. The transceiver 2120 may transmit the signal output from the processor 2110 through the wireless channel.

The memory 2130 may store the control information or the data included in a signal obtained by the UE 2100. The memory 2130 may be connected to the processor 2110 and store at least one instruction or a protocol or a parameter for the proposed function, process, and/or method. The memory 2130 may include read-only memory (ROM) and/or random access memory (RAM) and/or hard disk and/or CD-ROM and/or DVD and/or other storage devices.

Figure 22:
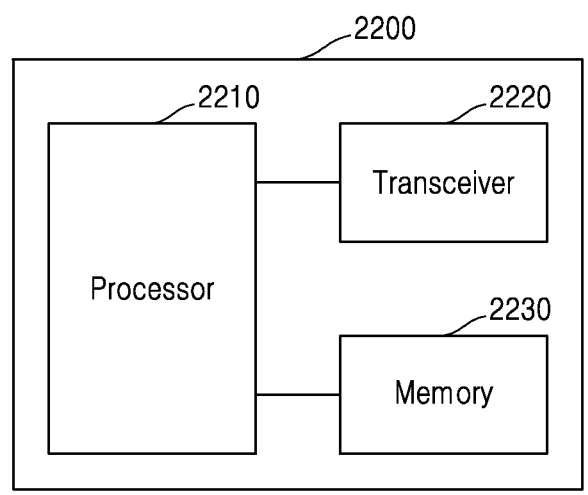
FIG. 22 is a diagram illustrating a Base station according to an embodiment of the present disclosure.

FIG. 22 is a diagram illustrating a Base station 2200 according to an embodiment of the present disclosure.

Referring to the FIG. 22, the base station 2200 may include a processor 2210, a transceiver 2220 and a memory 2230. However, all of the illustrated components are not essential. The BS 2200 may be implemented by more or less components than those illustrated in the FIG. 22. In addition, the processor 2210 and the transceiver 2220 and the memory 2230 may be implemented as a single chip according to another embodiment.

The aforementioned components will now be described in detail.

The processor 2210 may include one or more processors or other processing devices that control the proposed function, process, and/or method. Operation of the base station 2200 may be implemented by the processor 2210.

The transceiver 2220 may be connected to the processor 2210 and transmit and/or receive a signal. In addition, the transceiver 2220 may receive the signal through a wireless channel and output the signal to the processor 2210. The transceiver 2220 may transmit the signal output from the processor 2210 through the wireless channel.

The memory 2230 may store the control information or the data included in a signal obtained by the base station 2200. The memory 2230 may be connected to the processor 2210 and store at least one instruction or a protocol or a parameter for the proposed function, process, and/or method. The memory 2230 may include read-only memory (ROM) and/or random access memory (RAM) and/or hard disk and/or CD-ROM and/or DVD and/or other storage devices.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a relay user equipment (UE) in a wireless communication system, the method comprising:
   receiving, from a remote UE in radio resource control (RRC) inactive state, paging identity information of the remote UE, wherein the paging identity information of the remote UE includes a 5G-S-temporary Mobile Subscriber Identity (TMSI) of the remote UE and an inactive radio network temporary identifier (I-RNTI) of the remote UE;
   identifying whether the relay UE is in a RRC connected state on an active bandwidth part (BWP) configured with information on a paging search space; and
   in case that the relay UE is in the RRC connected state on the active BWP configured with the information on the paging search space, monitoring a paging message for the remote UE based on the paging identity information of the remote UE.

2. The method of claim 1, further comprising:
   identifying a paging configuration information including at least one of a number of total paging frames, a number of paging occasions for a paging frame, an offset for the paging frame, or a first discontinuous reception (DRX) cycle of the remote UE corresponding to a default cycle,
   wherein information on a second DRX cycle of the remote UE is received from the remote UE along with the paging identity information, and
   wherein the paging message for the remote UE is received based on a paging occasion of the remote UE.

3. The method of claim 2, further comprising:
   identifying a third DRX cycle based on the first DRX cycle;
   identifying a paging frame of the remote UE based on at least one of the third DRX cycle, an identity of the remote UE, the offset for the paging frame, or the number of total paging frames; and
   identifying the paging occasion of the remote UE based on the identity of the remote UE, the number of total paging frames, and the number of paging occasions for the paging frame,
   wherein the identity of the remote UE is identified based on a modulo function of the 5G-S-TMSI of the remote UE.

4. The method of claim 2, wherein the second DRX cycle of the remote UE is a minimum value of a DRX cycle configured by an upper layer to the remote UE and a DRX cycle configured by a base station (BS) to the remote UE, or the DRX cycle configured by the upper layer to the remote UE.

5. The method of claim 1, further comprising:
   receiving, from a base station (BS), an RRC message including the paging message for the remote UE; and
   identifying whether the paging message includes the paging identity information of the remote UE.

6. The method of claim 5, further comprising, in response to identifying the paging message includes the paging identity information of the remote UE, transmitting, to the remote UE, a message including paging information for the remote UE.

7. The method of claim 1,
   wherein, in case that the relay UE is in the RRC connected state and the active BWP is configured with the information on the paging search space, the paging message for the remote UE is monitored, based on a paging occasion of the remote UE, and wherein, in case that the relay UE is in the RRC connected state and the active BWP is configured without the information on the paging search space, the paging identity information of the remote UE is transmitted to a base station (BS).

8. The method of claim 1, wherein the paging identity information of the remote UE is forwarded to a target base station (BS), in case that the relay UE handovers to the target BS.

9. A method performed by a remote user equipment (UE) in a wireless communication system, the method comprising:
while in radio resource control (RRC) inactive state, transmitting, to a relay UE, paging identity information of the remote UE, wherein the paging identity information of the remote UE includes a 5G-S-temporary Mobile Subscriber Identity (TMSI) of the remote UE and an inactive radio network temporary identifier (I-RNTI) of the remote UE; and
in case that the relay UE is in a RRC connected state on an active bandwidth part (BWP) configured with information on a paging search space, receiving a paging message for the remote UE which is monitored by the relay UE based on the paging identity information of the remote UE.

10. The method of claim 9, further comprising:
receiving, from a relay UE, a paging configuration, wherein the paging configuration includes at least one of a number of total paging frames, a number of paging occasions for a paging frame, an offset for the paging frame, or a first discontinuous reception (DRX) cycle of the remote UE,
wherein a paging occasion of the remote UE for receiving a paging message for the remote UE is monitored by the relay UE,
wherein a third DRX cycle is identified based on the first DRX cycle,
wherein a paging frame of the remote UE is identified based on at least one of the third DRX cycle, an identity of the remote UE, the offset for the paging frame, or the number of total paging frames, wherein the paging occasion of the remote UE is identified based on the identity of the remote UE, the number of total paging frames, and the number of paging occasions for the paging frame, and
wherein the identity of the remote UE is identified based on a modulo function of the 5G-S-TMSI of the remote UE.

11. The method of claim 9, further comprising identifying a second DRX cycle of the remote UE as a minimum value of a DRX cycle configured by an upper layer to the remote UE and a DRX cycle configured by a base station (BS) to the remote UE, or the DRX cycle configured by the upper layer to the remote UE.

12. The method of claim 9, further comprising receiving, from the relay UE, a message including paging information for the remote UE in case that the paging message including the paging identity information of the remote UE included in an RRC message is transmitted by a base station (BS).

13. The method of claim 9,
wherein, in case that the relay UE is in the RRC connected state and the active BWP is configured with the information on the paging search space, the paging message for the remote UE is monitored, based on a paging occasion of the remote UE, and
wherein, in case that the relay UE is in the RRC connected state and the active BWP is configured without the information on the paging search space, the paging identity information of the remote UE is transmitted to a base station (BS).

14. The method of claim 9, wherein the paging identity information of the remote UE is forwarded to a target base station (BS), in case that the relay UE handovers to the target BS.

15. A relay user equipment (UE) in a wireless communication system, the relay UE comprising:
a transceiver; and
at least one processor coupled with the transceiver, the processor configured to:
control the transceiver to receive, from a remote UE in radio resource control (RRC) inactive state, paging identity information of the remote UE, wherein the paging identity information of the remote UE includes a 5G-S-temporary Mobile Subscriber Identity (TMSI) of the remote UE and an inactive radio network temporary identifier (I-RNTI) of the remote UE,
identify whether the relay UE is in a RRC connected state on an active bandwidth part (BWP) configured with information on a paging search space; and
in case that the relay UE is in the RRC connected state on the active BWP configured with the information on the paging search space, monitoring a paging message for the remote UE based on the paging identity information of the remote UE.

16. The relay UE of claim 15, wherein the at least one processor is further configured to:
identify a paging configuration information including at least one of a number of total paging frames, a number of paging occasions for a paging frame, an offset for the paging frame, or a first discontinuous reception (DRX) cycle of the remote UE corresponding to a default cycle,
identify a third DRX cycle based on the first DRX cycle,
identify a paging frame of the remote UE based on at least one of the third DRX cycle, an identity of the remote UE, the offset for the paging frame, or the number of total paging frames, and
identify a paging occasion of the remote UE based on the identity of the remote UE, the number of total paging frames, and the number of paging occasions for the paging frame,
wherein the identity of the remote UE is identified based on a modulo function of the 5G-S-TMSI of the remote UE,
wherein the information for the remote UE further includes a second DRX cycle of the remote UE, and
wherein the paging message related to the remote UE is received based on the paging occasion of the remote UE.

17. The relay UE of claim 16, wherein the second DRX cycle of the remote UE is a minimum value of a DRX cycle configured by an upper layer to the remote UE and a DRX cycle configured by a base station (BS) to the remote UE, or the DRX cycle configured by the upper layer to the remote UE.

18. The relay UE of claim 15, wherein the at least one processor is further configured to:
control the transceiver to receive, from a base station (BS), an RRC message including the paging message for the remote UE; and
identify whether the paging message includes the paging identity information of the remote UE.

19. The relay UE of claim 18, wherein the at least one processor is further configured to, in response to identifying the paging message includes the paging identity information of the remote UE, transmitting, to the remote UE, a message including paging information for the remote UE.

20. The relay UE of claim 15,
- wherein, in case that the relay UE is in the RRC connected state and the active BWP is configured with the information on the paging search space, the paging message for the remote UE is monitored, based on a paging occasion of the remote UE, and
- wherein, in case that the relay UE is in the RRC connected state and the active BWP is configured without the information on the paging search space, the paging identity information of the remote UE is transmitted to a base station (BS).

* * * * *